(12) United States Patent
Strickland et al.

(10) Patent No.: US 7,511,630 B2
(45) Date of Patent: Mar. 31, 2009

(54) DYNAMIC ELECTRONIC DISPLAY SYSTEM WITH BRIGHTNESS CONTROL

(75) Inventors: David Strickland, Blue Ridge, VA (US); Scott C. Cleland, Oakton, VA (US); Ronald D. Blum, Roanoke, VA (US)

(73) Assignee: Intellimat, Inc., Roanoke, VA (US)

( * ) Notice: Subject to any disclaimer, the term of this patent is extended or adjusted under 35 U.S.C. 154(b) by 25 days.

(21) Appl. No.: 11/735,908

(22) Filed: Apr. 16, 2007

(65) Prior Publication Data

US 2008/0048880 A1    Feb. 28, 2008

Related U.S. Application Data

(63) Continuation-in-part of application No. 11/316,928, filed on Dec. 27, 2005, which is a continuation of application No. 10/454,631, filed on Jun. 5, 2003, now Pat. No. 7,009,523, and a continuation-in-part of application No. 10/438,923, filed on May 16, 2003, now Pat. No. 6,982,649, and a continuation-in-part of application No. 10/285,639, filed on Nov. 1, 2002, now Pat. No. 6,873,266, which is a continuation of application No. 10/137,357, filed on May 3, 2002, now Pat. No. 6,507,285, which is a continuation of application No. 09/767,846, filed on Jan. 24, 2001, now Pat. No. 6,417,778, which is a continuation of application No. 09/418,752, filed on Oct. 15, 1999, now abandoned, which is a continuation-in-part of application No. 09/304,051, filed on May 4, 1999, now Pat. No. 6,219,876, application No. 11/735,908, which is a continuation-in-part of application No. 10/804,090, filed on Mar. 19, 2004, (Continued)

(60) Provisional application No. 60/599,878, filed on Aug. 10, 2004, provisional application No. 60/526,271, filed on Dec. 3, 2003, provisional application No. 60/460,353, filed on Apr. 3, 2003, provisional application No. 60/457,115, filed on Mar. 21, 2003, provisional application No. 60/441,408, filed on Jan. 22, 2003, provisional application No. 60/428,387, filed on Nov. 21, 2002, provisional application No. 60/429,044, filed on Nov. 23, 2002, provisional application No. 60/418,626, filed on Oct. 12, 2002, provisional application No. 60/385,579, filed on Jun. 5, 2002, provisional application No. 60/378,070, filed on May 16, 2002.

(51) Int. Cl.
   *G08B 5/00* (2006.01)
(52) U.S. Cl. ................................ 340/815.4; 345/77
(58) Field of Classification Search .............. 340/815.4, 340/332; 345/77; 40/463, 541
   See application file for complete search history.

(56) References Cited

U.S. PATENT DOCUMENTS 2,191,704 A    2/1940 Bennett (Continued)

FOREIGN PATENT DOCUMENTS

CA    2169111    8/1997

(Continued)

OTHER PUBLICATIONS

Patent Abstracts of Japan, vol. 2002 & JP 2002 062832 A (Nippon Signal Co Ltd), Feb. 28, 2002.

(Continued)

*Primary Examiner*—Thomas J Mullen
(74) *Attorney, Agent, or Firm*—Alston & Bird LLP

(57) ABSTRACT

A floor display system, including a floor covering, an electronic display device associated with the floor covering, wherein the electronic display device is configurable to display electronically modifiable arbitrary content, a controller, and a sensing device coupled to the controller, wherein the brightness of an image displayed by the electronic display device is capable of being varied based on information received by the controller from the sensing device. The sensing device may include a proximity detector. The electronic display device may include a plurality of separate panels.

20 Claims, 47 Drawing Sheets

Related U.S. Application Data now abandoned, and a continuation-in-part of application No. 10/682,435, filed on Oct. 10, 2003, now Pat. No. 6,917,301, and a continuation-in-part of application No. 10/438,923, filed on May 16, 2003, now Pat. No. 6,982,649, application No. 11/735,908, which is a continuation-in-part of application No. 10/759,167, filed on Jan. 20, 2004, now Pat. No. 7,205,903, and a continuation-in-part of application No. 10/682,435, filed on Oct. 10, 2003, now Pat. No. 6,917,301, application No. 11/735,908, which is a continuation-in-part of application No. 11/199,130, filed on Aug. 9, 2005, now Pat. No. 7,358,861, and a continuation-in-part of application No. 11/002,276, filed on Dec. 3, 2004, now Pat. No. 7,145,469, and a continuation-in-part of application No. 10/454,631, filed on Jun. 5, 2003, now Pat. No. 7,009,523.

(56) References Cited

U.S. PATENT DOCUMENTS

| | | |
|---|---|---|
| 2,254,840 A | 9/1941 | Schloss |
| 2,276,104 A | 3/1942 | Shaunessey |
| 2,282,672 A | 5/1942 | Nelson |
| 2,512,310 A | 6/1950 | Corson |
| 2,791,851 A | 5/1957 | Laskow et al. |
| 2,791,852 A | 5/1957 | Laskow et al. |
| 2,800,215 A | 7/1957 | Bennett |
| 2,843,868 A | 7/1958 | Borgstrom |
| 2,919,456 A | 1/1960 | Spivey |
| 3,078,490 A | 2/1963 | Etcher |
| 3,083,393 A | 4/1963 | Nappi |
| 3,141,522 A | 7/1964 | Fitzpatrick |
| 3,183,116 A | 5/1965 | Schaar |
| 3,300,275 A | 1/1967 | Lorman |
| 3,400,421 A | 9/1968 | Nappi et al. |
| 3,435,481 A | 4/1969 | Kessler |
| 3,501,797 A | 3/1970 | Nappi |
| 3,517,407 A | 6/1970 | Wyant |
| 3,578,738 A | 5/1971 | Hughes |
| 3,663,980 A | 5/1972 | Conklin |
| 3,665,543 A | 5/1972 | Nappi |
| 3,696,459 A | 10/1972 | Kucera et al. |
| 3,699,926 A | 10/1972 | Stockl |
| 3,717,897 A | 2/1973 | Amos et al. |
| 3,785,102 A | 1/1974 | Amos |
| 3,856,320 A | 12/1974 | Blanchard |
| 3,886,620 A | 6/1975 | Miller |
| 3,906,578 A | 9/1975 | Huber |
| 3,909,996 A | 10/1975 | Ettlinger, Jr. et al. |
| 3,916,401 A | 10/1975 | Freeman |
| 3,930,084 A | 12/1975 | Shields |
| 4,107,811 A | 8/1978 | Imsande |
| 4,126,854 A | 11/1978 | Sheridon |
| 4,139,149 A | 2/1979 | Crepeau et al. |
| 4,143,103 A | 3/1979 | Sheridon |
| 4,143,194 A | 3/1979 | Wihksne |
| 4,328,275 A | 5/1982 | Vargo |
| 4,353,944 A | 10/1982 | Tarui |
| 4,421,809 A | 12/1983 | Bish et al. |
| 4,435,451 A | 3/1984 | Neubert |
| 4,439,474 A | 3/1984 | Sagel |
| 4,482,593 A | 11/1984 | Sagel et al. |
| 4,484,250 A | 11/1984 | Rzepecki et al. |
| 4,559,250 A | 12/1985 | Paige |
| 4,564,546 A | 1/1986 | Jones |
| 4,567,481 A | 1/1986 | Meier et al. |
| 4,576,244 A | 3/1986 | Zeigner et al. |
| 4,603,495 A | 8/1986 | Stevens |
| 4,609,580 A | 9/1986 | Rockett et al. |
| 4,614,679 A | 9/1986 | Farrington, Jr. et al. |
| 4,654,514 A | 3/1987 | Watson et al. |
| 4,660,828 A | 4/1987 | Weiss |
| 4,665,342 A | 5/1987 | Topp et al. |
| 4,707,895 A | 11/1987 | Lang |
| 4,720,789 A | 1/1988 | Hector et al. |
| 4,752,114 A | 6/1988 | French |
| 4,766,295 A | 8/1988 | Davis et al. |
| 4,773,492 A | 9/1988 | Ruzumna |
| 4,798,754 A | 1/1989 | Tomek |
| 4,822,669 A | 4/1989 | Roga |
| 4,831,242 A | 5/1989 | Englehardt et al. |
| 4,853,678 A | 8/1989 | Bishop, Jr. et al. |
| 4,876,969 A | 10/1989 | Infanti |
| 4,917,975 A | 4/1990 | De Guzman |
| 4,924,363 A | 5/1990 | Kornelson |
| 4,959,265 A | 9/1990 | Wood |
| 4,974,857 A | 12/1990 | Beall et al. |
| 5,018,235 A | 5/1991 | Stamatiou |
| 5,071,628 A | 12/1991 | Alazet |
| 5,111,196 A | 5/1992 | Hunt |
| 5,117,221 A | 5/1992 | Mishica, Jr. |
| 5,134,716 A | 7/1992 | Craig |
| 5,142,733 A | 9/1992 | Mogel |
| 5,160,921 A | 11/1992 | Kilinger |
| 5,161,041 A | 11/1992 | Abileah et al. |
| 5,168,423 A | 12/1992 | Ohgami et al. |
| 5,185,948 A | 2/1993 | Markson |
| 5,204,159 A | 4/1993 | Tan |
| 5,210,528 A | 5/1993 | Schulman et al. |
| 5,237,767 A | 8/1993 | Kringel et al. |
| 5,241,467 A | 8/1993 | Failing et al. |
| 5,263,269 A | 11/1993 | Tjamlund |
| 5,268,816 A | 12/1993 | Abell, Jr. et al. |
| 5,293,660 A | 3/1994 | Park |
| 5,297,353 A | 3/1994 | Ghalayini |
| 5,305,197 A | 4/1994 | Axler et al. |
| 5,335,788 A | 8/1994 | Beasley et al. |
| 5,344,693 A | 9/1994 | Sanders |
| 5,348,485 A | 9/1994 | Briechle et al. |
| 5,448,226 A | 9/1995 | Failing, Jr. et al. |
| 5,460,381 A | 10/1995 | Smith et al. |
| 5,461,748 A | 10/1995 | Koiduka |
| 5,483,049 A | 1/1996 | Schulze, Jr. |
| 5,500,267 A | 3/1996 | Canning |
| 5,504,475 A | 4/1996 | Houdou et al. |
| 5,534,917 A | 7/1996 | MacDougall |
| 5,537,312 A | 7/1996 | Sekiguchi et al. |
| 5,548,282 A | 8/1996 | Escritt et al. |
| 5,556,685 A | 9/1996 | Swicegood, Jr. |
| 5,561,446 A | 10/1996 | Montlick |
| 5,562,580 A | 10/1996 | Beasley et al. |
| 5,571,626 A | 11/1996 | Cumming et al. |
| 5,575,294 A | 11/1996 | Perry et al. |
| 5,589,246 A | 12/1996 | Calhoun |
| 5,604,027 A | 2/1997 | Sheridon |
| 5,613,313 A | 3/1997 | Homan et al. |
| 5,620,003 A | 4/1997 | Sepponen |
| 5,630,068 A | 5/1997 | Vela et al. |
| 5,646,818 A | 7/1997 | Hahn |
| 5,650,794 A | 7/1997 | Walsh |
| 5,658,637 A | 8/1997 | Volz |
| 5,678,334 A | 10/1997 | Schoniger |
| 5,695,346 A * | 12/1997 | Sekiguchi et al. ............. 40/436 |
| 5,696,982 A | 12/1997 | Tanigawa et al. |
| 5,703,564 A | 12/1997 | Begum et al. |
| 5,704,049 A | 12/1997 | Briechle |
| 5,715,622 A | 2/1998 | Giordano, Jr. |
| 5,723,204 A | 3/1998 | Stefik |
| 5,736,967 A | 4/1998 | Kayser et al. |
| 5,747,133 A | 5/1998 | Vinod et al. |
| 5,753,900 A | 5/1998 | Goodwin, III et al. |
| 5,775,993 A | 7/1998 | Fentz et al. |

| | | |
|---|---|---|
| 5,790,371 A | 8/1998 | Latocha et al. |
| 5,796,376 A * | 8/1998 | Banks .................. 345/82 |
| 5,805,117 A | 9/1998 | Mazurek et al. |
| 5,815,995 A | 10/1998 | Adam |
| 5,816,550 A | 10/1998 | Watanabe et al. |
| 5,826,874 A | 10/1998 | Teitell et al. |
| 5,838,286 A | 11/1998 | Pfeiffer et al. |
| 5,839,976 A | 11/1998 | Darr |
| 5,848,830 A | 12/1998 | Castle et al. |
| 5,869,350 A | 2/1999 | Heeger et al. |
| 5,885,684 A | 3/1999 | Hefner et al. |
| 5,886,474 A | 3/1999 | Asai et al. |
| 5,913,727 A | 6/1999 | Ahdoot |
| 5,914,670 A | 6/1999 | Goodwin, III et al. |
| 5,914,698 A | 6/1999 | Nicholson et al. |
| 5,932,863 A | 8/1999 | Rathus et al. |
| 5,945,502 A | 8/1999 | Hsieh et al. |
| 5,954,592 A | 9/1999 | Laffer et al. |
| 5,966,696 A | 10/1999 | Giraud |
| 5,971,761 A | 10/1999 | Tillman, Sr. |
| 6,001,456 A | 12/1999 | Newland |
| 6,010,429 A | 1/2000 | Prueitt |
| 6,012,244 A | 1/2000 | Begum et al. |
| 6,016,481 A | 1/2000 | Failing, Jr. et al. |
| 6,038,465 A | 3/2000 | Melton, Jr. |
| 6,046,682 A | 4/2000 | Zimmerman et al. |
| 6,067,080 A | 5/2000 | Holtzman |
| 6,069,596 A | 5/2000 | Marvin et al. |
| 6,084,526 A | 7/2000 | Blotky et al. |
| 6,089,453 A | 7/2000 | Kayser et al. |
| 6,107,936 A | 8/2000 | Zimmerman |
| 6,128,186 A | 10/2000 | Feierbach |
| 6,150,996 A | 11/2000 | Nicholson et al. |
| 6,175,432 B1 | 1/2001 | Wu et al. |
| 6,179,710 B1 | 1/2001 | Sawyer et al. |
| 6,215,411 B1 | 4/2001 | Gothard |
| 6,219,876 B1 | 4/2001 | Blum |
| 6,233,776 B1 | 5/2001 | Blum et al. |
| 6,236,330 B1 | 5/2001 | Cohen |
| 6,243,690 B1 | 6/2001 | Adamec et al. |
| 6,247,650 B1 | 6/2001 | Vachette et al. |
| 6,266,052 B1 | 7/2001 | Kayser et al. |
| 6,269,342 B1 | 7/2001 | Brick et al. |
| 6,307,573 B1 | 10/2001 | Barros |
| 6,336,136 B1 | 1/2002 | Harris |
| 6,353,291 B1 | 3/2002 | Borgogno et al. |
| 6,378,925 B1 | 4/2002 | Greenlee |
| 6,387,061 B1 | 5/2002 | Nitto |
| 6,409,132 B2 | 6/2002 | Heisler et al. |
| 6,414,650 B1 | 7/2002 | Nicholson et al. |
| 6,417,778 B2 | 7/2002 | Blum et al. |
| 6,418,372 B1 | 7/2002 | Hofmann |
| 6,445,373 B1 | 9/2002 | Yamamoto |
| 6,456,343 B2 | 9/2002 | Kim et al. |
| 6,484,939 B1 | 11/2002 | Blaeuer |
| 6,507,285 B2 | 1/2003 | Blum et al. |
| 6,538,215 B2 | 3/2003 | Montagnino et al. |
| 6,550,673 B2 | 4/2003 | Massaro |
| 6,552,663 B2 | 4/2003 | Swartzel et al. |
| 6,588,131 B2 | 7/2003 | O'Connell, Jr. |
| 6,609,975 B1 | 8/2003 | Sawyer |
| 6,612,670 B2 | 9/2003 | Liu |
| 6,615,526 B2 | 9/2003 | Pitcher et al. |
| 6,616,284 B2 | 9/2003 | Yaniv et al. |
| 6,617,530 B1 | 9/2003 | Lin |
| 6,630,948 B1 | 10/2003 | Walker |
| 6,638,167 B1 | 10/2003 | Sawyer et al. |
| 6,639,578 B1 | 10/2003 | Comisky et al. |
| 6,641,139 B2 | 11/2003 | Lamberti et al. |
| 6,646,545 B2 | 11/2003 | Bligh |
| 6,742,762 B2 | 6/2004 | Koyama |
| 6,753,830 B2 | 6/2004 | Gelbman |
| 6,788,283 B1 | 9/2004 | Blotky et al. |
| 6,791,575 B2 | 9/2004 | Abboud |
| 6,873,266 B2 | 3/2005 | Blum et al. |
| 6,906,705 B2 | 6/2005 | Matsuo et al. |
| 6,914,540 B2 | 7/2005 | Gongolas |
| 6,917,301 B2 | 7/2005 | Blum et al. |
| 6,929,182 B2 | 8/2005 | Rathus et al. |
| 6,940,418 B2 | 9/2005 | Blum et al. |
| 6,943,773 B2 | 9/2005 | Wong et al. |
| 6,946,310 B2 | 9/2005 | Koyama |
| 6,963,035 B2 | 11/2005 | Honda et al. |
| 6,967,674 B1 | 11/2005 | Lausch |
| 6,982,649 B2 | 1/2006 | Blum et al. |
| 7,009,523 B2 | 3/2006 | Blum et al. |
| 7,023,420 B2 | 4/2006 | Comiskey et al. |
| 7,071,894 B1 | 7/2006 | Thielemans et al. |
| 7,080,028 B2 | 7/2006 | Goodwin, III et al. |
| 7,109,881 B2 | 9/2006 | Blum et al. |
| 7,109,967 B2 | 9/2006 | Hioki et al. |
| 7,138,585 B2 | 11/2006 | Kohn et al. |
| 7,145,469 B2 | 12/2006 | Kokonaski et al. |
| 7,161,590 B2 | 1/2007 | Daniels |
| 7,205,903 B2 | 4/2007 | Blum et al. |
| 7,358,861 B2 | 4/2008 | Blum |
| 2001/0011399 A1 | 8/2001 | Blum et al. |
| 2001/0045893 A1 | 11/2001 | Swartzel et al. |
| 2002/0005775 A1 | 1/2002 | Sonnendorfer et al. |
| 2002/0021060 A1 | 2/2002 | Liu |
| 2002/0034067 A1 | 3/2002 | Massaro |
| 2002/0063661 A1 | 5/2002 | Comiskey et al. |
| 2002/0126110 A1 | 9/2002 | Bowron |
| 2002/0139847 A1 | 10/2002 | Goodwin, III |
| 2002/0162108 A1 | 10/2002 | Lin-Hendel |
| 2002/0165779 A1 | 11/2002 | Goodwin, III et al. |
| 2002/0167481 A1 | 11/2002 | Wong et al. |
| 2002/0167500 A1 | 11/2002 | Gelbman |
| 2002/0174009 A1 | 11/2002 | Myers et al. |
| 2002/0184098 A1 | 12/2002 | Giraud et al. |
| 2002/0186221 A1 | 12/2002 | Bell |
| 2003/0001985 A1 | 1/2003 | Doe |
| 2003/0013417 A1 | 1/2003 | Bum |
| 2003/0045043 A1 | 3/2003 | Koyama |
| 2003/0046838 A1 | 3/2003 | O'Connell, Jr. |
| 2003/0058214 A1 | 3/2003 | Abboud |
| 2003/0063052 A1 * | 4/2003 | Rebh .................... 345/76 |
| 2003/0066073 A1 | 4/2003 | Rebh |
| 2003/0132924 A1 | 7/2003 | Hamilton |
| 2003/0147694 A1 | 8/2003 | Ryman et al. |
| 2003/0177679 A1 | 9/2003 | Blum |
| 2003/0233659 A1 | 12/2003 | Guerin |
| 2004/0001002 A1 | 1/2004 | Blum |
| 2004/0001159 A1 | 1/2004 | Shen et al. |
| 2004/0004827 A1 | 1/2004 | Guest |
| 2004/0021617 A1 | 2/2004 | Blum |
| 2004/0041800 A1 | 3/2004 | Daniels |
| 2004/0051644 A1 | 3/2004 | Tamayama et al. |
| 2004/0067777 A1 | 4/2004 | Salmon |
| 2004/0109094 A1 * | 6/2004 | Lindsay et al. .............. 348/739 |
| 2004/0119602 A1 | 6/2004 | Blum |
| 2004/0163574 A1 | 8/2004 | Schoenbach |
| 2004/0165015 A1 | 8/2004 | Blum |
| 2004/0217876 A1 | 11/2004 | Blum |
| 2004/0217877 A1 | 11/2004 | Kokonaski et al. |
| 2004/0217952 A1 | 11/2004 | Koyama |
| 2004/0222026 A1 | 11/2004 | Kohn et al. |
| 2004/0224777 A1 | 11/2004 | Smith et al. |
| 2004/0239658 A1 | 12/2004 | Koyama |
| 2005/0057893 A1 | 3/2005 | Homer et al. |
| 2005/0085273 A1 | 4/2005 | Khalid |
| 2005/0105252 A1 | 5/2005 | Tanaka |
| 2005/0134474 A1 | 6/2005 | Kokonaski |
| 2005/0176509 A1 | 8/2005 | Hirato |
| 2005/0195559 A1 | 9/2005 | Lu |
| 2005/0219240 A1 | 10/2005 | Vesely |

| | | | | | | |
|---|---|---|---|---|---|---|
| 2005/0219694 | A1 | 10/2005 | Vesely | GB | 433133 | 8/1935 |
| 2005/0219695 | A1 | 10/2005 | Vesely | GB | 1002508 | 8/1965 |
| 2005/0231008 | A1 | 10/2005 | Jaaska, Jr. | GB | 2 182 242 A | 5/1987 |
| 2005/0248566 | A1 | 11/2005 | Vesely | GB | 2 263 003 A | 7/1993 |
| 2005/0259094 | A1 | 11/2005 | Liu et al. | GB | 2386833 A | 10/2003 |
| 2006/0044149 | A1 | 3/2006 | Blum et al. | GB | 0411142.3 | 5/2004 |
| 2006/0049955 | A1 | 3/2006 | Blum | GB | 0411142.3 | 6/2004 |
| 2006/0055633 | A1 | 3/2006 | Koyama | GB | 2425968 A | 11/2006 |
| 2006/0082536 | A1 | 4/2006 | Koyama | GR | 950100458 | 2/1997 |
| 2006/0087501 | A1 | 4/2006 | Blum et al. | JP | 61180358 A | 8/1986 |
| 2006/0092150 | A1 | 5/2006 | Blum | JP | 04-144532 | 5/1992 |
| 2006/0152483 | A1 | 7/2006 | Blum et al. | JP | 05181437 A | 7/1993 |
| 2006/0188406 | A1 | 8/2006 | Frost, III | JP | 406090891 | 4/1994 |
| 2006/0192683 | A1 | 8/2006 | Blum | JP | 06-189890 | 7/1994 |
| 2006/0221071 | A1 | 10/2006 | Vesely | JP | 6242737 A | 9/1994 |
| 2006/0227085 | A1* | 10/2006 | Boldt et al. ............... 345/83 | JP | 06-299682 | 10/1994 |
| 2006/0227427 | A1 | 10/2006 | Dolgoff | JP | 07008438 A | 1/1995 |
| 2006/0250390 | A1 | 11/2006 | Vesely | JP | 07-036395 | 2/1995 |
| 2006/0262188 | A1 | 11/2006 | Elyada et al. | JP | 07-295739 | 11/1995 |
| 2007/0000849 | A1 | 1/2007 | Lutz et al. | JP | 8-056810 | 3/1996 |
| 2007/0069973 | A1 | 3/2007 | Gerbacia et al. | JP | 08-239988 | 9/1996 |
| 2007/0222633 | A1 | 9/2007 | Blum et al. | JP | 09006249 | 1/1997 |
| 2008/0055105 | A1 | 3/2008 | Blum et al. | JP | 09-006249 | 10/1997 |
| 2008/0230497 | A1 | 9/2008 | Strickland et al. | JP | 10-057728 | 3/1998 |
| 2008/0278408 | A1 | 11/2008 | Strickland et al. | JP | 11-056743 | 3/1999 |

FOREIGN PATENT DOCUMENTS

| | | | | | |
|---|---|---|---|---|---|
| JP | 11-109901 | 4/1999 | | | |
| CA | 2176330 | 11/1997 | JP | 2000-039861 | 2/2000 |
| DE | 3 146 113 A1 | 6/1982 | JP | 2000-105558 | 4/2000 |
| DE | 31 47 113 A1 | 6/1983 | JP | 2002-00059 | 7/2000 |
| DE | G 87 01 817.9 | 4/1987 | JP | 3072047 | 7/2000 |
| DE | 39 23 959 C1 | 10/1990 | JP | 2000-322009 | 11/2000 |
| DE | 39 15 254 A1 | 11/1990 | JP | 2003099155 | 4/2003 |
| DE | 40 06 781 A1 | 9/1991 | JP | 2004-099198 | 4/2004 |
| DE | 41 35 877 A1 | 5/1993 | JP | 04351679 A | 12/2004 |
| DE | 4242258 A1 | 4/1994 | KR | 20010066533 | 7/2001 |
| DE | 298 11 821 | 10/1998 | TW | 0241845 B | 10/2005 |
| DE | 298 15 011 U1 | 12/1998 | UA | 2 182 242 | 5/1987 |
| DE | 200 15 599 U1 | 1/2001 | WO | WO 91/08701 | 6/1991 |
| EP | 0 009 891 A1 | 4/1980 | WO | WO 92/09061 | 5/1992 |
| EP | 0 188 005 A2 | 7/1986 | WO | WO 93/20536 | 10/1993 |
| EP | 0 199 537 A2 | 10/1986 | WO | WO 95/05631 | 2/1995 |
| EP | 0 199 537 B1 | 10/1986 | WO | WO 9910057 A1 | 3/1999 |
| EP | 0 202 846 A1 | 11/1986 | WO | WO 9942186 A1 | 8/1999 |
| EP | 0 353 139 A2 | 1/1990 | WO | WO 00/07811 | 2/2000 |
| EP | 0 354 281 A1 | 2/1990 | WO | WO 00/16682 | 3/2000 |
| EP | 0 359 478 A2 | 3/1990 | WO | WO 00/19871 | 4/2000 |
| EP | 0 365 869 A1 | 5/1990 | WO | WO-00/19871 | 4/2000 |
| EP | 0 374 860 A2 | 6/1990 | WO | WO 00/29209 | 5/2000 |
| EP | 0 421 258 A1 | 4/1991 | WO | WO 00/57393 | 9/2000 |
| EP | 0 448 768 A1 | 10/1991 | WO | WO 00/65980 | 9/2000 |
| EP | 0 448 768 A1 | 10/1992 | WO | WO 01/16995 | 3/2001 |
| EP | 0 512 904 A2 | 11/1992 | WO | WO 01/27909 A1 | 4/2001 |
| EP | 0 514 191 A1 | 11/1992 | WO | WO 01/77746 A1 | 10/2001 |
| EP | 0 554 641 A1 | 8/1993 | WO | WO 02/11110 A1 | 2/2002 |
| EP | 0 573 277 A1 | 12/1993 | WO | WO 02/22972 A1 | 3/2002 |
| EP | 0 624 125 B1 | 11/1994 | WO | WO 02/065451 A1 | 8/2002 |
| EP | 0 624 681 A2 | 11/1994 | WO | WO 02/100094 A3 | 12/2002 |
| EP | 0 648 834 A1 | 4/1995 | WO | WO 03003729 A1 | 1/2003 |
| EP | 0 721 176 A2 | 7/1996 | WO | 2003-203502 | 7/2003 |
| EP | 0 751 213 A1 | 1/1997 | WO | WO 03075238 A1 | 9/2003 |
| EP | 0 794 244 A1 | 9/1997 | WO | WO 03098345 A1 | 11/2003 |
| EP | 0 839 900 A1 | 5/1998 | WO | WO 03103470 A1 | 12/2003 |
| EP | 0 895 745 A1 | 2/1999 | WO | WO 2004036292 A | 4/2004 |
| EP | 0 624 125 B1 | 6/1999 | WO | WO 2004049285 A1 | 6/2004 |
| EP | 0 971 064 A2 | 1/2000 | WO | WO 2004068452 A2 | 8/2004 |
| EP | 1 008 927 | 6/2000 | WO | WO 2004075147 A1 | 9/2004 |
| EP | 1308120 A2 | 5/2003 | WO | WO 2005057527 A2 | 6/2005 |
| EP | 1562159 A1 | 8/2005 | WO | WO 2005072282 A2 | 8/2005 |
| EP | 1580708 A1 | 9/2005 | WO | WO 2005/114623 A1 | 12/2005 |
| FR | 2 532 095 A1 | 2/1984 | WO | WO 2006020637 A1 | 2/2006 |
| GB | 319416 | 9/1929 | WO | WO 2006034483 A1 | 3/2006 |

OTHER PUBLICATIONS

"Floor Graphics" Advertisements

"Displaying a Winning Flow", Michael Kenward, Technology Review, Jan./Feb. 1999, vol. 102, No. 1, 7 pages.

Alpha 215 Series display brochure, "http://www.adaptivedisplays.com".

U.K Patent Office Search Report dated May 23, 2003 (cited in U.S. Appl. No. 10/759,167, filed Jan. 20, 2004).

"Screen Saviors", Michael Matt8is, Business 2.0, Jul. 1999, 1 page (cited in U.S. Appl. No. 11/316,928, filed Dec. 27, 2005).

"What's New", "Intelligent Ink", Advertising Material, Popular, 1 page, no date (cited in U.S. Appl. No. 11/316,928, filed Dec. 27, 2005).

"Electronic Ink", Glen Sanders, ebooknet.com, 2 pages, Sep. 20, 1999 (cited in U.S. Appl. No. 11/316,928, filed Dec. 27, 2005).

MMR Journal, "Floor Decals New Wrinkle in P-O-P Ads", vol. 16, No. 10, p. 13, Apr. 5, 1999 USA (cited in U.S. Appl. No. 11/316,928, filed Dec. 27, 2005).

Philadelphia Enquirer, "Cherry Hill, N.J. Firm Wants You to Look Down on Its Ads", Regional Newspaper, Aug. 27, 1998 USA (cited in U.S. Appl. No. 11/316,928, filed Dec. 27, 2005).

Flexible, Collaborative Organization on a Tabletop; ACM CSCW 2002: Workshop on Co-located Tabletop Collabaration: Technologies and Directions, New Orleans, Louisiana US; Nov. 2002; available at; http://hci.stanford.edu/publications/2002/table_organization/table_organization.pdf on Oct. 4, 2007.

What is Flasma? © 2003; available at http://flasma.com/site8f63.html?pg=1 on Oct. 4, 2007.

Lumisight Table; Interactive View-Dependent Display—Table Surrounded by Multiple Users; © 2004; available at http://www.hc.ic.i.u-tokyo.ac.jp/project/Lumisight/ on Oct. 4, 2007.

Intellimat: what works in digital signage is right at your feet! © 2006; available at http://intellimat.com/index.htm on Oct. 4, 2007.

Sharing and Browsing Media on a Digital Tabletop; 2006; http://alumni.media.mit.edu/~matt/cv/tviews_carpe_03.pdf.

Northrup Grumman; Defining the Future; TouchTable™; © 2007; located at http://www.ms.northropgrumman.com/touchtable/ on Oct. 4, 2007.

Lightspaceplay; Ultimate Interactive Play System; Product Brochcure; 2006; http://www.lightspacecorp.com/products/downloads/LightspacePlay.pdf.

Reactrix; Northing Works Like Brand Play; © 2007; available at http://www.reactrix.com/index.php on Oct. 4, 2007.

International Search Report for International Application No. PCT/US2008/060499, mailed Jul. 14, 2008.

Search Report for corresponding European Application No. 03 77 7576 completed Jun. 20, 2008.

International Search Report dated Aug. 21, 2008, in PCT/US2008/059098.

*Protective Products Advertisement*; Found in related application: U.S. Appl. No. 11/231,772, filed Sep. 22, 2005.

*Sole-Parmer Advertisement*; Found in related application: U.S. Appl. No. 11/231,772, filed Sep. 22, 2005.

3M Clean-Walk Mat., 5800 Series, Technical Data, Jul. 1995; Found in related application: U.S. Appl. No. 11,231,772, filed Sep. 22, 2005.

FLOORanimation; 2002; Found in related application: U.S. Appl. No. 10/413,219, filed Apr. 15, 2003.

* cited by examiner

IIB - IIB

DYNAMIC ELECTRONIC DISPLAY SYSTEM WITH BRIGHTNESS CONTROL

CROSS-REFERENCE TO RELATED APPLICATIONS

This application is a continuation-in-part of commonly owned co-pending application Ser. No. 11/316,928, filed Dec. 27, 2005, which is a continuation of U.S. application Ser. No. 10/454,631, filed Jun. 5, 2003, and issued as U.S. Pat. No. 7,009,523 on Mar. 7, 2006, which claims the benefit under 35 U.S.C. 119(e) of Provisional Application Ser. No. 60/385,579, filed Jun. 5, 2002, and which is a continuation-in-part of application Ser. No. 10/438,923, filed May 16, 2003, and issued as U.S. Pat. No. 6,982,649 on Jan. 3, 2006, which claims the benefit under 35 U.S.C. 119(e) of Provisional Application Ser. No. 60/378,070, filed May 16, 2002, and which is a continuation-in-part of application Ser. No. 10/285,639, filed Nov. 1, 2002, and issued as U.S. Pat. No. 6,873,266 on Mar. 29, 2005, which is a continuation of application Ser. No. 10/137,357, filed May 3, 2002, and issued as U.S. Pat. No. 6,507,285 on Jan. 14, 2003, which is a continuation of application Ser. No. 09/767,846, filed Jan. 24, 2001, and issued as U.S. Pat. No. 6,417,778 on Jul. 9, 2002, which is a continuation of application Ser. No. 09/418,752, filed Oct. 15, 1999, and now abandoned, which is a continuation-in-part of application Ser. No. 09/304,051, filed May 4, 1999, and issued as U.S. Pat. No. 6,219,876 on Apr. 24, 2001. This application is also a continuation-in-part of application Ser. No. 10/804,090, filed Mar. 19, 2004 now abandoned, which claims the benefit under 35 USC 119(e) of Provisional Application Ser. No. 60/457,115, filed Mar. 21, 2003 and of Provisional Application Ser. No. 60/460,353 filed Apr. 3, 2003, and which is a continuation-in-part of application Ser. No. 10/682,435, filed Oct. 10, 2003, and issued as U.S. Pat. No. 6,917,301 on Jul. 12, 2005, which claims the benefit under 35 U.S.C. 119(e) of Provisional Applications identified as follows: Ser. No. 60/418,626, filed Oct. 12, 2002; Ser. No. 60/428,387, filed Nov. 21, 2002; and Ser. No. 60/429,044, filed Nov. 23, 2002; and which is a continuation-in-part of application Ser. No. 10/438,923, previously identified. This application is also a continuation-in-part of application Ser. No. 10/759,167, filed Jan. 20, 2004, and issued as U.S. Pat. No. 7,205,903 on Apr. 17, 2007, which claims the benefit under 35 U.S.C. 119(e) of Provisional Application Ser. No. 60/441,408, filed Jan. 22, 2003, and which is a continuation-in-part of co-pending application Ser. No. 10/682,435, previously identified. This application is also a continuation-in-part of application Ser. No. 11/199,130, filed Aug. 9, 2005, issued as U.S. Pat. No. 7,358,861 on Apr. 15, 2008, which claims the benefit under 35 U.S.C. 119(e) of Provisional Application Ser. No. 60/599,878, filed Aug. 10, 2004, and which is a continuation-in-part of application Ser. No. 11/002,276, filed Dec. 3, 2004, and issued as U.S. Pat. No. 7,145,469 on Dec. 5, 2006, which claims the benefit under 35 U.S.C. 119(e) of Provisional Application Ser. No. 60/526,271, filed Dec. 3, 2003, and which is a continuation-in-part of co-pending application Ser. No. 10/454,631, previously identified. Application Ser. No. 11/298,668, filed Dec. 12, 2005, and application Ser. No. 11/368,472, filed Mar. 7, 2006 are fully incorporated herein by reference, as well as all other above-identified applications. This application claims the benefit of the respective earlier filing dates of application Ser. No. 10/804,090, filed Mar. 19, 2004; application Ser. No. 10/759,167, filed Jan. 20, 2004; application Ser. No. 11/199,130, filed Aug. 9, 2005; and application Ser. No. 11/316,928, filed Dec. 27, 2005.

BACKGROUND OF THE INVENTION

Advertising and other kinds of messaging are typically presented in forms that use "vertical space"; that is, billboards, walls, ceiling-mounted displays, and the like. On the other hand, one kind of space that has great potential for advertising and messaging, but has been largely overlooked, is floor space, which may be characterized as "horizontal space."

Floor mats are generally used in horizontal space. However, if a floor mat is utilized in an outdoor environment, such as an outdoor porch, or in an indoor environment that is adjacent to or near an outdoor entrance, such as an entry foyer of a home or business, the mat is likely to become wet and therefore not effective. The mat could become wet from, for example, the moisture in the atmosphere or from moisture carried on the soles of the person's shoes who steps on the mat. Additionally, if the mat surface becomes wet it may become slippery and thus cause a hazard for the person who steps on it.

Additional drawbacks with known floor mats exist that are directed to issues of customization for a particular purchaser and a lack of additional cleaning properties. A floor mat may be the first object that a visitor to a particular home or business encounters. As such, the owner of the home or business may want to utilize the floor mat to graphically convey an initial greeting or message to the visitor. Whereas floor mats are known that may include a greeting on them, it is not currently known to allow for a particular purchaser to customize the displayed graphic so that the message is tailored to convey a particular message desired by the purchaser. For example, on Halloween the purchaser may want the floor mat to display a "Happy Halloween" message. In another situation, the purchaser may want to greet a particular visitor with a message such as "Hello, Joe". Currently, it is not known to provide a floor mat where an individual can customize the floor mat to display a particular message that they want to convey and in certain circumstances even change the floor mat's message they want to convey.

There have been efforts to exploit floor space for advertising. Adhesive (i.e., "stick-on") floor decals are known. Such decals may include a colorful image and convey some kind of advertising message, such as "Drink Coke". Such an advertising medium is limited, however, by the fact that the message is static and not easily changed. On the other hand, U.S. Pat. No. 6,417,778, which is fully incorporated herein by reference, describes a modifiable electronic display associated with a floor that enables images and text to be easily changed, allowing an advertising message to be quickly adaptable and efficiently targeted toward desired customers.

However, there remain challenges to effectively and efficiently communicate to an audience by displaying visual advertising or messaging on the floor or ground. Among these challenges is how to orient the content of a display for easy viewing and comprehension. In vertical space, by contrast, challenges relating to image orientation are not usually presented. For example, when a person views a computer monitor or television set, the image displayed is almost always "right side up" from the perspective of the viewer, since people, for the most part, orient themselves with their feet on the ground and their heads in the air. Thus, similarly, images in advertising and messaging in vertical space are almost always right side up with respect to a viewer.

On the other hand, when an image is in horizontal space, problems relating to the orientation of the image may be presented. For example, an image that is on a floor and coplanar with the floor may be approached or viewed from any number of different directions. Depending on the direction of approach of a viewer, the image may be right side up, upside down, sideways, or otherwise skewed in any direction from the perspective of the viewer. More specifically, suppose an image on the floor is oriented to be easily seen and understood by viewers walking north (e.g., right side up with respect to these viewers). This image will be upside down and therefore largely unintelligible to viewers walking south. Similarly, suppose an image on the floor is oriented to be right side up to viewers walking west—the same image will be upside down to viewers walking east.

Such considerations may be further complicated by observing how differences in language affect image presentation. For example, although English text is read from left to right and top to bottom, in that order, in Asian languages such as Japanese, text is read from top to bottom in columns in a left-to-right progression of columns. In Israel text is read from right to left. Interactive features in a floor display system may increase its usefulness and commercial appeal. U.S. application Ser. No. 10/438,923 by Blum et al., filed May 16, 2003, for example, describes a floor display system including a number of interactive features for use in various commercial or other public applications. The present disclosure relates to a number of advantageous improvements and enhancements to such a floor display system.

BRIEF DESCRIPTION OF THE DRAWINGS

The objects and advantages of the invention will now be described in further detail with reference to the schematic drawings, in which.

DETAILED DESCRIPTION

Figure 1:
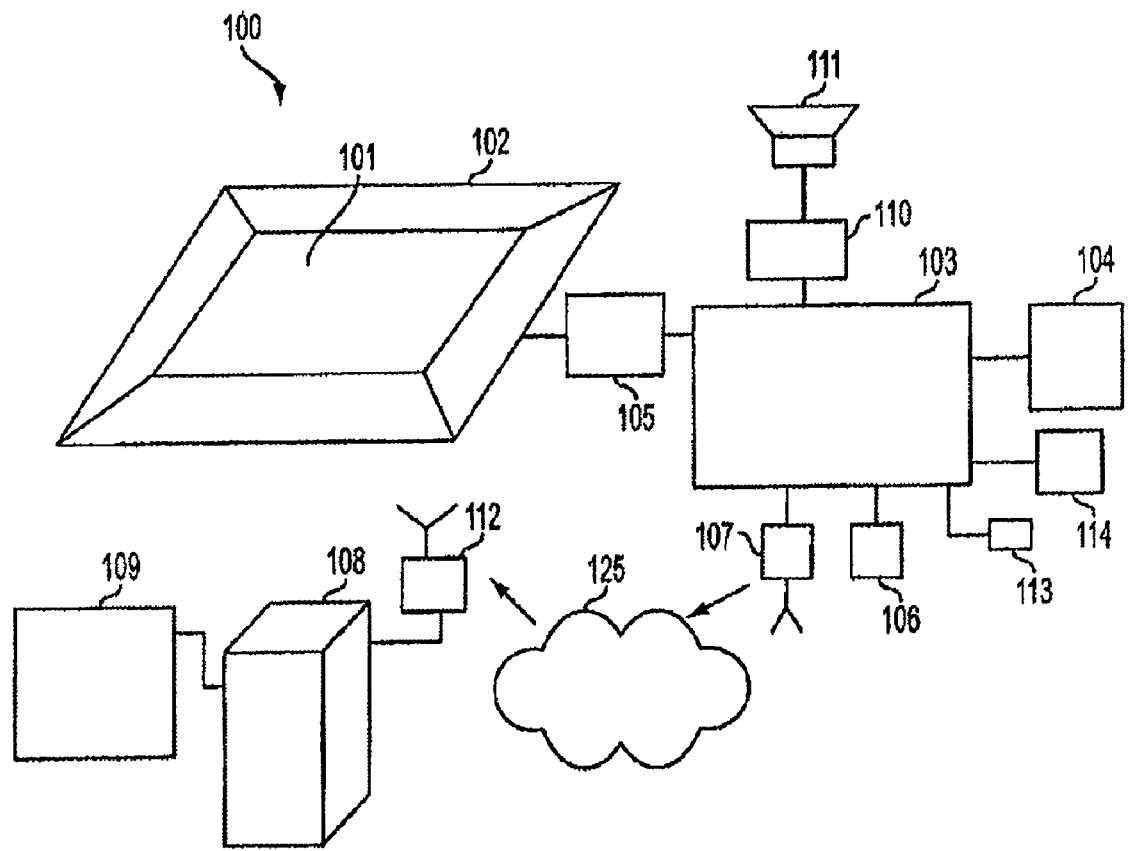
FIG. 1 shows a floor display system according to embodiments of the present invention.

Embodiments of the present invention relate to a floor display system with among other features variable image orientation. More specifically, an image displayed by the floor display system may be oriented and/or reoriented depending on the perspective of viewers, in order to make the image more easily seen and understood. To orient and/or re-orient the image, the image may be rotated or otherwise moved or shifted.

The floor display system may be arranged in a public place, such as a commercial establishment or other public building, and be configured to display electronically modifiable arbitrary content, such as advertising or other informational content. In embodiments, the floor display system may be configured to detect an indication of the presence or activity of a person in the vicinity, and upon detecting the indication, perform a corresponding action in response. For example, upon detecting the indication of the presence of a person, the floor display system may generate a predetermined display in response. The floor display system may further produce some predetermined audio output in response to detecting a person. For example, the floor display system may be arranged near shelving storing products for sale, and display advertising and promotional content relating to the products. In addition to variable image orientation, the floor display system may include the features of: brightness control; networked data distribution and management; interactivity; image-enhancing optics; controlled audio; a protective covering; an anti-slip feature; fragrance technology; theft prevention; deployment in a track-and-trench system; specialized positioning mechanisms; and lightweight, flexible implementations. These and other advantageous embodiments of the present invention are described in more detail in the following.

More specifically, the floor display system comprises a floor covering and an electronic display device associated with the floor covering. The electronic display device is able to display electronically modifiable arbitrary content. The floor display system further comprises a controller and a sensing device coupled to the controller. The sensing device is associated with a specific location on the display device and generates a signal to the controller to cause a content of a display of the display device to be modified or newly generated at the specific location. This enables eye-catching effects to be created on the display device, as described in more detail below, and consequently enhances the usefulness and commercial appeal of the floor display system.

As noted above, U.S. Pat. No. 6,417,778 discloses a system for electronically conveying information via a floor display. More specifically, the floor display may incorporate a modifiable electronic display surface presenting for example, a liquid crystal display. The display could be connected to a computer and a computer generated image could be displayed on the display. Thus, the image displayed on the display could be modified by generating a different computer image and displaying that computer image on the display. The display could be associated with a base portion of a floor covering, such as included within a recess thereof, or could be included on a bottom surface, facing upward, of an insert portion of the floor covering. Alternatively, the display could be integrally formed with either of the base portion or the insert portion. The modifiable display could utilize a plurality of different graphics that can be displayed in any of a variety of manners on the display. For example, the graphics could be displayed in a generally fixed position on the display or could scroll across the display, with both exemplary methodologies displaying multiple graphics either individually or in combination.

Other alternatives for modifying graphics displayed on the floor covering include using light emitting polymers to create, and thus change, the graphics. The light emitting polymers can be either applied to, attached to, or woven into the floor covering. The light emitting polymers may be utilized on any portion of floor covering, for example, on either the base portion or the insert portion, or on any other portion of the different embodiments for the floor covering. Light emitting polymers are known and described in U.S. Pat. Nos. 5,945, 502, 5,869,350, and 5,571,626, which are incorporated herein by reference in their entirety. Other options for a display are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

According to embodiments of the present invention, additional or alternative technologies to those described above may be used to implement a floor display system. "Floor" as used herein means floor, ground, or any surfaces thereof including concrete, asphalt, carpeting, wood, linoleum, tile, rubber, vinyl and the like. A floor display system 100 according to embodiments of the present invention is shown in FIG. 1. The floor display system 100 includes an electronic display device 101 associated with a floor covering 102. More specifically, the display device 101 may be at least partly connected to, supported by, received within or otherwise associated with the floor covering 102. The floor covering 102 and associated electronic display device 101 may take many structural forms and be constructed from various types of materials, and are not limited to the specific forms illustrated herein. In embodiments, the floor covering 102 and electronic display device 101 are designed to be used in places where there is foot traffic or other (for example, wheeled shopping cart) traffic. Accordingly, the floor covering and electronic display device may be sturdy and durable enough that they may be repeatedly stepped on, walked over, or have a wheeled shopping cart or other rolling or sliding object traverse them, with negligible adverse effect on the floor covering and display device. The electronic display device may have, for example, a sturdy protective covering that is transparent or semi-transparent to allow the electronic display device to be viewed therethrough, and that protects the electronic display device from damage associated with foot or other traffic, such as scratches, cracks, chips, tears, or damage caused by environmental dirt. The floor covering 102 may be affixed to a floor or may be portable so that it can be easily moved to different places.

Figure 2A:
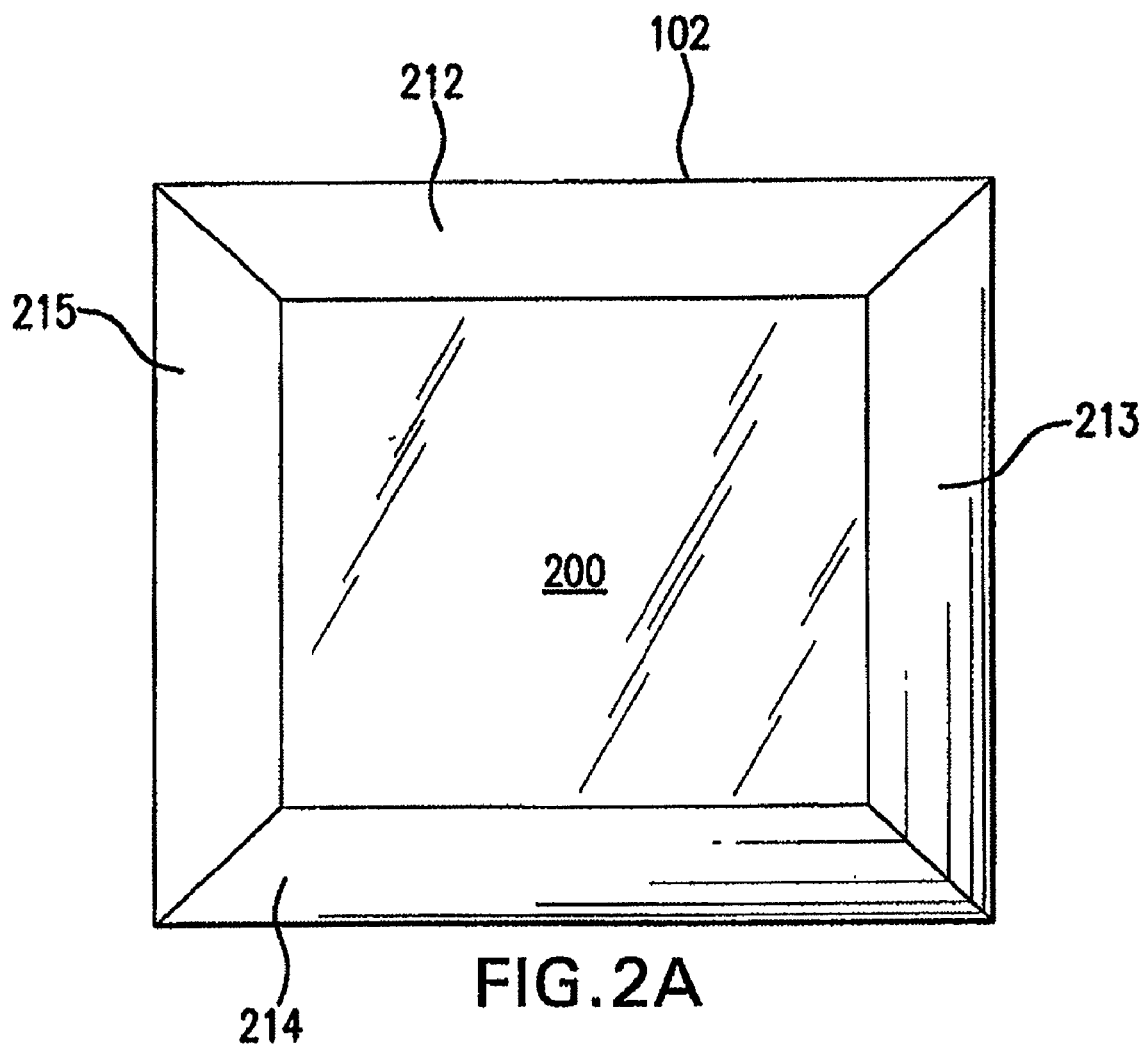
FIGS. 2A-2E illustrate details of a floor covering of the floor display system.
Figure 2B:
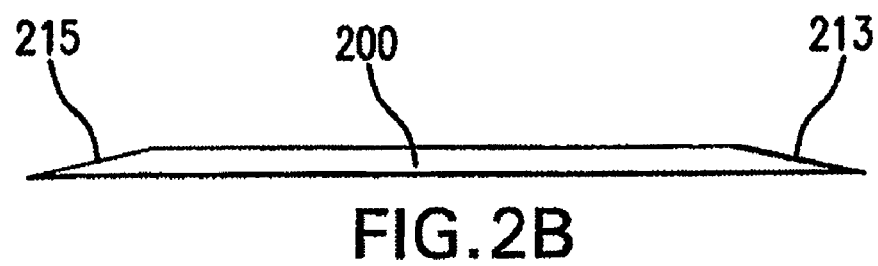

FIGS. 2A and 2B are a top or plan view, and a side orthogonal or elevation view, respectively, of the floor covering 102. As shown in FIGS. 2A and 2B, the floor covering 102 could comprise at least one inclined surface. More specifically, the floor covering 102 could comprise a plurality of inclined surfaces 212, 213, 214 and 215 that slope downward and away from a top surface 200 (which could be the surface of a protective covering of the display device 101, as described above) so that the entire perimeter of the floor covering presents an inclined surface to a person approaching the floor covering. Such a structure may make the floor covering easier to cross over, either by a person walking over the floor covering, or by a wheeled shopping cart, for example, if the floor covering is placed in the aisles of a commercial establishment. According to embodiments, at least a portion of the display device 101 could be arranged to be coplanar with one or more of the inclined surfaces of the floor covering. This could make a display of the display device easier to view for a person at a distance from or approaching the floor covering, since the display would be slightly elevated.

Figure 2C:
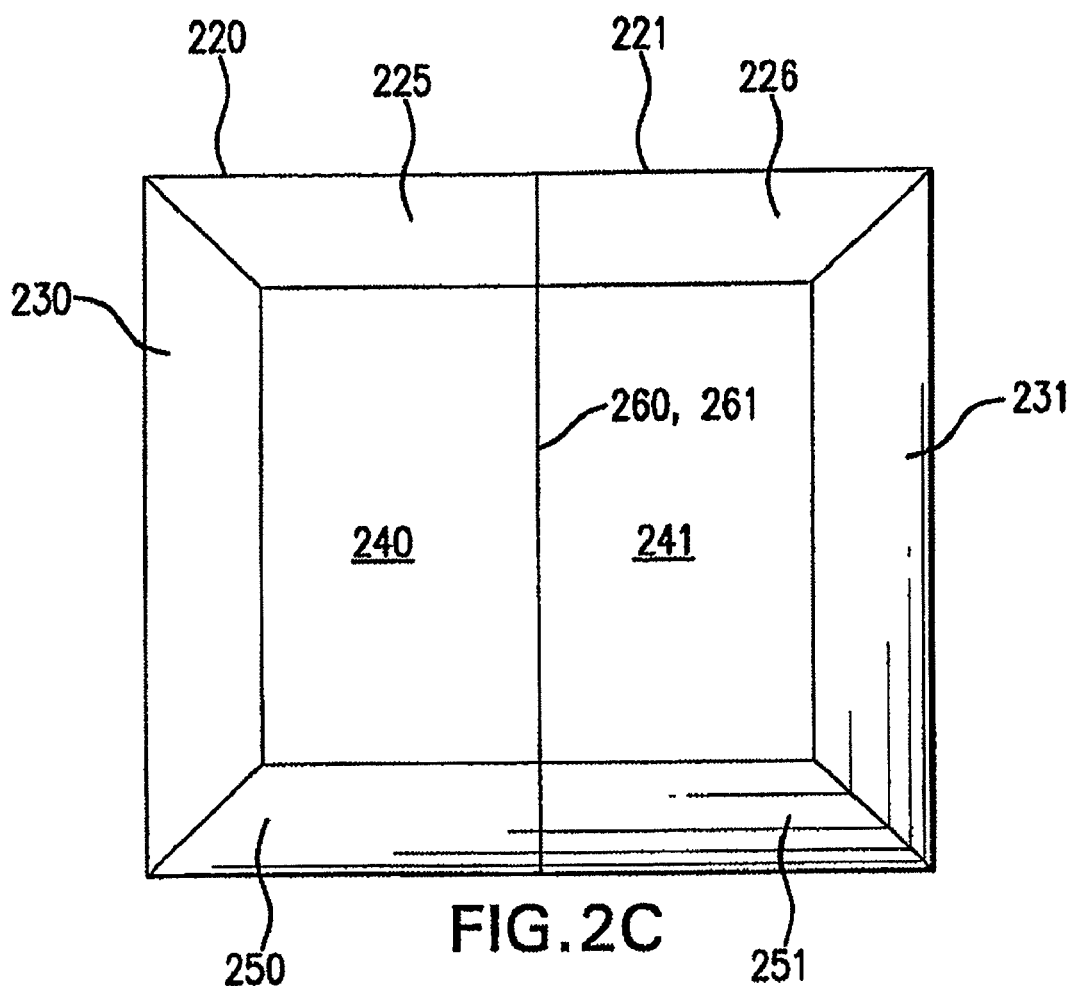
Figure 2D:
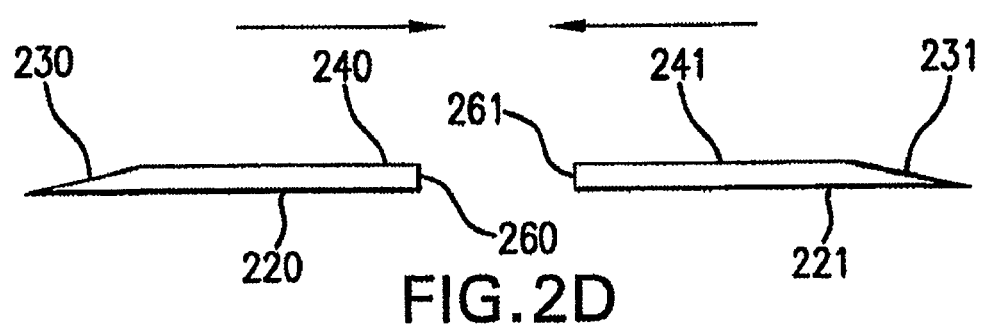
Figure 2E:
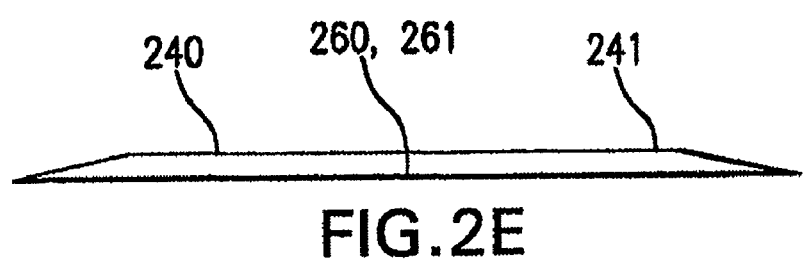

FIGS. 2C and 2E show one alternative way of implementing a floor covering according to embodiments of the invention. A two-part structure is illustrated in FIGS. 2C and 2E. The two-part structure comprises separate, substantially identical components 220 and 221. Component 220 has a top surface 240 and inclined surfaces 225, 230 and 250. Component 221 has a top surface 241 and inclined surfaces 226, 231 and 251. Each component 220, 221 could be used independently in a floor display system. However, as shown in FIGS. 2D and 2E, the two components may be joined along respective edges 260, 261 thereof to form a composite structure having inclined surfaces all around its perimeter, to facilitate crossing over the composite structure more easily. FIGS. 2C and 2D illustrate that embodiments of the invention may further comprise a flexible or compressible border member 220. The border member 220 may be arranged to abut edges of the inclined surfaces 212, 213, 214 and 215. For example, as shown in cross-sectional view FIG. 2D, the border member 1430 may abut an edge 221 of inclined surface 215. By providing a yielding surface, the border member may cause a less abrupt transition from the floor to the floor covering 102 to be perceived by a person traversing the floor covering. The border member could be made from material such as, by way of example only, metal, wood, plastic, natural rubber, silicon rubber, foam rubber, or urethanes.

Referring now to FIG. 1, the electronic display device 101 associated with the floor covering 102 may be configured to electronically display graphical images and alphanumeric data in either a static (not moving or changing) or dynamic (e.g., scrolling or otherwise moving or changing) format. More specifically, the electronic display device 101 may be coupled by wired or wireless means to a controller 103 and modifiable via the controller 103 to display any content chosen by a user. For example, as shown in FIG. 1, the electronic display device 101 may be coupled to the controller 103 via a display driver circuit such as a video graphics adapter card 105. The controller 103 may include any kind of electronic logic circuit, for example, a general microprocessor configurable with software, or an ASIC (application specific integrated circuit). The driver 105 of the electronic display device may be integrated with the controller 103 or built into an ASIC. The controller may also be in the form of a single board computer with a processor and memory and with one or more display driving circuits built onto the board, as well as wireless components for communicating with the outside world or for loading data into memory. The controller (not shown) such as controller 103 (see FIG. 1) might be constructed to be small or thin enough to be held within the borders of the floor covering 102 and among the components shown in FIG. 2.

It should be understood that embodiments of the present invention are not limited to the components, or forms thereof, of the system illustrated in FIG. 2. For example, the transparent member 260 need not include support ribs, nor need the display device 240 include four panels; more or fewer panels are possible.

Figure 3:
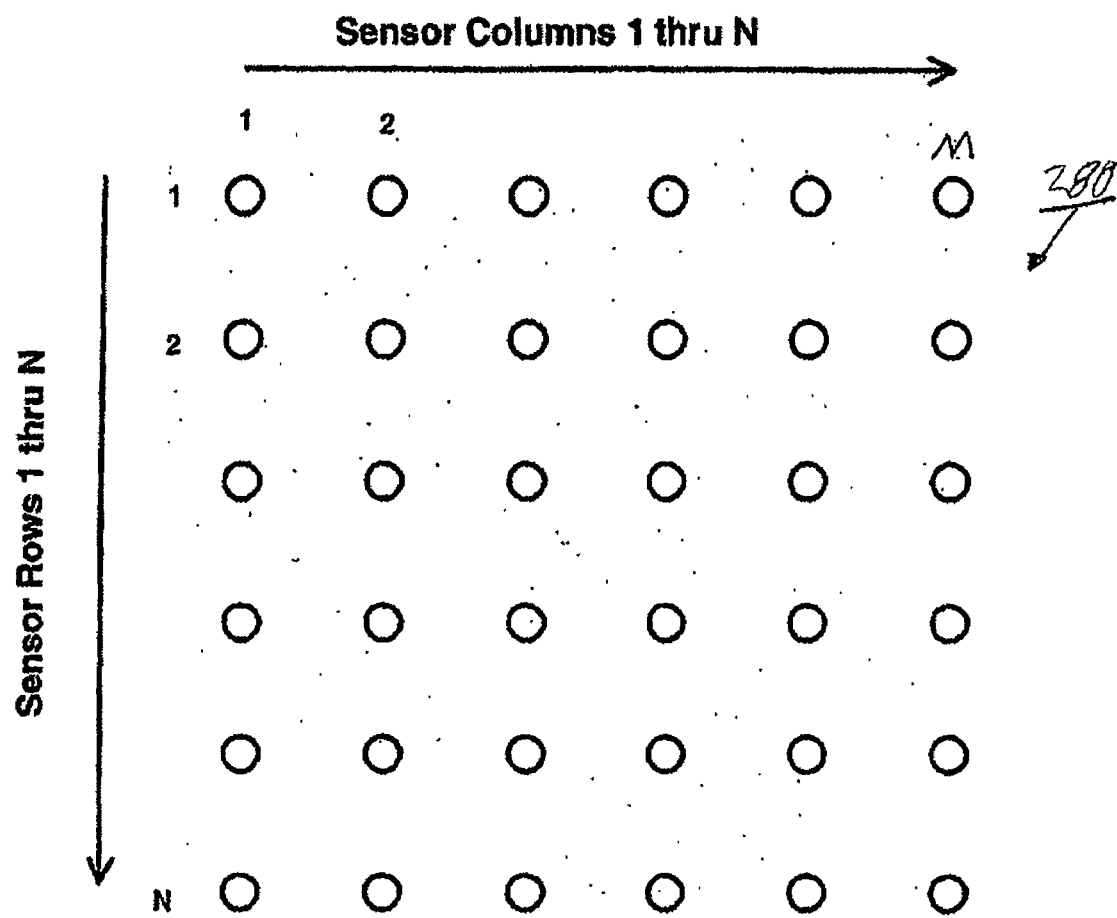
FIG. 3 shows an example of an array of sensing devices according to embodiments of the present invention.

According to embodiments of the present invention, a plurality of sensing devices 280 may be included in the floor display system 100. For example, the plurality of sensing devices could be arranged below the transparent member 260. Additionally or alternatively, the plurality of sensing devices could be arranged above, in or on the transparent member 260. FIG. 3 shows a plan view of the sensing devices 280. The sensing devices may be arranged, by way of example only, in an array comprising N rows and M columns. In embodiments, the array could be a square array where N=M.

Each sensing device could be associated with a particular location on the display device 240. For example, each sensing device could be identified by a coordinate pair, such as (3, 2), identifying the sensing device in the third row and second column. Each coordinate pair would further correspond to a location on a display area of the display device 240. Based on a signal generated by a sensing device(s), a corresponding display area of the display device could be caused to display a desired content. For example, a previous content could be modified and/or new content generated based on a signal from a sensing device. More specifically, the sensing devices 280 could be coupled to the controller 103. Based on signals received from a sensing device(s), the controller could execute logic to cause desired content to be displayed at a location or locations on a display area of the display device corresponding to the sensing device(s) from which signals are received.

The sensing devices could, in particular, be capable of sensing the presence of an object on, near or above the display device. To this end, the sensing devices 280 could include, by way of example only, devices responsive to light. These include any or all of photo detectors, photo diodes, and photo transistors. Such devices are responsive to a change in an amount of ambient light, and may be made to generate corresponding output signals in response to a decrease or increase in the amount of ambient light. These signals may be input to a controller as described above. Thus, the floor display system 100 could be configured to generate content at specific locations in response to a person stepping on or walking across the floor display system by causing sensing devices corresponding to the specific locations to generate signals in response to the stepping or walking. More specifically, because the stepping or walking will block light input to the sensing devices, the sensing devices will register a decrease in light and may be caused to generate corresponding signals to the controller. Based on the signals, the controller may generate desired content at locations corresponding to the sensing devices that generate the signals. The content, for example, could be an eye-catching image such as ripples that track the movement of a person's feet. Objects that could be tracked by the sensing devices, however, are not limited to feet. For example, an object such as a ball could be rolled across the floor display system, and a series of images generated in response that shows the path of the ball.

Pressure-sensing devices or temperature-sensing devices could also be used to detect and track objects on the floor display system using operations similar to the operations involving the light-responsive devices as described above. The pressure-sensing devices, temperature-sensing devices and light-responsive devices could each be used solely or in combination with one or more other types of sensing devices. While the sensing devices may be arranged below the transparent member, they need not be. They could be on an upper surface of the transparent member or embedded within the transparent member. For example, the transparent member could be machined or fabricated to receive a sensing device array therein in such a way that the sensing device array is protected but can sense changes in light and/or pressure and/or temperature.

In embodiments, the light-responsive devices could be passive devices that receive light energy from ambient light and register changes in the amount of light energy received. A baseline level of light energy may be determined based on an average of light energy received by a plurality of sensing devices, and all of the plurality of the sensing devices may be calibrated based on this baseline level. On the other hand, individual sensing devices could be calibrated based on different respective baseline light energy levels. The sensing devices could be calibrated so when there was a change the baseline level of light energy, for example due to some object blocking incident light energy, they would output a signal that is received by the controller. In response, the controller could cause desired content to be displayed. To discourage spurious signals from the sensing devices, the sensing devices could be arranged in a recess to ensure that most incident light energy is received from a desired direction. In alternative embodiments, the sensing devices could be active sensing devices that emit electromagnetic energy such as light or other radiation, and generate signals based on whether the emitted light energy is reflected or interrupted. Embodiments could include both passive and active sensing devices.

Figure 4:
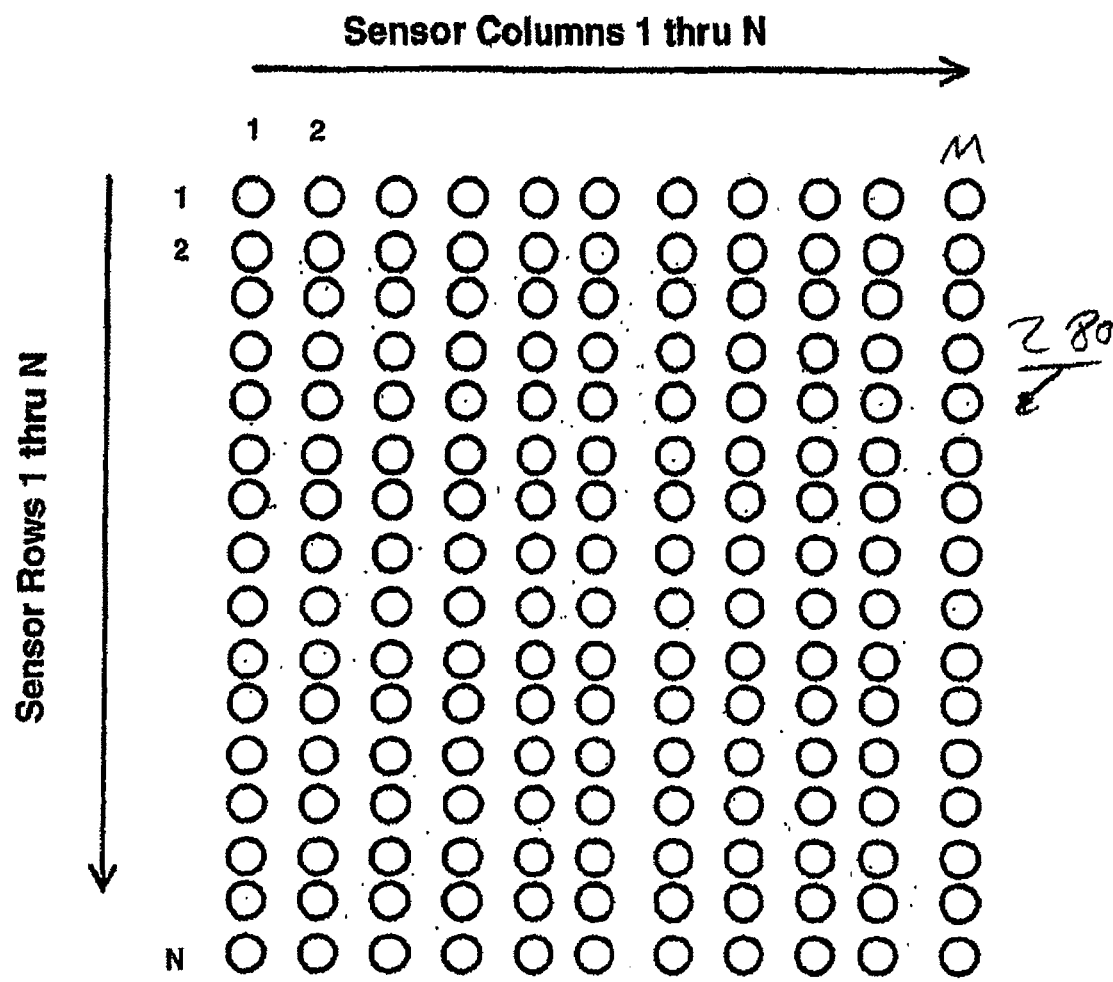
FIG. 4 shows another example of an array of sensing devices according to embodiments of the present invention.

The sensing devices could be arranged in any desired way, and need not form a regular pattern. For example, the sensing devices could be spaced to achieve a desired resolution. To detect comparatively small objects on or near the floor display system, the sensing devices could be comparatively close together and comparatively more numerous to yield a comparatively fine resolution. On the other hand, to detect comparatively large objects, the sensing devices could be comparatively far apart and comparatively less numerous to yield a comparatively coarse resolution. In a given floor display system, there could be an arrangement of sensing devices in a mixture of comparatively fine resolution and comparatively coarse resolution. FIG. 4 shows an example of a sensing device array with finer resolution than the array in FIG. 3. In embodiments, sensing devices could be arranged with a comparatively fine resolution on or near the edges of a floor display system. Such an arrangement could be effective to produce eye-catching effects, such as a display of a ripple in a pool of water beginning as a person's shoe approaches an edge of the floor display system and conforming to the shape of the shoe near the edge.

Figure 5:
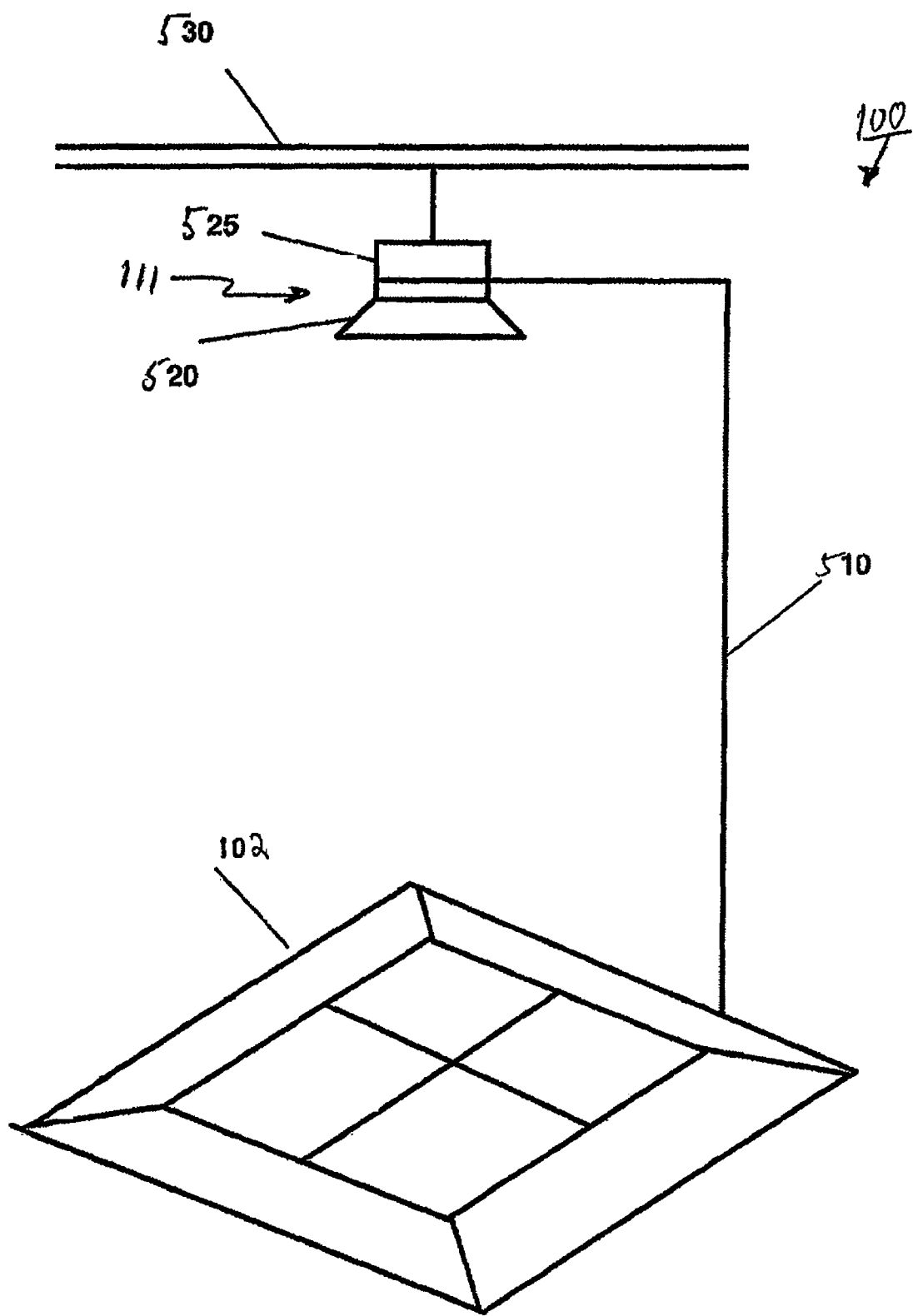
FIGS. 5 and 6 show a floor display system including an audio device according to embodiments of the present invention.
Figure 6:
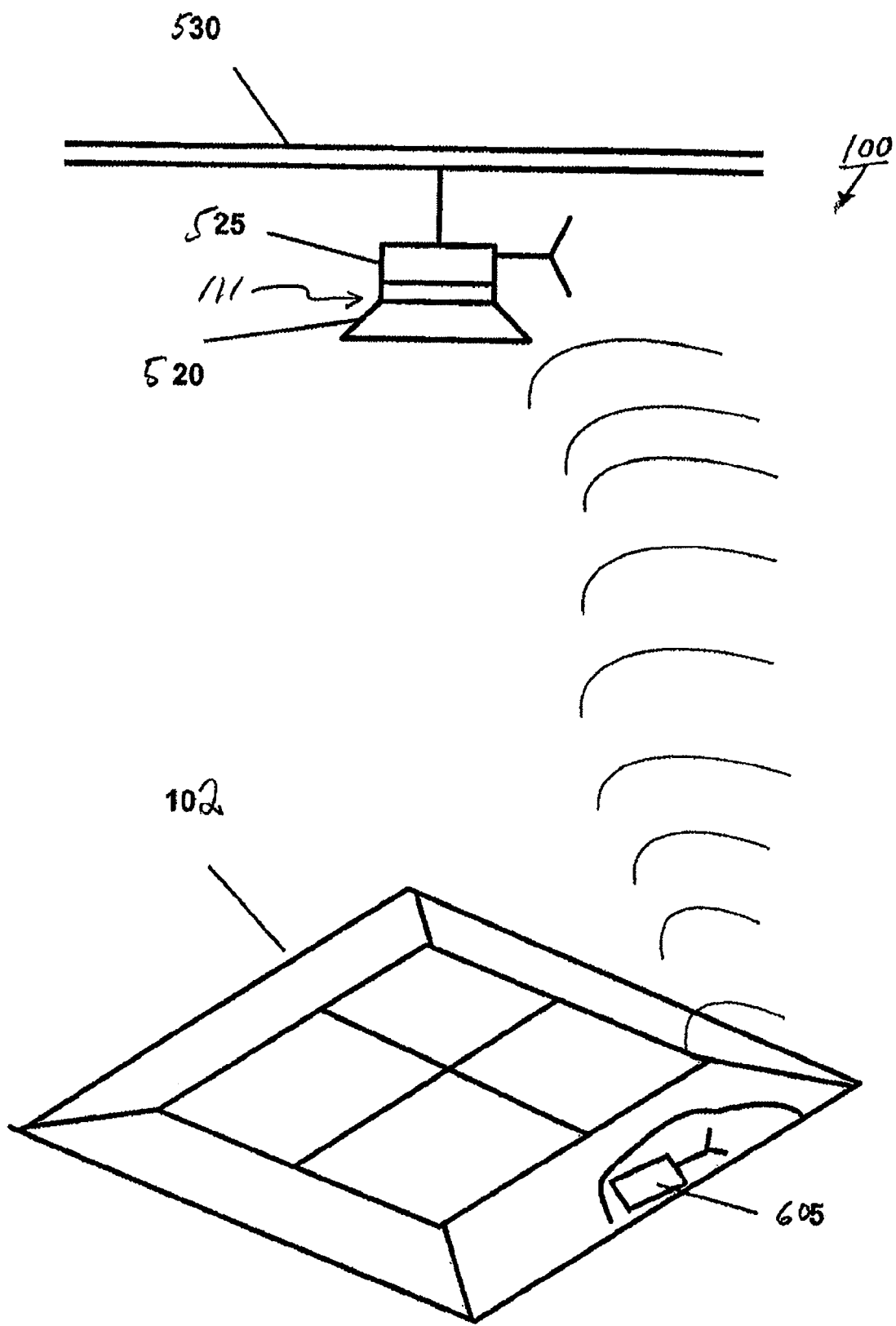

As noted with reference to FIG. 1, the floor display system 100 may include an audio device 111. FIG. 5 shows an embodiment of the present invention wherein the audio device 111 is suspended by a support 530 above or otherwise in the vicinity of the floor display system. The audio device 111 may include a loudspeaker 520 and a receiver 525. The audio device may be coupled by a wired connection 510 to the controller 103 of the floor display system 100. The audio device may include an amplifier (not shown) to amplify signals received from the controller via the wired connection. The audio device may be configured to generate audio output under the control of the controller in response to signals generated by sensing devices in the floor display system as described above. According to embodiments, the speaker 520 could be a directional speaker such as the Dual-Parabolic™ speakers produced by Soundtube™. Use of such a directional speaker could enable sound to be confined to a desired area. The controller 103 could control the volume and frequency range of the output of the speaker to minimize the effect of reflected sound. As shown in FIG. 6, in embodiments the controller 103 could be coupled to the audio device 111 wirelessly via transmissions from a transmitter 605 of the floor display system. The transmitter 605 could be, for example, arranged below a surface of the floor covering 102. An amplifier of the audio device may amplify a signal received from the transmitter.

Figure 7A:
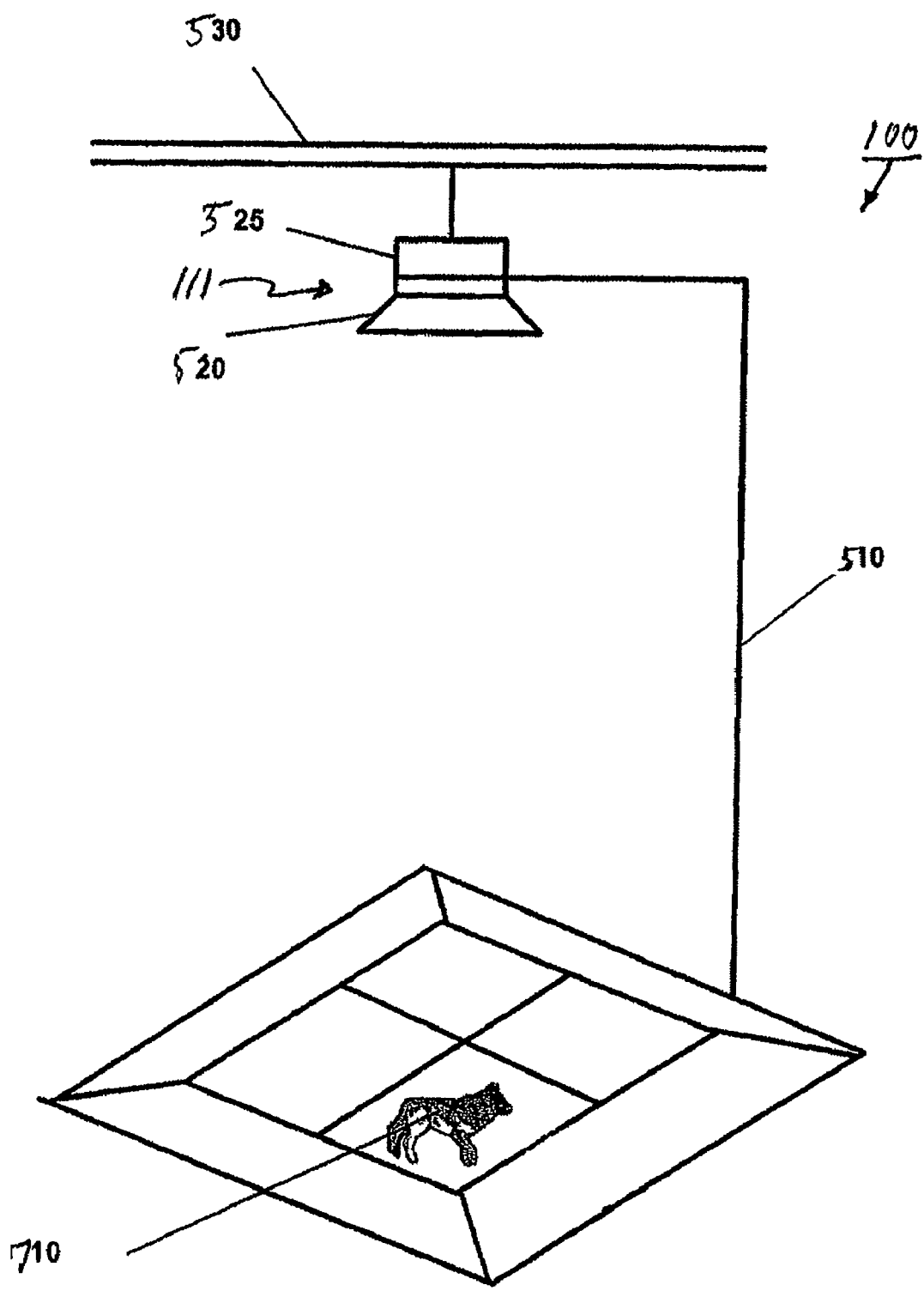
FIGS. 7A-7C show an example of an operation of a floor display system according to embodiments of the present invention.
Figure 7B:
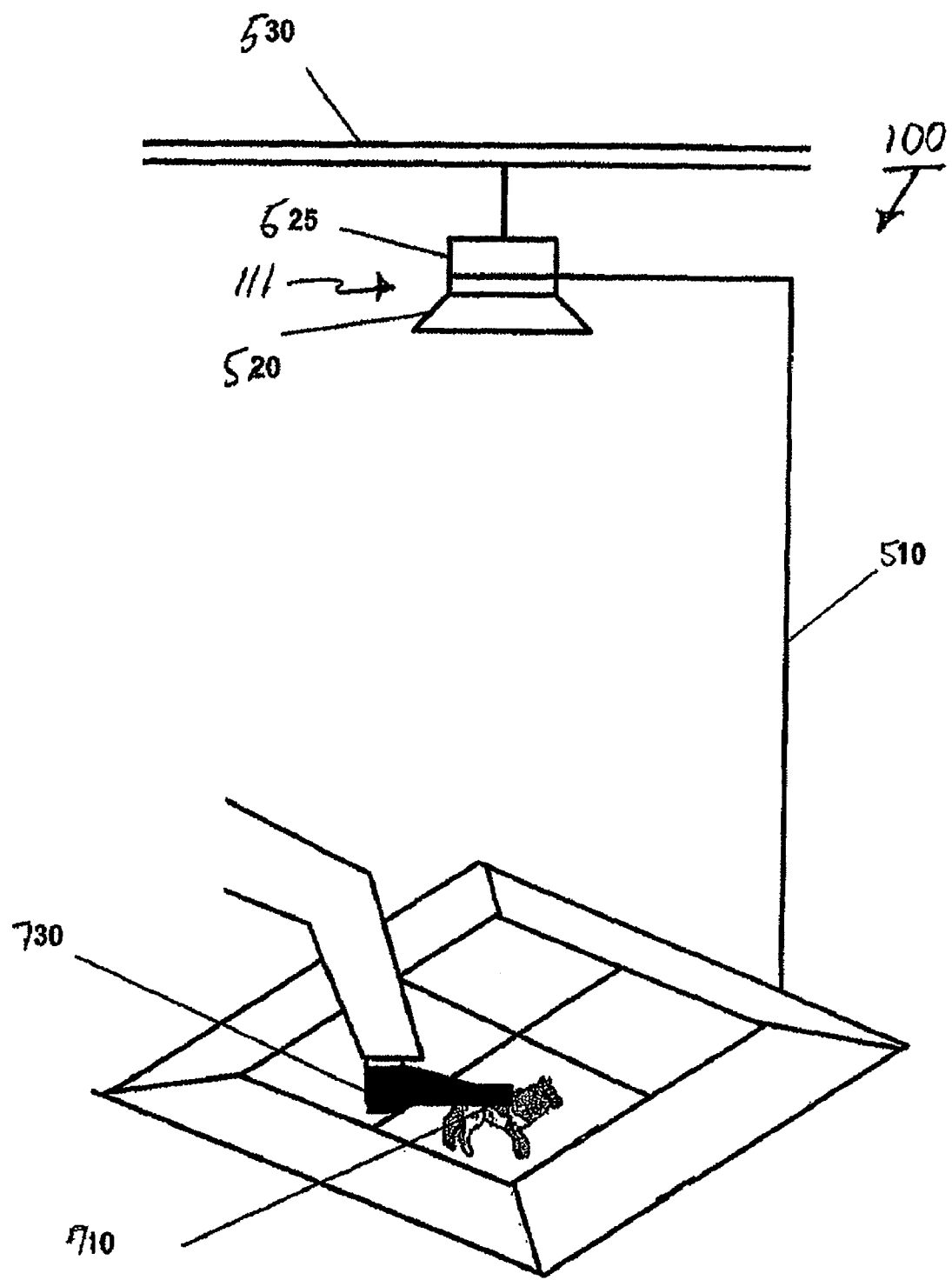
Figure 7C:
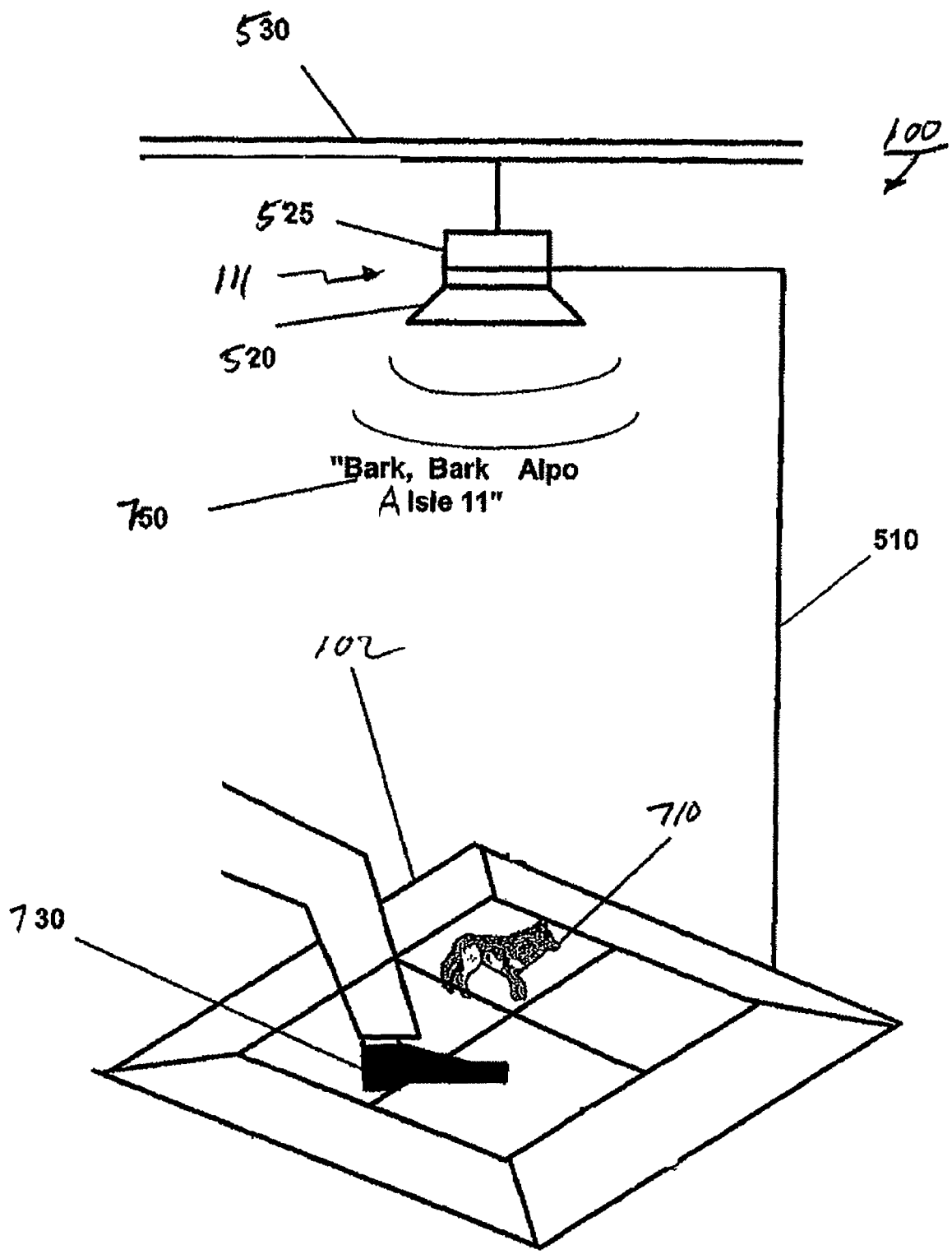

The audio device could be configured to generate audio output corresponding to a display of the floor display system. An example is shown in FIGS. 7A-7C. In FIG. 7A, an image 710 of a dog is displayed on the floor display system. In response to a person's foot 730 stepping on or passing over the image of the dog as shown in FIG. 7B, the audio device might, for example, be caused to emit a barking sound. In combination with the barking sound, the image of the dog might be caused to appear to run to another location on the display of the floor display system, as shown in FIG. 7C. A related audio output 750 such as an advertising message could further be emitted by the audio device as shown in FIG. 7C. For example, along with the barking sound, a location of dog food in a store could be announced, as in "ALPO—aisle 11".

Figure 8:
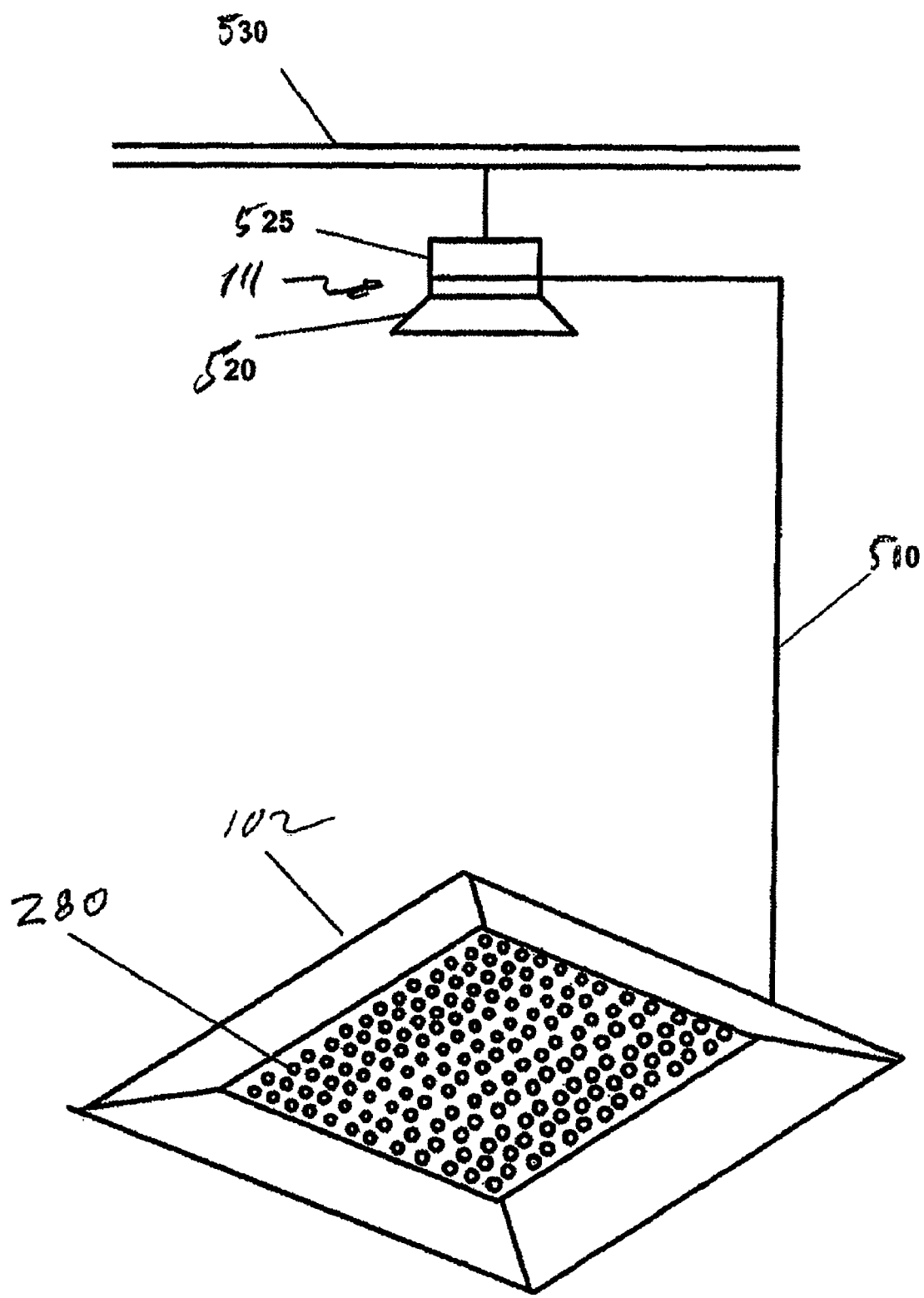
FIG. 8 shows a floor display system according to embodiments of the present invention wherein a transparent member thereof does not include support ribs.
Figure 9:
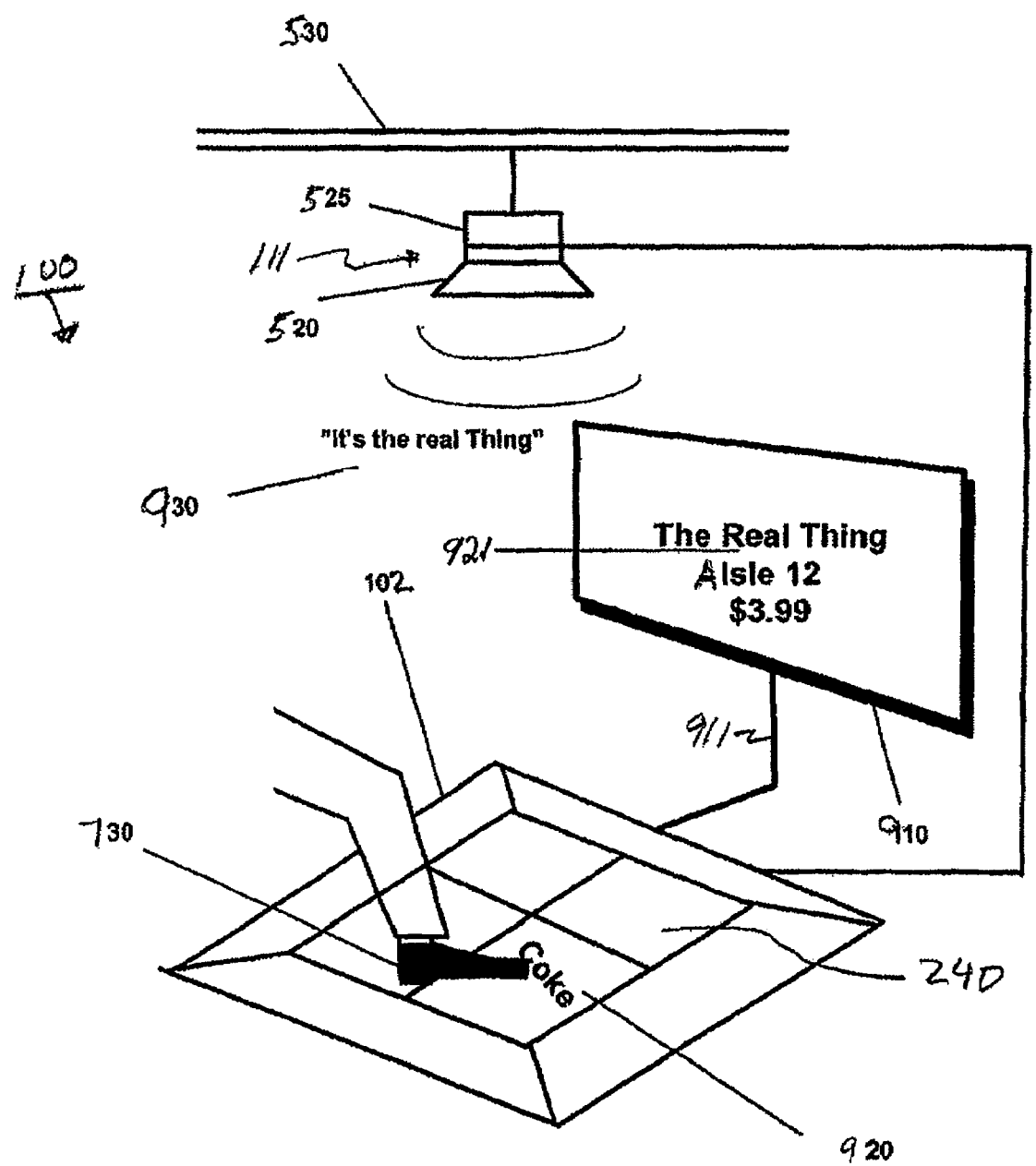
FIG. 9 shows a floor display system including a substantially vertical or inclined display device according to embodiments of the present invention.

FIG. 8 shows an embodiment of the floor display system comprising an array of sensing devices 280 wherein the transparent member does not include support ribs. In still further embodiments of the present invention, the floor display system 100 may comprise a display that is substantially vertical or inclined. An example is shown in FIG. 9. In FIG. 9, a substantially vertical or inclined display device 910 is included with the floor display system 100. For example, the substantially vertical or inclined display device 910 could be an electronic device coupled by a wired connection 911 or wirelessly (not shown) to the controller of the floor display system. The substantially vertical or inclined display device 910 could incorporate any of the display technologies disclosed herein or otherwise suitable. The substantially vertical or inclined display device 910 could, for example, be a projection device that projects an image onto a surface from distance.

Figure 10A:
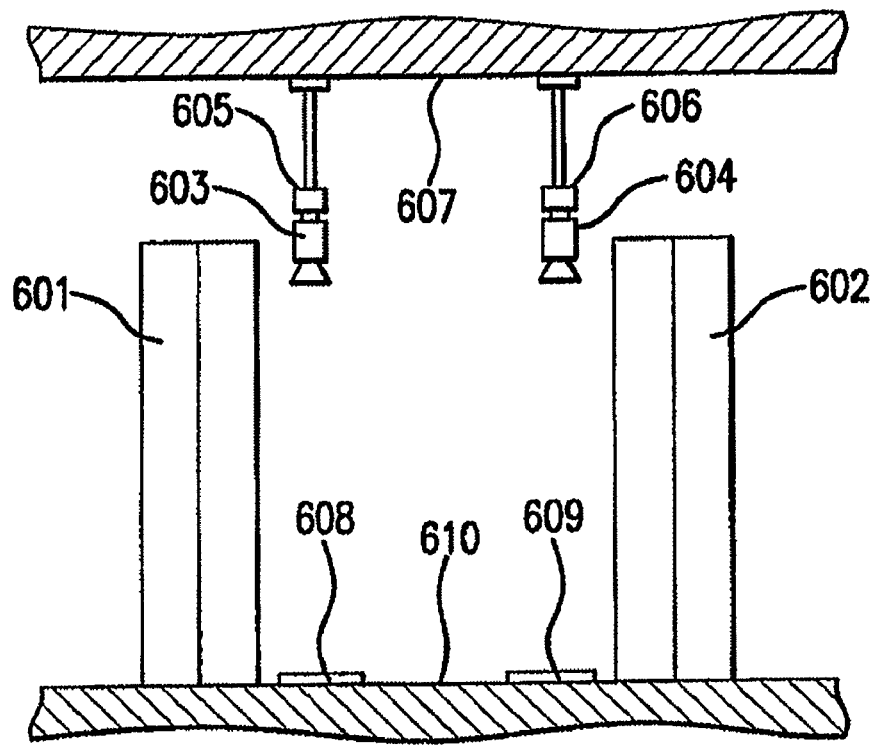
FIGS. 10A-10C show a floor display system wherein an image is projected by an image projection device onto a floor covering.
Figure 10B:
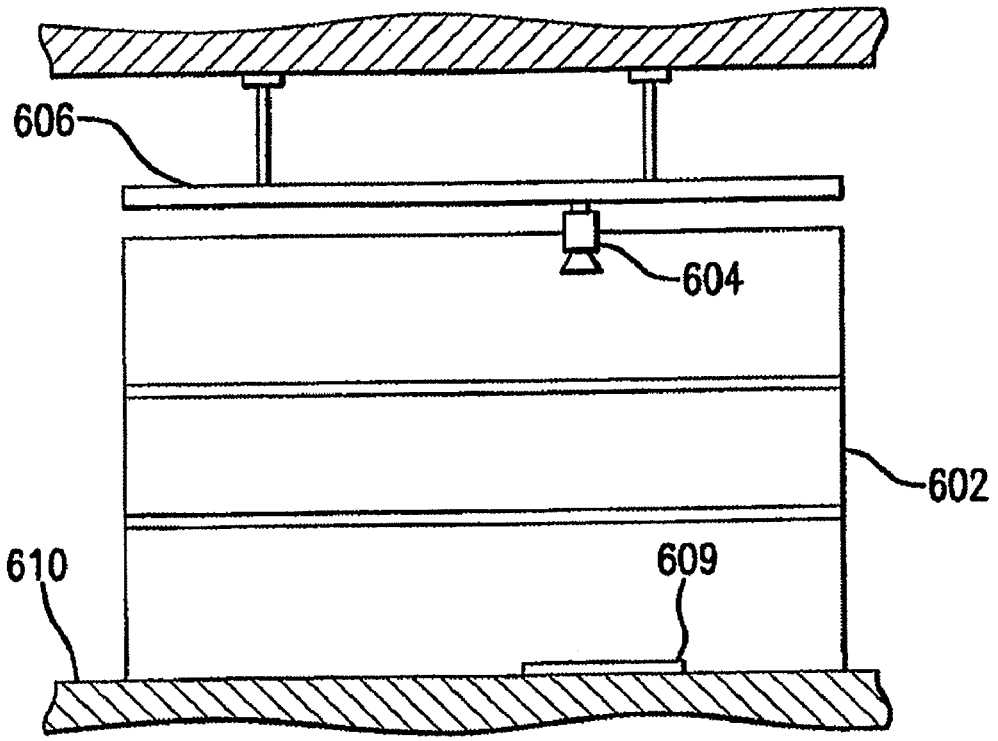

In yet further embodiments of the present invention, a floor covering may be used in combination with an image projection device. In such embodiments, the floor covering provides a surface onto which the projection device projects an image from a distance. FIGS. 10A and 10B illustrate a system for projecting an image onto a floor covering from a distance. Such a system could be used, for example, in the aisles of a commercial establishment such as a grocery store. Floor coverings 608 and 609 could be placed on a floor 610 adjacent to shelves 601, 602 of the commercial establishment. Projection devices 603, 604 could be movably attached to guidance members such as rail systems 605, 606 above the floor coverings. The rail systems could be, for example, attached to the ceiling. The image projection devices 603, 604 could be, by way of example only, electronic projectors similar to devices used with laptop computers for presentations, or other image projection devices comprising an optical system which allows an image to be focused onto a surface at a given distance. The floor coverings 608, 609 may have, for example, white or silvered surfaces to display the projected images.

Images projected onto the floor coverings could be configurable to include arbitrary content as described above, for example, by coupling the projection devices to components of a system as described in connection with FIG. 1. That is, the projection devices could be coupled to a controller, storage medium, network, and so on, to provide for control of the projection devices. For example, the projection devices could be configured to project, onto the floor coverings 608 and 609, graphic and alphanumeric information relating to products on the adjacent shelves 601, 602. Further, the projection devices could be configured to project graphic and alphanumeric information in varying degrees of brightness. Software may be used along with the network, controller, and other devices to provide the varying degrees of brightness.

The projection devices could be movable along the rail systems. FIG. 10B illustrates a frontal view of the right shelf 602 and associated rail system 606, projection device 604 and floor covering 609. The projection device 604 could be movable along the rail system 606 either manually or automatically, for example, with a motorized pulley, chain, or slide system, which are well known in the automation industry. The projection device 604 could be moved, for example, to a location in front of an item on the shelf for which desired information will be displayed. A corresponding floor covering 609 could then be placed under the projection device 604 so that an image can be seen; by a person standing in front of and facing the shelf 602. The floor covering 609 could be either manually aligned with the projection device 604, or aligned automatically, for example, by using a photodiode and corresponding detector system. More specifically, more photodiodes could be provided in the floor covering, and the projection device could be provided with a photodiode detector to register correct alignment of the projection device with the floor covering. Of course a symmetrical configuration is possible wherein the detector diodes are in the floor covering and the transmit diodes reside on the projection device, and the floor covering sends a signal to the drive mechanism moving the projection device indicating it is in the correct position.

Figure 10C:
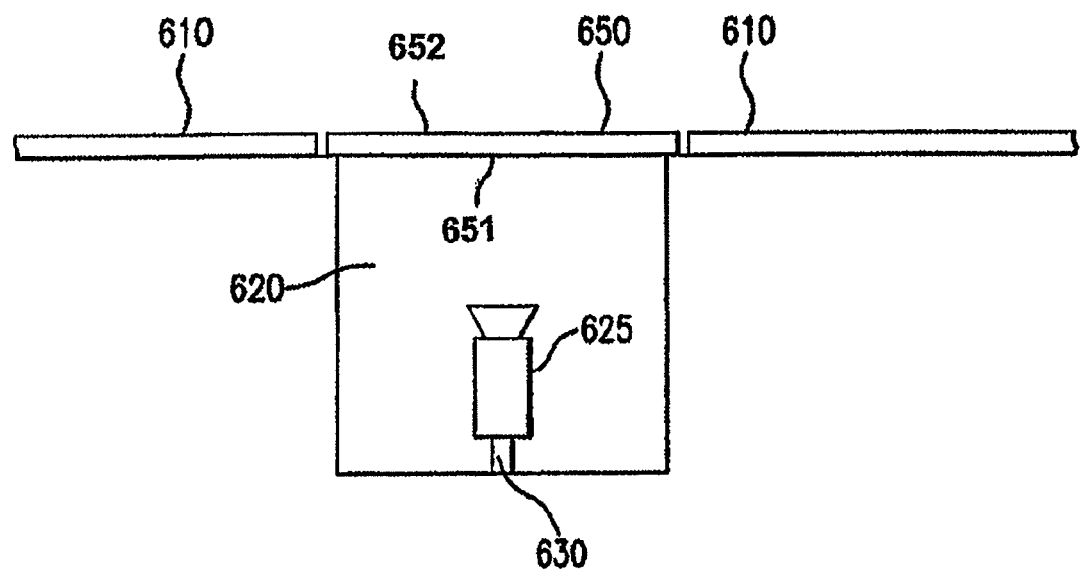

An alternative embodiment using a floor covering in combination with an image projection device is illustrated in FIG. 10C. As shown in FIG. 10C, according to embodiments an image projection device 625 may be provided in a recess 620 in a floor 610. A floor covering 650 may be arranged over the recess and provide a surface upon which images projected by the image projection device 625 could be displayed. Thus, in the embodiment of FIG. 10C, the floor covering 650 could be formed from a "transmissive" medium that allowed images projected onto its lower surface 651 to be seen on its upper surface 652. The image projection device could be movable along a rail 630.

Figure 11:
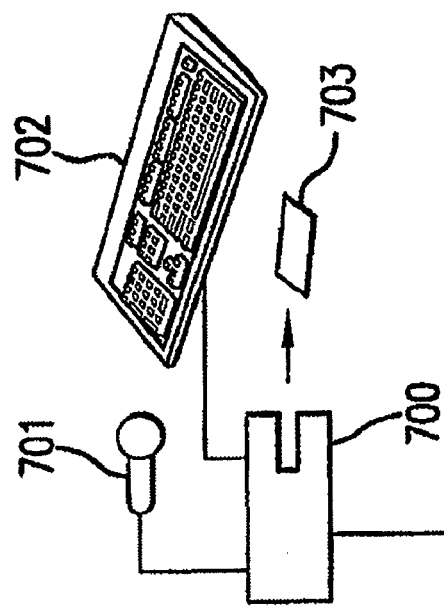
FIG. 11 shows a floor display system including a data input/output device for inputting desired items in a commercial establishment, and outputting a corresponding location.
Figure 11:
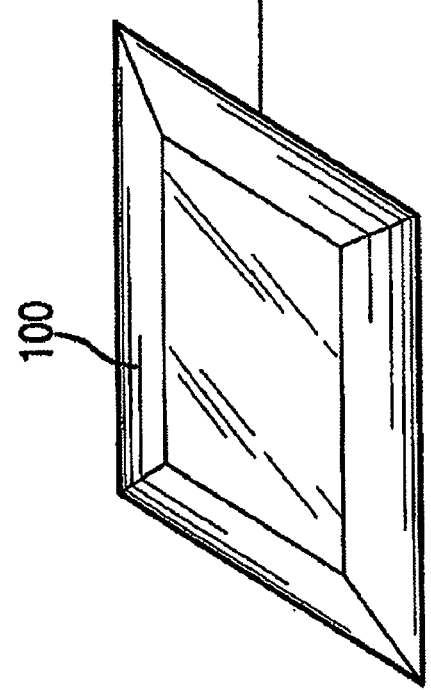

FIG. 11 shows still another embodiment according to the present invention. As shown in FIG. 11, a floor display system 100 may be coupled to a data input/output device 700. The data input/output device may comprise a mechanism for a user, such as a store customer, to enter specific data for processing by the floor display system. For example, the data input/output device could include a speech input device 701, such as a microphone, and/or a keyboard 702 for entering alphanumeric data. The data input/output device may comprise a computer and software for performing speech recognition processing of utterances directed by a user into the speech input device 701. The data input/output device may further comprise a printer for generating printed output 703.

The floor display system 100 and data input/output device may be arranged in a convenient location in a commercial establishment. A customer visiting the establishment may approach the data input/output device, which may be arranged at a comfortable level for speaking or typing into. The customer may utter, for example, an item or list of items into the speech input device, or type the item or items into the keyboard. In response, the floor display system may display a corresponding output, such as an advertisement or advertisements for the items, and/or a location within the establishment of the items or items, and/or generate print output 703, such as a coupon or coupons for, or specifying the location of, the item or items.

Figure 12:
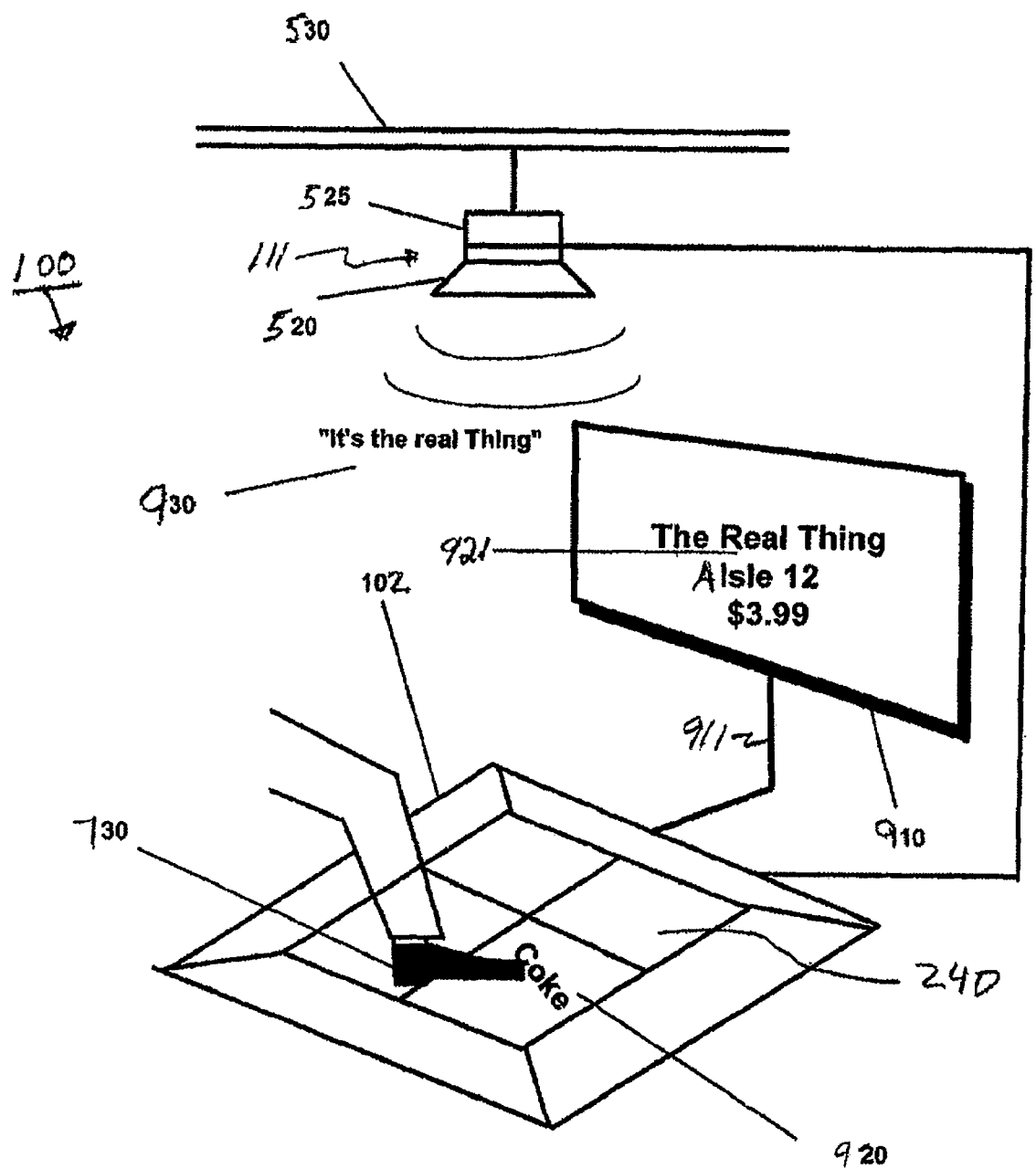
FIG. 12 shows a floor display system including a substantially vertical or inclined display device according to embodiments of the present invention.

Under the control of the controller, the substantially vertical or inclined display device 910 could be caused to generate content relating to content displayed on the electronic display device 240 associated with the floor covering 102 of the floor display system 100. In the example of FIG. 12, in response to a person's foot 730 stepping on or passing over the floor covering 102 of the floor display system, the controller causes the display device 240 associated with the floor covering 102 to generate an advertising message 920 ("Coke™") in a corresponding location and causes the substantially vertical or inclined display device 910 to generate a display of a related advertising message 921 ("The Real Thing™") and a store location and price of the advertised product ("Aisle 12—$3.99"). The audio device 111 is caused to generate a related audio message 930 ("It's the Real Thing™"). The brightness of display device 240 may alternatively or in addition be varied in response to a person's foot 730 stepping on or passing over the floor display system.

The controller may be coupled to a storage medium 104, which could be any form of medium suitable for storing digital data, including RAM (random access memory), ROM (read-only memory), flash or other non-volatile solid-state electronic storage, EEPROM (electronically erasable and programmable read only memory), or magnetic and/or optical disk storage. The storage medium 104 may store, for example, control software for execution by the controller 103 and video content of choice for display, under the control of the control software, on the electronic display 101. A user interface (not shown), such as a personal computer with a display monitor and keyboard, may be coupled to the controller to enable configuration of the controller with specific user input, such as specific control programs to produce specific displays and/or audio output. An audio device 111, such as a loudspeaker, may further be coupled to the controller 103 via a sound card 110. The audio device 111 may output audio content of choice, stored in the storage medium 104, under the control of the controller 103. Components of the floor display system 100 may be powered by a power supply 114. The floor display system may further comprise a sensing device 113 to provide for a variety of interactive applications of the floor display system, as described in more detail below. The sensing device 113 could be coupled to the controller 103 and provide signals thereto. The connection of the sensing device to the controller could be wired or wireless.

Data may be stored in the storage medium 104 using, for example, a data port 106 coupled to a common system bus. The bus could be, by way of example only, a USB (Universal Serial Bus). The floor display system may further comprise a wireless port 107 implemented, for example, using a wireless WAN/LAN card. Through the wireless port 107, the floor display system 100 may be coupled to and communicate with a network 125. The network could be any kind of network, including a wide area network (WAN) such as the Internet, or a local area network (LAN) including, for example, other floor display systems. Through the network 125, the floor display system 100 may be coupled, for example, via a wireless communication device 112, to a server computer 108 of the network. The server computer 108 may be coupled to a database 109. The database 109 may store information relevant to operation of the floor display system 100. For example, the database may contain video and audio content or control software that is downloadable to the storage medium 104 of the floor display system. Thus, the floor display system 100 may be remotely controllable. However, the floor display system 100 need not be networked, and could be controlled locally by, for example, downloading content and control software locally via data port 106. Also, while wireless communication methods and systems are illustrated in FIG. 1, wired systems could also be used, or could be combined with wireless systems.

Display technologies that may be utilized in embodiments of the present invention, in addition to those described earlier, include: liquid crystal displays (LCDs), light-emitting diodes (LEDs), organic light-emitting diodes (OLEDs), electroluminescent (EL) displays, plasma display panels (PDPs), field emission displays (FEDs) including printable field emitters, ferroelectric displays, polymeric light emitting diodes (PLEDs), light emitting polymers (LEPs), electronic paper, and light-emitting ceramic or other light-emitting inorganic materials. Other display technologies that may be utilized in embodiments include optical fiber technology, where a remote image is formed electronically and transmitted utilizing a light guiding source to fiber arrays or bundles. The remote image light source could be internal or external to the floor covering. Other contemplated display technologies include holographic displays. In this technique, either a white-light or laser hologram may be generated either internally or externally to the floor covering 102, and focused by a lens, possibly a Fresnel lens, to make it visible to persons viewing the display 101 at an acute angle.

In some applications it may be advantageous for the viewer to only see the image from the individual panels directly in front of him. In such applications, certain standard LCD displays having a very shallow viewing angle may work well. That is, in FIG. 13, by appropriately orienting display panels 310, 315, 325, 330 incorporating such standard LCD technology, it may be possible to cause a corresponding display to be substantially visible when viewed from one direction, but substantially not visible when viewed from another. For example, depending on the LCD technology used, a viewer approaching or standing near an edge 327 of the panels may be able to clearly see an image on panels 310 and 315, but not be able to clearly see an image on panels 325 and 330. Similarly, a viewer approaching or standing near an edge 329 of the panels may be able to clearly see an image on panels 325 and 330, but not be able to clearly see an image on panels 310 and 315. Selectively orienting the panels in this way may prevent a viewer approaching the floor display system from seeing and therefore struggling to understand an image that would appear upside down or skewed to him.

Figure 13:
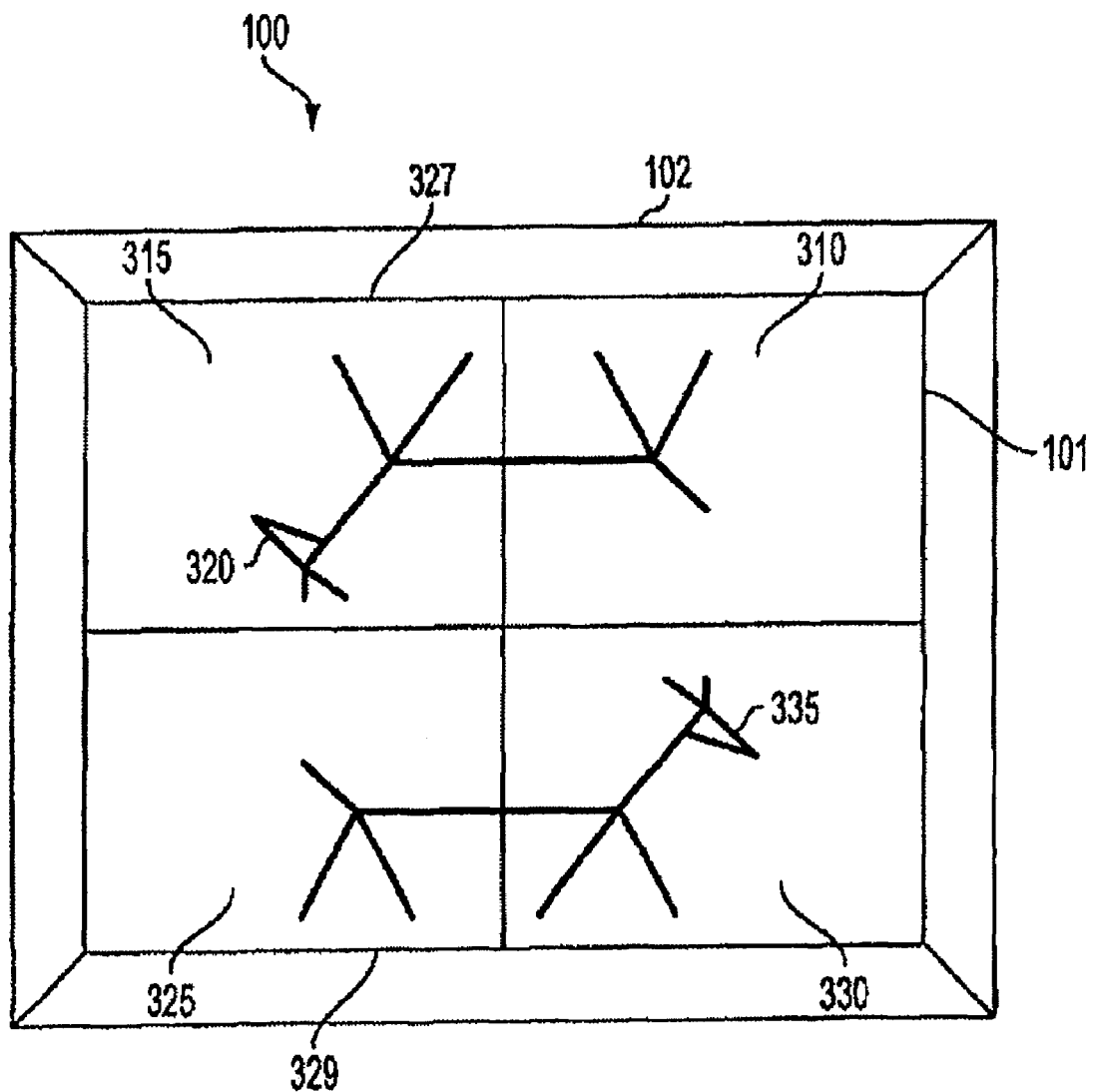
FIGS. 13 and 14 illustrate variable image orientation according to embodiments of the present invention.
Figure 14:
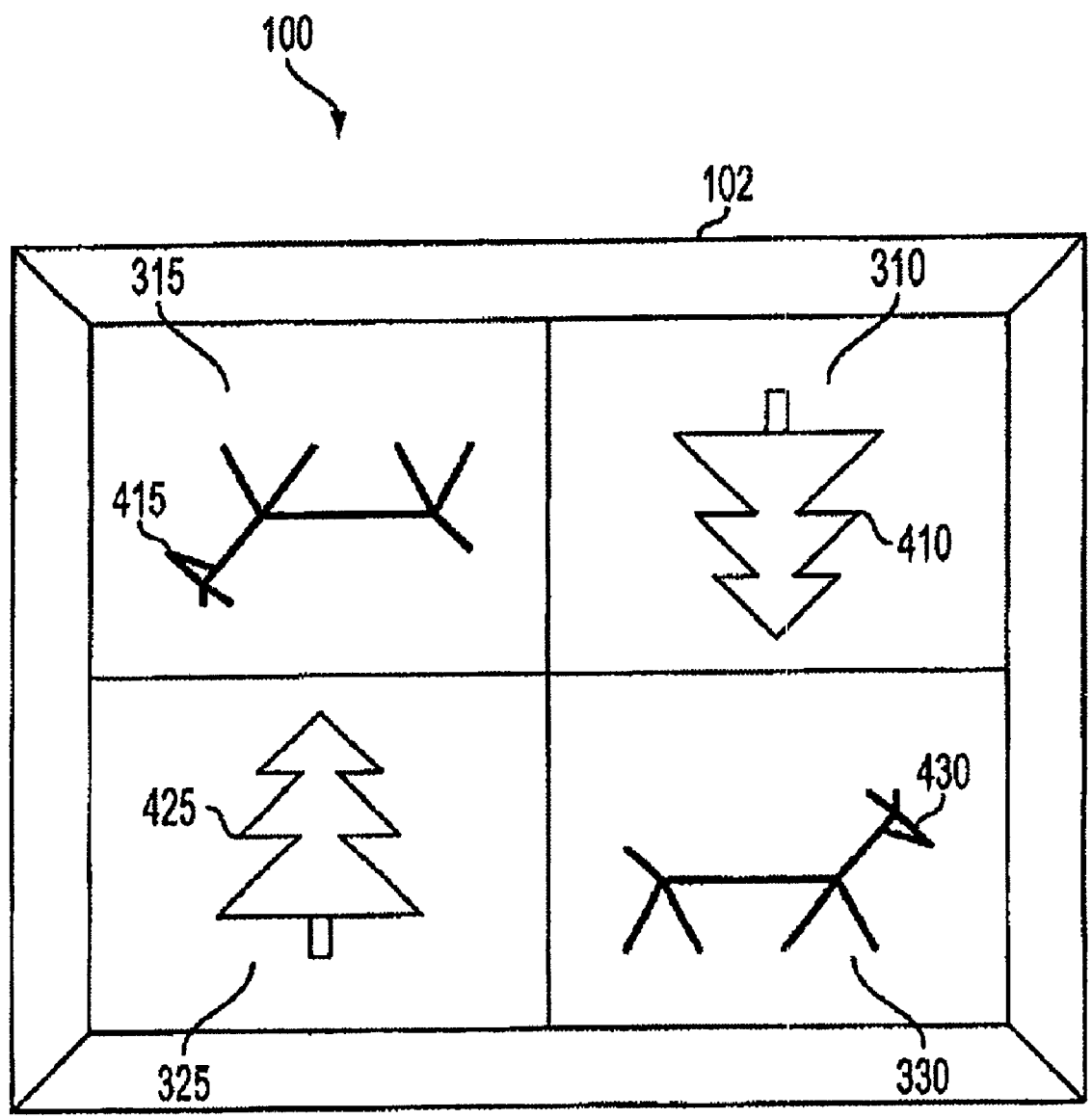

FIG. 14 shows another possible application of a multi-panel display as discussed above. As shown in FIG. 14, each panel could be configured to display an image independently of the other panels (as opposed to forming a composite image using two or more panels). In the example of FIG. 14, each panel 310, 315, 325, 330 shows a respective different complete image 410, 415, 425, 430, where each image has an orientation different from at least one of the other images. For example, the respective orientations of each image may be selected to be best suited for viewing from a respective different direction. Such a feature could be used, for example, to display different messages to people approaching from respective different directions. Generally, embodiments of the invention as illustrated in FIGS. 13 and 14 may be particularly advantageous when arranged in a location where people walk principally in two mutually opposite directions, for example, in the aisle of a grocery store, at the top or bottom of a flight of stairs, or in entrance/exit ways. It is noted that a multi-panel display according to embodiments of the present invention is not limited to four panels; more or fewer panels are possible.

According to embodiments, components of the floor display system 100 as described above could be housed completely internally to the floor covering 102, completely externally to the floor covering 102, or some components could be internal to the floor covering 102, while others are external.

As noted earlier, the floor display system may include a power supply 114. Power may be supplied to the floor display system by way of plugging into a power outlet in a wall through a cord, or through the use of batteries. The batteries used could be non-rechargeable or rechargeable. Other possible methods of delivering power to the floor display system include using photoelectric cells that convert ambient light into electricity that can be stored in a battery or used to power the display system directly. The photoelectric cells could be contained, for example, in the floor covering, or remotely connected to the display through a power cord.

Another method for powering the floor display system 100 could be, for example, through means whereby the pressure of walkers treading on the floor covering and associated display device was converted from mechanical energy to electrical energy. This could be, by way of example only, through some form of piezoelectric generator or other similar means. Alternatively, the vibrations in the floor from nearby machinery or passersby could also supply needed mechanical energy for electrical conversion to the display system.

As noted above, a wireless connection from a computer and/or network, such as the World Wide Web, could be used to transmit image content to a floor display system. Wireless connections between a computer or other processor, and control electronics of floor display system, could be implemented in many different technologies. One common technology today is wireless Ethernet, where one processor or computer communicates through an r-f or infrared (IR) signal to another. However, a wireless communication link can be established through a number of technologies and network protocols.

Wireless links can be ultrasonic, optical lightwave (IR, visible, ultraviolet), lasercomm, radio frequency, teraHertz, microwave, electromagnetic, inductively coupled, electrostatic or any other form of propagating electromagnetic energy between the transmitter and receiver. In addition to Ethernet, network protocols can be token ring, Bluetooth modem, cellular and PCS connections, or any other type of wireless LAN or WAN. The mode of data transfer can include time division, frequency division, or code division, and can also be multiple access or spread spectrum. One mode of wireless transmission that is well-suited for contemplated applications of floor display systems is the Ultra-Wide Band (UWB) mode of transmission. Contemplated commercial applications of floor display systems include use in electronically noisy environments such as, by way of example only: grocery stores, department stores, appliance stores, industrial facilities, restaurants, hotels, airports, apartments and residential housing. Ultra-Wide Band (UWB) transmission works well in these types of environments, among other reasons because when other electronically noisy sources such as machinery, remote door openers, bar-code readers, other r-f, TV, low-band transmissions are present, UWB allows high-speed data communications with low power spectral density over a wide spectral range (typically 310 gigaHertz). UWB also eliminates small-scale fading for arbitrary antenna position or orientation, which may be very useful for a display positioned on the floor. UWB also is more effective against the deleterious effects of multipath induced fading that is typical of more narrow-band wireless techniques.

Wireless communications may also include other techniques, either known today or in the future, which may be useful in communicating with and controlling a floor display system. For example, the wireless communications could be compatible with WiFi standards.

As noted above, the electronic display device 101 is capable of displaying at least alphanumeric data and graphic images. The content may include alphanumeric data alone, graphic images (e.g., pictures) alone, or combinations of the two, either static, moving, or both static and moving, in accordance with selected video content. Moving alphanumeric data and images may, for example, be scrolled. The alphanumeric data and graphic images could be black and white or in full color. Also, the content may be displayed in varying degrees of brightness. Further, the display device 101 may include more than one distinct display: that is, the display area of the display device could be partitioned with respect to content. For example, the display area could include two or more different "windows," each displaying different content. Such a partitioning of displays is well known, for example, in "split-screen" TV and through the widespread use of various graphics software applications, including the ubiquitous "Windows" software by Microsoft®.

Figure 15:
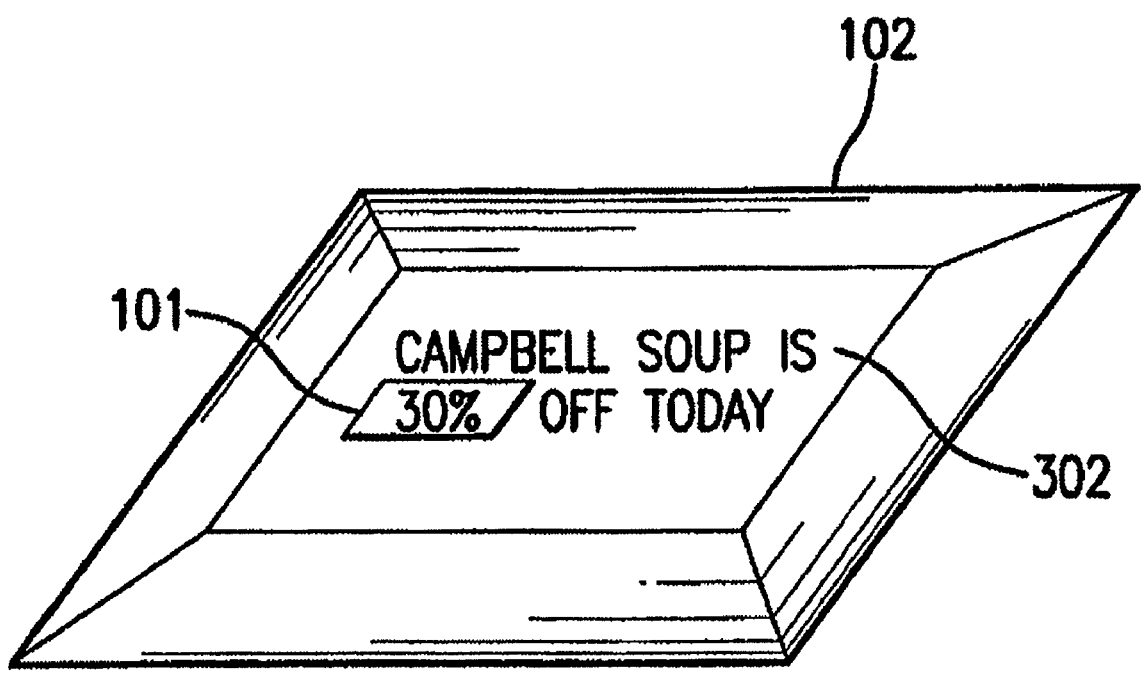
FIG. 15 shows a floor covering comprising a "mixed medium" display including a fixed, non-electronic portion and a dynamic electronic portion.

FIG. 15 shows one possible arrangement of the electronic display device 101 according to embodiments. Various digital video file formats could be used to generate images on the electronic display device 101, including MPEG (Moving Picture Experts Group), DVD (digital versatile disc) or digital video disc, and Flash. Further, conventional video content used, for example, in network television, could be converted into digital video content for display on an electronic display device 101 according to embodiments. One such converting process involves taking conventional NTSC (National Television Systems Committee) video from a tape, and capturing it on a computer through a video capture card. An example of this type of card is a Targa 2000 RTX board. Once captured, the video may be compressed into a file with a format that can be played by digital equipment. The file could be saved, by way of example only, in MPEG 1, MPEG 2, MPEG 3, or MPEG 4 formats.

In FIG. 15, the electronic display device 101 is a dynamic portion of a "mixed-medium" display. The display in FIG. 15 is a mixed-medium display because part of an overall display presented by an upper exposed surface of the floor covering 102 is electronic, while another part is not. In FIG. 15, a non-electronic fixed or static portion 302 of a display is combined with a dynamic or changeable electronic portion 101. However, it is noted that "static" as used herein should not be equated with "non-electronic." In the example, the fixed portion reads "CAMPBELL SOUP IS OFF TODAY". The fixed portion could be, for example, printed on the upper exposed surface of a material of the floor covering 102. The dynamic portion may implemented by an electronic display device 101 housed in the floor covering, and utilizing one or more of the display technologies described above. The dynamic portion could be modifiable electronically to display arbitrary content as described above. For example, the dynamic portion could display information related to a sale price on an item, such as "30%" or "40 cents". Thus, in FIG. 15, the overall floor display would show "CAMPBELL SOUP IS 30% OFF TODAY", or "CAMPBELL SOUP IS 40 CENTS OFF TODAY". By utilizing such a combination of a static portion and a dynamic portion message, it is possible to significantly reduce the size of the electronic portion of the display, thus reducing costs. Further, by designing and engineering the dynamic portion of the display to both dynamically change a message either by way of scrolling or blinking, and also to flash or blink a light located within the display to draw attention to the display, it is possible to significantly increase awareness of the display by persons in the vicinity.

Variable Image Orientation

FIG. 15 illustrates a floor display system with variable image orientation according to embodiments of the present invention. "Image" means anything capable of visual representation, including pictures, designs, text, numbers, etc., either solely or in any combination, in either static or dynamic formats or combinations thereof. The dynamic portion could be modifiable electronically to display arbitrary content. In FIG. 15, a floor display system 100 is shown with versions 320, 335 of the same image, where each version is oriented for viewing from a respective different direction. More specifically, an image 335 may be substantially "right side up" from a perspective of a first viewer, while image 320 may be substantially "upside down" from the perspective of the first viewer. On the other hand, from a perspective of a second viewer, image 335 may be substantially "upside down" while image 320 may be substantially "right side up." In a floor display system as shown in FIG. 15, an electronic display device 101 of the system may include a plurality of separate display modules or panels 310, 315, 325, 330 associated with a floor covering 102. Each panel may independently incorporate any of the display technologies described above. Two or more panels may be configurable to display a composite image: for example, respective displays on panels 325 and 330 form a composite image 335. Moreover, each of the separate panels may be configurable to display an image independently. "Independently" in this context means not as part of a composite image. Further, each panel may be configurable to display an image with a different orientation from an image on another panel.

Figure 17:
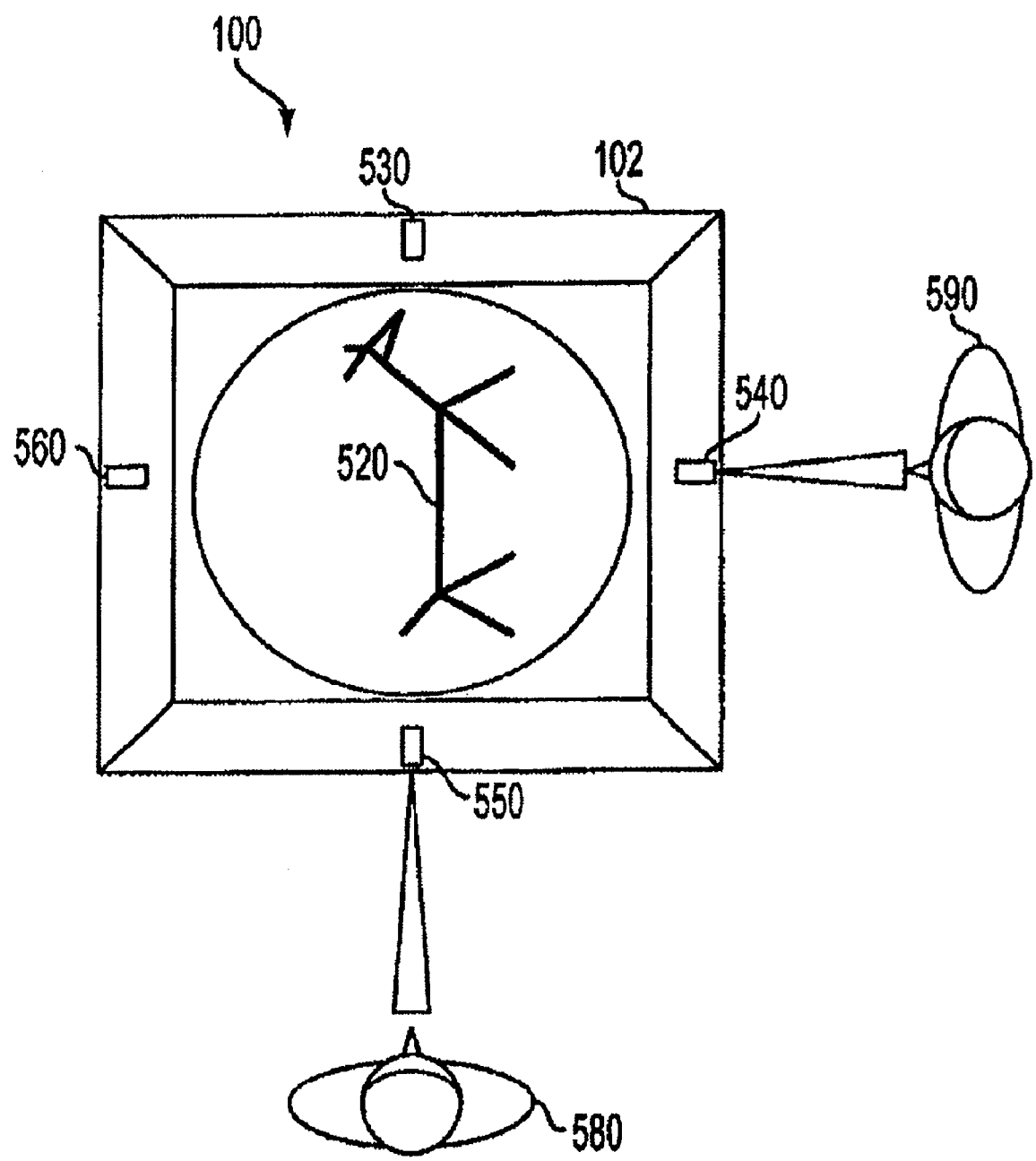
Figure 18:
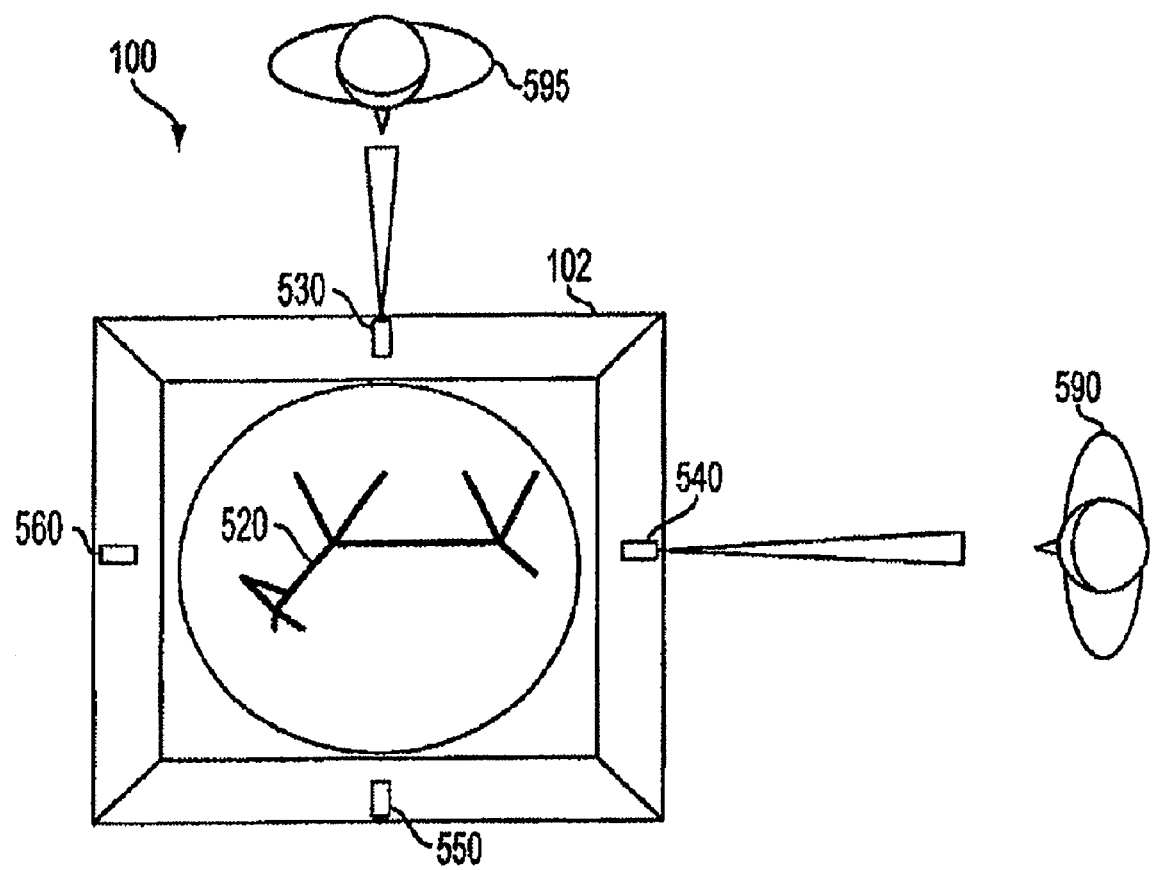

Techniques are known for performing image rotation and/or translation as described above. For example, many currently-available electronic display drivers (such as video graphics adapter card 105) and electronic display devices 101 support image rotation and/or translation with software that is specifically designed for such operations. Based on input signals from the proximity detectors, as noted earlier, a controller 103 could execute decision software to implement, for example, decision trees to decide which of a plurality of viewers is closest to, and to which edge of, the floor display system. The controller could then execute corresponding rotation and/or translation software to rotate and/or translate a displayed image accordingly. It is noted that image rotation and/or translation need not occur in 90-degree increments as shown in FIGS. 16-18; finer increments in rotation are possible, down to fractions of a degree.

While image rotation and/or translation software is one possibility for implementation, another possibility could be to store images in a plurality of different, fixed orientations, and to select a given image from among the stored images for display depending on a proximity decision. Moreover, proximity might not be the only basis for selecting a particular image orientation; other bases are possible. For example, the image might be configured to cycle through a plurality of different orientations periodically. There could be a default orientation for the image if no viewer is sufficiently near, or if a decision on proximity cannot be reached. Embodiments of the invention could further include a "screen-saver" mode, and either start or stop video output based on the proximity of persons.

Proximity detectors could be implemented in a variety of forms, inducing, for example: ultrasonic detectors, thermal detectors, motion detectors, IR (infrared) range finders, electric eyes, cameras, charge coupled devices (CCDs) or other imaging systems.

Figure 16:
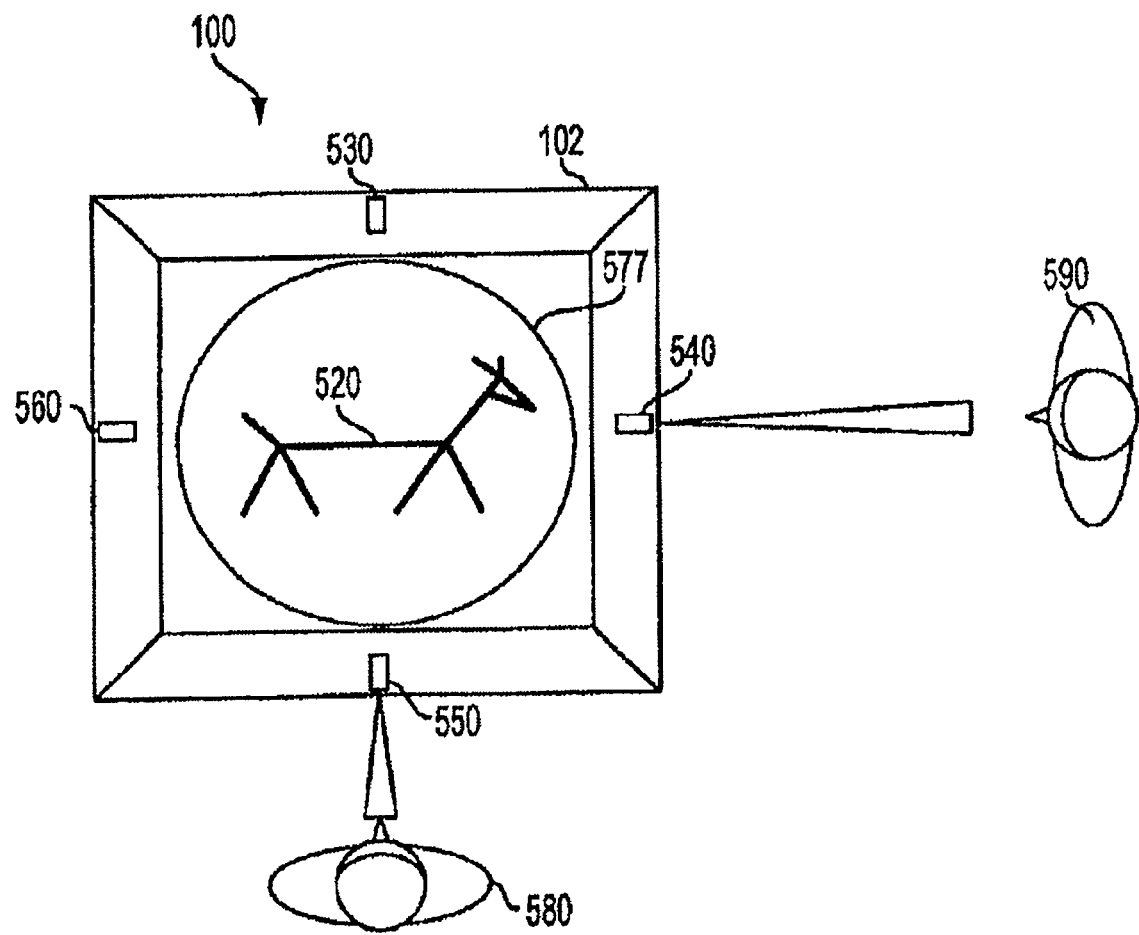
FIGS. 16-18 and 19 illustrate variable image orientation according to embodiments of the present invention.

It is further noted that, as shown in FIG. 16, an outline 577 is intended to represent either part of an electronically-generated graphic, or an actual physical edge of an electronic display device 101 of the floor display system that has a substantially circular form, as opposed to a substantially square or rectangular form as shown in previous figures. A substantially circular electronic display device according to embodiments of the present invention could be mechanically rotated to re-orient images based on signals from proximity sensors. On the other hand, electronic (e.g., software-driven) image rotation and/or translation where the electronic display device of the floor display system comprises multiple modules or panels in a substantially square or rectangular configuration as described earlier.

Further alternatives according to embodiments of the present invention are illustrated in FIGS. 16-18. As shown in FIGS. 16-18, the floor display system 100 could comprise an electronically rotatable and translatable (i.e., movable or shiftable) image 520. The floor display system could further comprise a plurality of proximity detectors 530, 540, 550, 560, for example, included in a sensing device 113. Based on signals from the proximity detectors, the rotatable and translatable image could be rotated and/or translated to a desired orientation for viewing by a viewer, based on criteria such as how close the viewer is to the floor display system.

More specifically, the proximity detectors 530, 540, 550, 560 could be, for example, mounted in, attached to, or otherwise associated with edges of the floor covering 102. For example, the proximity detectors 530, 540, 550, 560 could respectively be associated with the inclined surfaces 212, 213, 214 and 215 of the floor covering. The proximity detectors could be used to determine an orientation of a given image 520 at a given time, depending on the proximity of viewers. For example, the proximity detectors could be coupled to the controller 103 of the floor display system and send signals to the controller. Based on information in the signals received from the proximity detectors, it could be determined by the controller that a first viewer 580 is closer to, say, proximity detector 550 than a second viewer 590 is to proximity detector 540. The determination by the controller could be made, for example, by executing a suitable hardware and/or software algorithm. Under the conditions shown in FIG. 16, for example, the controller could cause image 520 to be rotated and/or translated so that it was right side up from the perspective of viewer 580. On the other hand, as shown in FIG. 17, it could be determined based on inputs from the proximity detectors that viewer 590 was closer to proximity detector 540 than viewer 580 was to proximity detector 550. Under these conditions, image 520 could be rotated and/or translated so that it was right side up from the perspective of viewer 590. Similarly, as shown in FIG. 18, it could be determined based on inputs from the proximity detectors that viewer 595 was closer to proximity detector 530 than viewer 590 was to proximity detector 540. Under these conditions, image 520 could be rotated and/or translated so that it was right side up from the perspective of viewer 595.

The proximity detectors may also be used with software, controller, or other similar device to vary brightness based upon the proximity of a person to the display system. For example, when the detectors do not detect objects nearby, then the display may be dim. However, when the detectors do detect objects nearby, then the display may brighten. This could be accomplished, for instance, through the use of software on a computer. The benefit of varying brightness includes decreasing visual pollution, energy savings, and increasing the life of displays.

Figure 19:
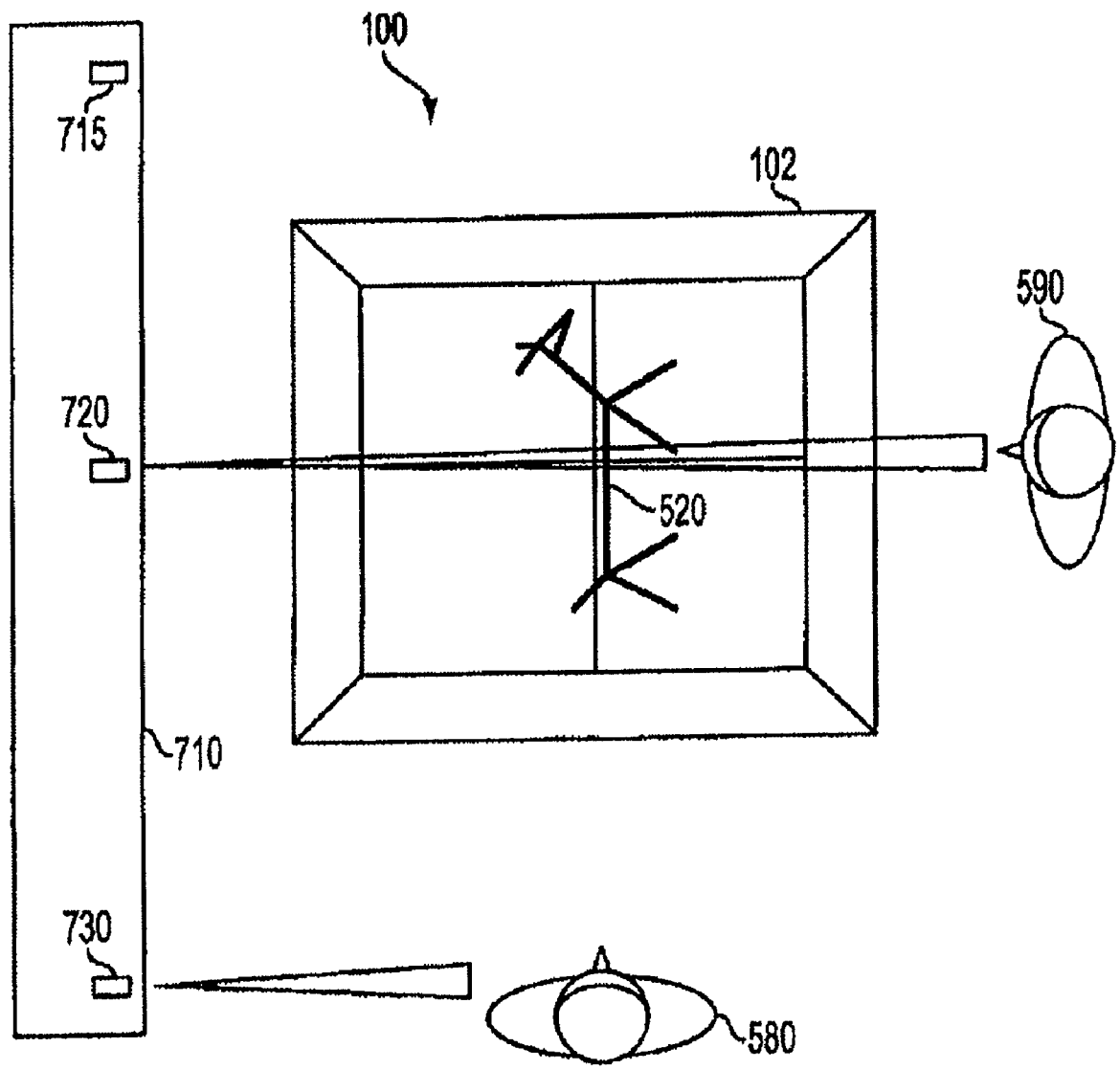

FIG. 19 illustrates that proximity detection need not necessarily be performed by proximity detectors located in or on the floor covering 102. Instead, for example, proximity detectors could be located in, on, or be otherwise associated with an object near the floor display system 100. FIG. 19 shows proximity detectors 715, 720, and 730 located on shelving 710 adjacent a floor display system 100. Based on signals received from proximity detectors 715, 720 and 730, a controller 103 of the floor display system could determine which of a plurality of viewers was closest, and orient a rotatable/translatable image 720 accordingly. This determination could be made, for example, based on known distances of respective detectors from the floor display system. Proximity detectors could also be placed in ceilings or suspended from ceilings, for example on tracks.

Brightness Control

As referred to above, the floor display systems according to embodiments of the present invention may include a display with brightness control. The brightness of the display may be brightened to a dim state or vice versa, for instance, in response to the detection of a person in close proximity to the display. The detection of persons may be accomplished through the use of sensing devices, such as those discussed above. Alternatively, the brightness of the display may be varied in accordance to sound or graphics, such as a visualization. For example, as the volume of the display system increases, the brightness may go down, or vice versa. Other embodiments of using brightness control to attract attention are included in the present invention, such as a regular schedule of varying the brightness of the display. According to embodiments of the present invention, the brightness may be varied by way of software on a computer, a controller, or other similar device.

Data Distribution and Management

It is contemplated that floor display systems according to embodiments of the present invention may be deployed in many types of public buildings, including commercial establishments (e.g., markets, stores). In an individual building, there could be a plurality of floor display systems deployed. The plurality of floor display systems could be used, for example, to announce sales and prices, provide product descriptions, direct customers to specific locations within a commercial establishment, and the like. Thus, it could be advantageous to control floor display systems, individually or in groups, to generate particular video/audio output based on their locations. More specifically, the video/audio content output by a given floor display system could, for example, relate to nearby products, such as products on adjacent shelving. Accordingly, embodiments of present invention relate to configuring floor display systems to generate particular video/audio output, as described below.

Direct-Link Download

Figure 20A:
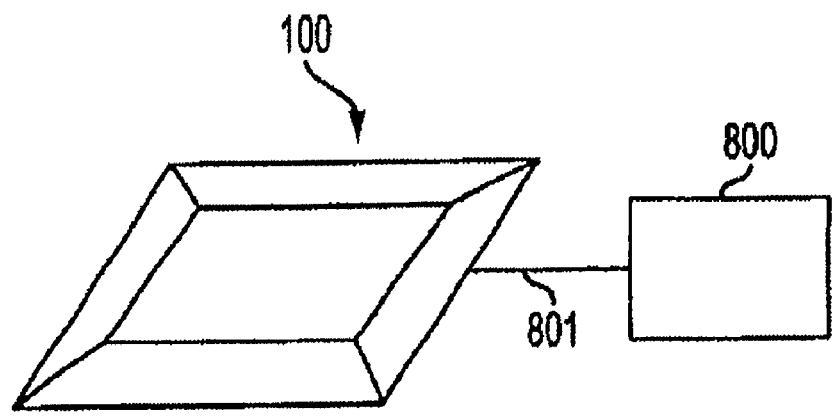
FIGS. 20A-20B and 21A-21B illustrate various arrangements for configuring a floor display system according to embodiments of the present invention with selected content.

Referring to FIG. 20A, a user may locally configure a floor display system 100 by physically connecting a configuring device 800 such as a hand-held controller/storage device (CSD) to the floor display system 100. The connection may be, e.g., via a direct link 801, such as a cable link to, e.g., a data port 106 of the floor display system. The user may then download selected video/audio content and/or control software from the device 800 into a storage medium 104 of the floor display system. What data is downloaded to a floor display system may depend, for example, on where the floor display system is located, and thus what content might be relevant. The video/audio content downloaded may be changed by downloading new video/audio content by the same method.

Local Area Network (LAN) Download

Figure 20B:
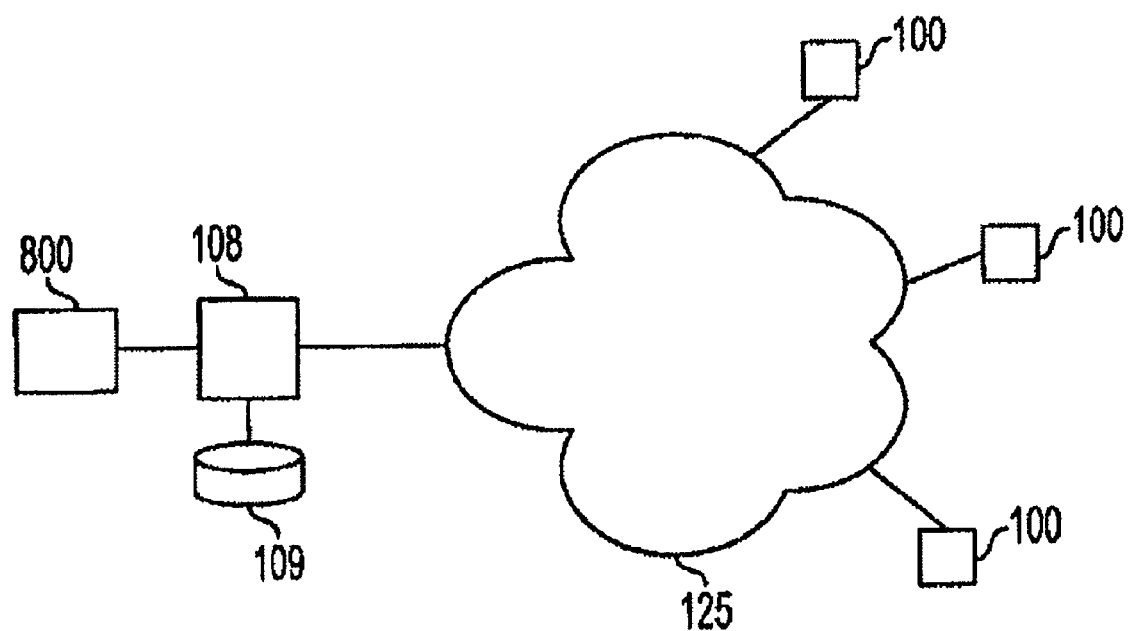

Referring to FIG. 20B, a user may remotely configure a floor display system, for example, as follows: the user may connect a device 800 to a computer 108 (e.g., a network server; see FIG. 1) in a building; this connection could be implemented, for example, wirelessly via IRDA (Infrared Data Association), or via a wired USB link. The network sever 108 may in turn be connected, by wired or wireless connections (e.g., using a LAN 125 and Ethernet), to a plurality of floor display systems 100 in the building. Video/audio content and/or control software may then be downloaded from the device 800 to the network server 108, and from the network server, to each connected floor display system 100. Data downloaded to a first floor display system may be different from data that is downloaded to a second floor display system, depending, for example, on the respective locations of the first and second floor display systems. The device 800 could be, for example, a CSD, a personal or laptop computer, or the like. Alternatively, the server 108 could be linked to a database 109 containing content and control software, and a user could direct the server 108 to download content and/or control software from the database 109 to the floor display systems.

Local Area Wireless Download

Figure 21A:
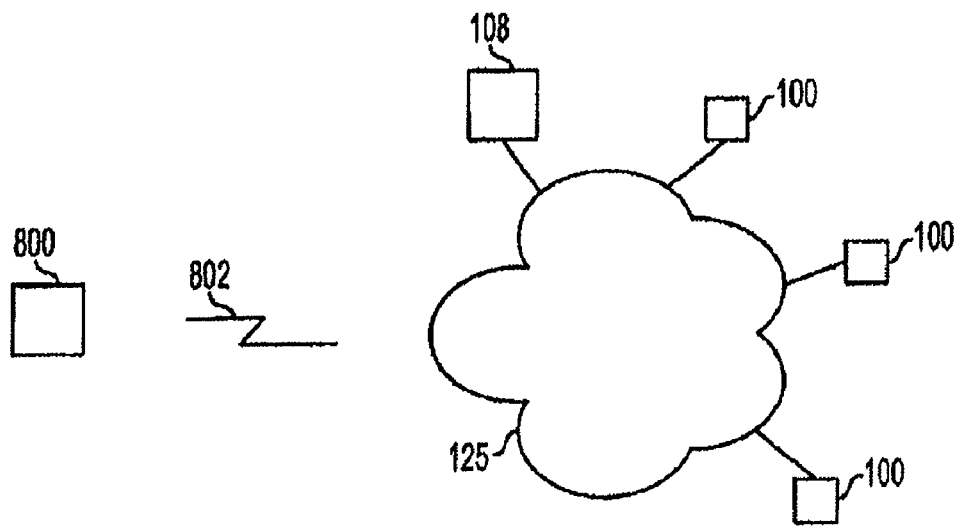

Referring to FIG. 21A, according to embodiments of the invention, a user need not connect to a network server computer as described above. Instead, the user need only be in the vicinity of the plurality of floor display systems to be configured, and remotely configure the floor display systems wirelessly from as much as 100 feet away or more. As shown in FIG. 21A, the user could, for example, have a device 800 such as a laptop computer or CSD equipped with a short-range wireless transmitter that can send a wireless signal 802 to communicate with each floor display system 100 in a commercial establishment via, for example, CDMA (code division multiple access) or other similar communication protocol. In this way, content and/or control software can be wirelessly downloaded to each floor display system without going through a network. Alternatively, the same short-range wireless transmission could be used to send data to a network server 108, which would then distribute the data to each floor display system.

Wide Area Network (WAN) Download

Figure 21B:
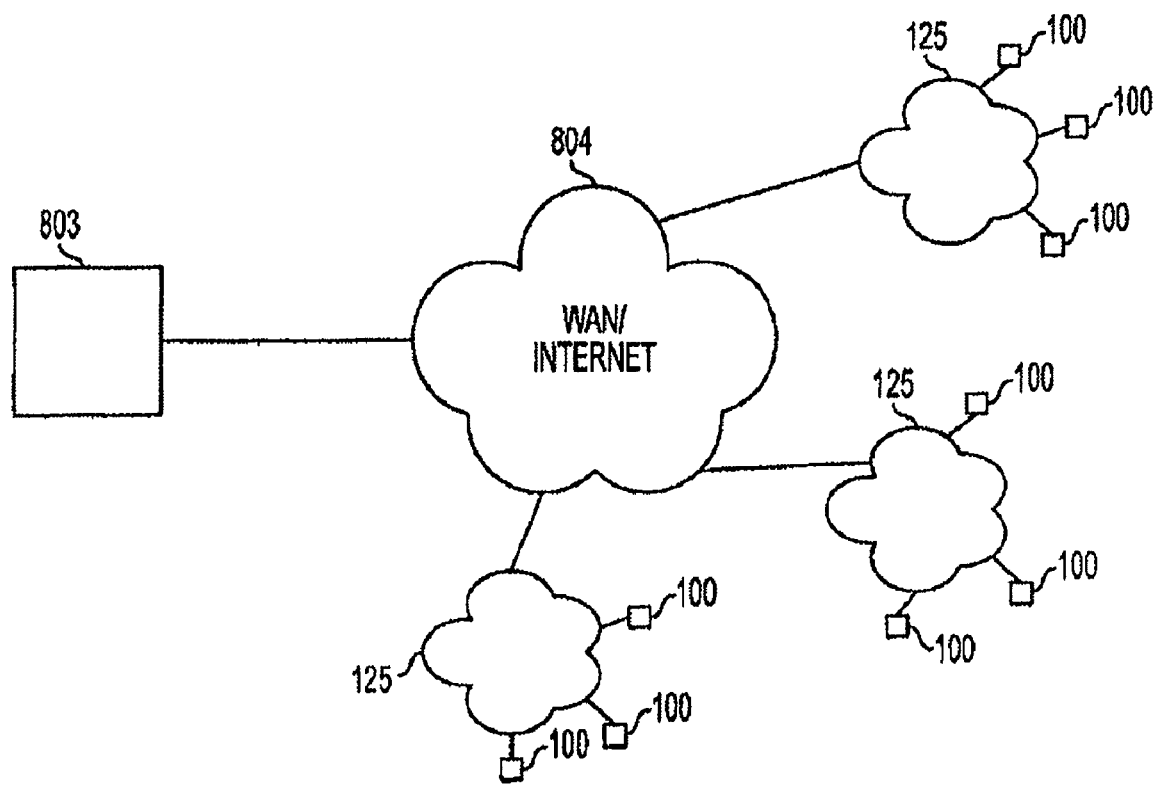

Referring to FIG. 21B, according to embodiments of the invention, remote communication with and configuring of a plurality of floor display systems in multiple different buildings, such as commercial establishments, is possible. This may be accomplished, for example, with a WAN (wide area network) configuration. More specifically, as shown in FIG. 21B, a central control location 803 may be linked via a wired or wireless connection to the Internet or some other wired or wireless (e.g., satellite) WAN 804 to a LAN 125 associated with each establishment. Each LAN 125 may in turn be linked by wire or wireless means to a plurality of floor display systems 100 arranged in the establishment. Video/audio content and/or control software may then be downloaded from the central control location 803 to each LAN, which may then transmit the video/audio content and/or control software to the plurality of floor display systems. Since, as discussed above, it may be desirable to have respective floor display systems in the same establishment generate different video/audio output, each floor display system could have a unique identifier code assigned to it. This identifier code could be provided in a header of the digital data corresponding to the video/audio content and/or control software intended for a particular floor display system. The header information could be used to ensure that each floor display system received the data intended for it.

Satellite Network Download

As a variation of the WAN download technique described above, satellite network download could be used where the wide area network is provided via satellite constellation. Here, a satellite may broadcast data point-to-multi-point to receivers (e.g., dish receivers) in each establishment containing floor display systems. The data may then be disseminated via LAN, e.g., to respective floor display systems. Satellite systems such as Motorola's Iridium, Hughes' Direct TV, and Boeing Digital Cinema have already demonstrated such capabilities.

Floor Display Linked to Point of Sale (POS) System

A floor display system 100 according to embodiments of the invention may be linked to a POS (point of sale) system of an establishment. A POS system may be used to gather information about consumer preferences. Information about the effectiveness of specific advertising content in generating sales could be gathered, for example, by correlating sales of a given item in an establishment with the timing of given content displayed on a floor display system. This could be accomplished, for example, by electronically cross-referencing sales transactions, at the time they occur, with the scheduling of particular advertising for display on a floor display system. To provide this scheduling information to the POS system, the floor display system could be connected directly to computers or servers of the POS system. Alternatively, a server computer of a LAN, for instance, could control the scheduling of content on the various floor display systems of an establishment, and provide the scheduling information to a server of the POS system so that it could be correlated in "real time," i.e., contemporaneously, with sales transactions. Alternatively, the scheduling information could be correlated with sales records "offline" at a later time.

Interactivity

Embodiments of a floor display system according to the present invention may include interactive features, as discussed below.

Requesting Information

Figure 22:
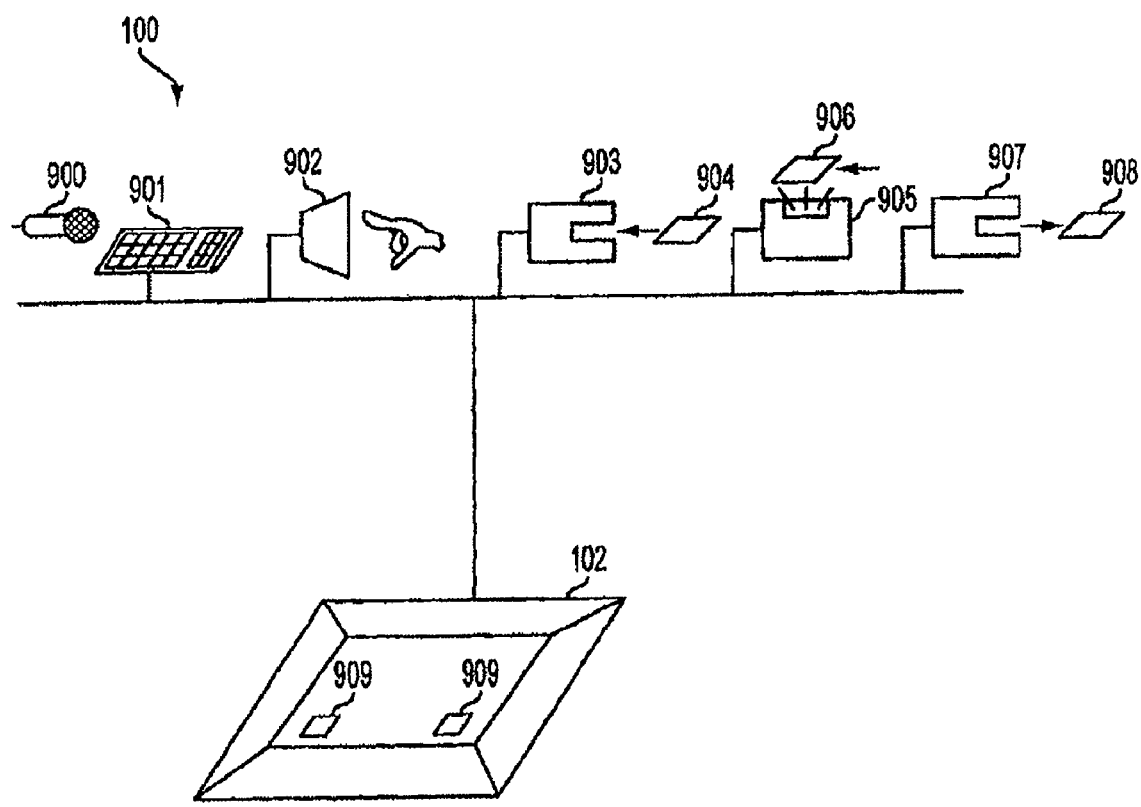
FIG. 22 shows various interactivity devices which may be associated with a floor display system according to embodiments of the present invention.

Embodiments of the present invention may include the capabilities of asking consumers for information and recording the requested information. An illustrative example is shown in FIG. 22. As shown in FIG. 22, a number of interactivity devices providing for interaction with persons may be coupled, via wired or wireless connections (e.g., Bluetooth), to a floor display system 100. The interactivity devices may include, for example, a speech input device 900, such as a microphone, a keyboard or keypad 901 for entering alphanumeric data, a touch-sensitive display screen 902, a card reader 903, a bar code scanner 905, and a coupon dispenser 907. Each of the devices may be arranged at a comfortable level for speaking or typing into, or otherwise handling. The floor display system 100 could include speech recognition software for performing speech recognition processing of utterances directed by a person into the speech input device 900. The floor display system might further include pressure sensors 909 under a top surface of a display area of the floor display system. The pressure sensors 909 could implemented as, for example, thin-film contact switches. Each of the foregoing interactivity devices could be coupled to a controller 103 of the floor display system for sending signals to the controller. The controller could be programmed to perform a desired function depending on the signals received.

The floor display system 100 and associated interactivity devices may be arranged, for example, in a convenient location in a commercial establishment. The floor display system 100 could generate requests for information, either visually or audibly, to customers passing by. The floor display system could generate the requests when the proximity of persons was sensed by sensing device 113. In the requests for information, the floor display system could, for example, request consumer opinion regarding pricing, product specifications, product preferences, coupons, or any other kind of desired information. The floor display system could prompt a customer to reply, for example, by speaking into the speech input device 900, by keying in information on the keyboard/keypad 901, by pressing certain fields in a display of the touch-sensitive screen 902, by stepping on specified portions of the floor display system to register responses via pressure on the pressure sensors 909, or by any combination of these.

The floor display system 100 could record customer responses in a storage medium such as storage medium 104. When enough responses had been collected, the information could be downloaded and analyzed, for example, by brand marketers to determine customer preferences.

The floor display system 100 could also be configured to respond, either by visual or audio output, to a request from a person, where the request is made either by speaking or by entering data using any of the interactivity devices described above (e.g., keyboard/keypad 901, touch-sensitive screen 902).

The card reader 903 could be used, for example, to obtain identity information from customers. Such identity information may include, but is not limited to: name, age, history of purchases, frequency of store visits, most commonly purchased items, store credit amount, information pertaining to a store discount, and the like. The identity information could be, for example, magnetically encoded on a card 904 readable by the card reader 903. The card 904 could be, for example, a "smart" card. Smart cards (or electronic cards) are known devices that typically contain an embedded computer chip and are typically the size of a conventional credit or debit card.

The bar code scanner 905 could be used, for example, to enable a customer to scan a coupon 906. In response, the floor display system could generate a visual and/or audio message concerning the coupon. The message might, for instance, inform the customer that the coupon is still valid, or that it is worth double, or the like. The customer might also be enabled to scan a product at the bar code scanner 905, and receive a coupon in response. A coupon 908 could be printed or otherwise generated, and dispensed by the coupon dispenser 907. The coupon dispenser 907 could include a counter to count how many coupons are dispensed and for what products. This information could be recorded by the floor display system and used by marketers, for example, to gauge consumer reaction to advertisements, prices, and so on.

As discussed above, embodiments of the floor display system according to the present invention provide for interactivity with persons in the vicinity of the floor display system. In particular, sensing device 113 may take on a number of varying forms, each of which enables the detection of phenomena or activities indicating the presence of persons in the vicinity of the floor display system, and causes the floor display system to perform some corresponding action in response. In one such embodiment, the sensing device 113 is a sound-sensing device. The sound-sensing device 113 may be located within the floor covering 102, or may be located at some distance from the floor covering. The sound-sensing device could be configured to detect an individual as he or she approached the floor display system, and to cause a corresponding response to be generated by the floor display system. For example, the sound-sensing device could be coupled via a wired or wireless connection to the floor display system, and be configured to send a signal via the connection to the controller 103 to activate the display device 101 upon the detection of sound waves indicating the approach of a person. Upon receiving the signal, controller 103 could cause the display device 101 to generate a predetermined display of any desired content: for example, the displayed content could announce a sale, or advertise a product. The content could relate to products on nearby shelves. The content may have a varied brightness under the control of the controller or software. The floor display system could also be configured to generate a predetermined audio output of any desired content in response to a signal from the sound-sensing device. In view of the foregoing, the floor display system may operate in an active mode, i.e., a mode in which the system is actively generating some display and/or audio output, and a dormant or quiescent mode in which it is not actively generating some display and/or audio output. This quiescent mode may be entered when persons are not detected in the vicinity, in order to conserve power. The floor display system may alternate between the active mode and the quiescent mode accordingly to some programmed schedule, or may enter the active mode in response to some signal as described above. The active and quiescent modes may include differing levels of brightness.

The sound-sensing device could be adjustable to detect only predetermined frequencies of sound, and send an activation signal to the display system in response thereto. More particularly, the sound-sensing device could be either an omni-directional or a directional microphone depending up how noisy the general environment is. An omni-directional microphone has a constant sensitivity regardless of the direction from which sound is coming, and thus would be effective in a quiet environment to detect someone approaching from any direction. The omni-directional microphone could be implemented as one or more small electret microphones placed within or embedded in the floor covering. While electret microphones are one example, dynamic and condenser microphones could also be used. Commercially available omni-directional microphones include, by way of example only, Audio Technica MT830R, DPA Type 4060, and MMC4041.

In noisy environments, or if there is a particular direction from which the approach of a person is to be detected, a directional microphone may be preferable. A directional microphone is a microphone with a well-defined directional response, and is therefore better able than an omni-directional microphone to filter through sounds coming from a particular direction, while blocking out random environmental noise. Examples of commercially available directional microphones that could be utilized include cardioid microphones, super cardioid microphones, and shotgun microphones. Examples of cardioid microphones include the DPA® Type 4021, the Earthworks® A30X, and the Shure® SM57. Examples of super-cardioid microphones include the Peavey® PVM 480 and the Electrovoice® ND767A. Examples of shotgun microphones include the Beyerdynamic® MCE86 S.1, the Sennheizer® K6 ME-66, and the Shure® SM89. Depending upon how noisy the environment in which the microphone was used, a microphone with greater directional sensitivity might yield better results than a microphone with lesser directional sensitivity. For example, in a very noisy environment, a microphone with high directional sensitivity, such as a super-cardioid or shotgun could be preferable.

In yet another embodiment providing for interactivity, the sensing device 113 may be a motion-detection device. The motion-detection device 113 could be located within the floor covering 102, or may be located at some distance from the floor covering, for example, in or on a ceiling or wall near the floor covering. The motion-detection device could be configured to detect an individual as he or she approached the floor display system, and to cause a corresponding response to be generated. For example, the motion-detection device could be coupled via a wired or wireless connection to the floor display system and be configured to send a signal via the connection to activate the display device 101 upon the detection of motion indicating the approach of a person. The display device 101 could generate some desired display upon activation; the floor display system could also generate corresponding audio output. The motion detection device could be adjustable, so that it only detects motion that is within a certain area or perimeter around the display. The motion-detection device could also be directionally sensitive, so that, for example, only customers entering an establishment would trigger the motion-detection device and corresponding display. Motion-detection devices that could be used in association with the display include, by way of example only, motion detection devices that utilize IR technology, simple radar, or a light beam.

There are many different ways to implement a motion-detection device 113, including using active motion detection and passive motion detection. Active motion detection systems typically inject energy (e.g., light, microwaves or sound) into the environment, and then detect a change in the energy. For example, it is common for stores to have a device that emits a beam of light that crosses a space near the entry way of the store, and a corresponding photosensor opposite the beam to measure an amount of incident light generated by the beam. When a customer moves across the beam, thus interrupting it, the photosensor detects the change in the amount of incident light and may sound an audible alarm, such as ringing a bell. A detection system of this kind could be used to signal the floor display system that a person is approaching. Similarly, many grocery stores have automatic door openers that use a very simple form of radar to detect when someone passes near the door. Such systems may use an emitter/receiver device arranged above the door. The emitter portion sends out a burst of microwave radio energy and waits for the reflected energy to bounce back and be detected by the receiver portion. When a person moves into the field of microwave energy, it changes the amount of reflected energy or the time it takes for the reflection to arrive at the receiver portion, and accordingly the emitter/receiver device generates a signal that causes the door to be automatically opened. A similar operation can be performed by using ultrasonic sound waves: i.e., bouncing them off a target and waiting for the echo, and performing some predetermined action based on the echo.

Passive motion detection systems include systems that detect infrared energy to detect motion. Such systems may include sensors known as PIR (Passive InfraRed) sensors or pyroelectric sensors. PIR or pyroelectric sensors may be used, for example, in security systems designed to be sensitive to the temperature of a human being. Humans have a skin temperature of approximately 93 degrees F., and radiate infrared energy with a wavelength between 9 and 10 micrometers. Therefore the sensors are typically sensitive in the range of 8 to 12 micrometers of wavelength. The sensors are typically simple electronic components not unlike photosensors. The infrared energy radiated from a source bumps electrons off a substrate of the PIR or pyroelectric sensors, and these electrons can be detected and amplified into an electrical signal that may be used to activate some predetermined operation. When a person walks by a sensor, the amount of infrared energy in the "field of view" of the sensor changes rapidly and is easily detected. It is the sudden change that is used to detect motion. PIR or pyroelectric sensor could be configured to have a wide or narrow field of view. A wide field of view can be created, for example, by placing a lens over the sensor. A narrow field of view can be achieved by using a sensor without a lens; the field of view can be made even more narrow by placing the sensor in a recess or inside a box or tube that is open in the direction from which motion is desired to be detected. The floor display system of the present invention could use any of the above system and methods, or combinations thereof, or systems and methods not disclosed herein, to implement a motion-detection device 113.

The floor display system according to embodiments of the present invention may also be made interactive by detecting the presence or movement of a person based on other events within the physical environment. For example, the floor display system could be coupled via a wired or wireless connection to a door in an entry way or other door of a commercial establishment or other building. Through the connection, the floor display system could detect the opening of the door, and activate the display in response.

Figure 23:
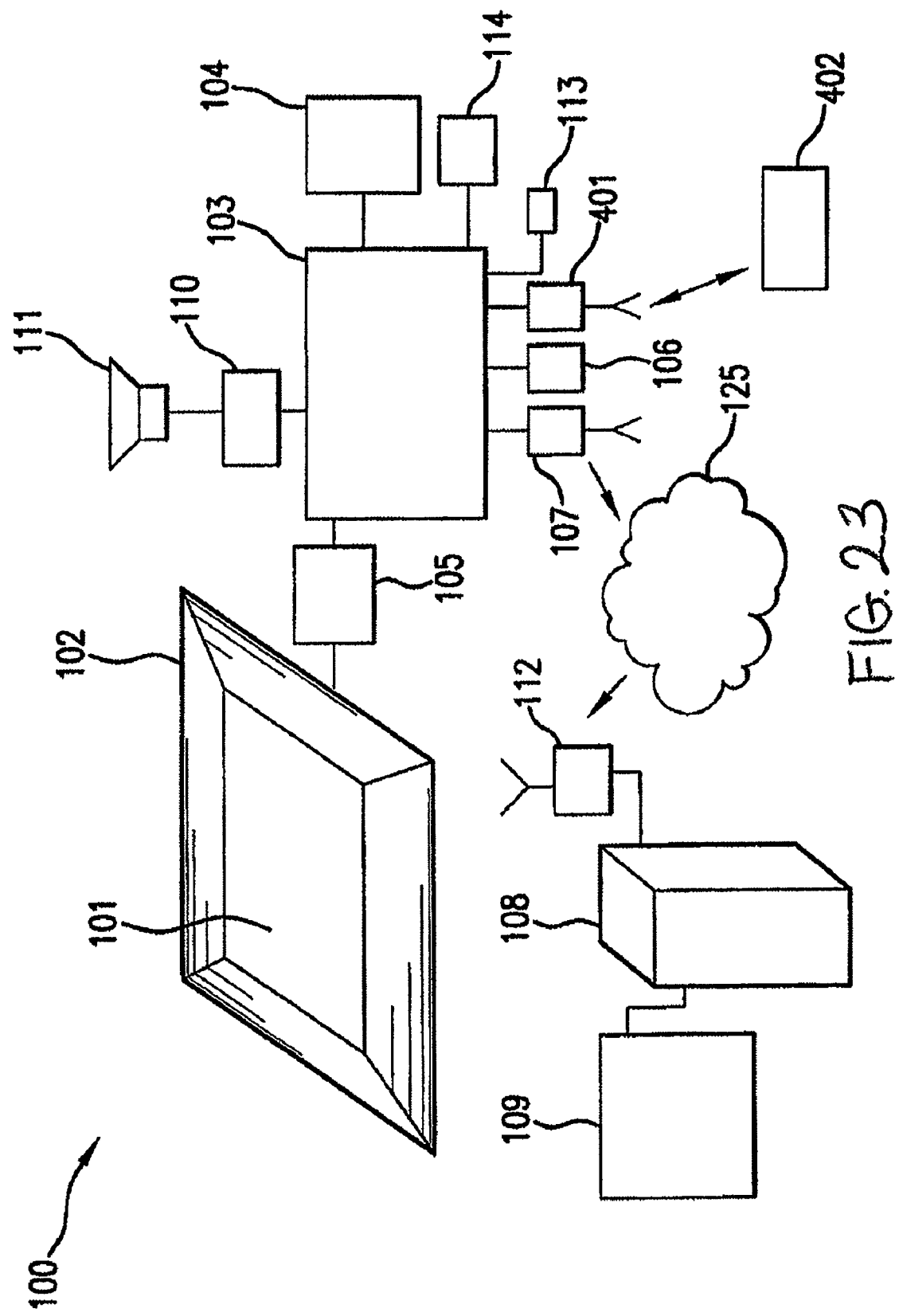
FIG. 23 shows a floor display system including a contactless mechanism for obtaining identity information from an identity device, and also relates to other embodiments further described in the detailed description below.

In still further embodiments providing for interactivity, a floor display system in a commercial establishment could display information customized to a particular individual. Such embodiments could comprise mechanisms for automatically determining a person's identity. For example, as shown in FIG. 23, a floor display system 100 according to embodiments of the invention could further comprise a contact-less input device 401 capable of receiving identification information from an identity device 402 carried by the person. The contact-less input device 401 may be, for example, a wireless port comprising a receiver and an antenna configured to receive and process wireless electromagnetic signals containing identity information emitted by the identity device 402. The identity information obtained from the identity device 402 could be supplied by the wireless port 401 to the controller 103, which could then access a database, such as database 109, to obtain information relevant to the person based on the identity information. Such relevant information may include, but is not limited to: name, age, history of purchases, frequency of store visits, most commonly purchased items, etc. Based on the relevant information, the floor display system could be caused to display information specifically relating to or directed to the person. By way of example only, the display could include a personal greeting. Additionally, the controller of the floor display system could cross-reference the purchase history of the person with the sales or promotional items that are currently available in the commercial establishment. Based on the person's purchase history, the floor display system could display information notifying the person that a certain item potentially of interest to the person is on sale, and display the aisle location of the item. In addition, the floor display system could generate a coupon for the item, thus further encouraging the person to purchase the item.

An example of an identity device 402 that could be used with the contact-less input device 401 is known as a "contact-less" card. Contact-less cards do not require physical application by a person to a reading device. Contact-less cards may have an antenna coil and a chip embedded in the card and be configured to output information in the form of wireless electromagnetic signals. Identity information on this type of card may be obtained when the card passes within a predetermined range of a reading device including a receiver and antenna adapted to receive and process signals output by the card, such as the contact-less input device 401 illustrated in FIG. 23.

Contact-less cards as described above may, according to some, fall under the general category of "smart" cards. Smart cards (or electronic cards) are known devices that typically contain an embedded computer chip and are typically the size of a conventional credit or debit card. The chip typically contains a microprocessor and memory, which may hold an operating system and application data that may be protected by state-of-the-art security features. Several types of smart card technologies are available in today's marketplace. One example is a memory card. A memory card contains a memory chip and is similar to a small floppy disk. This type of (memory) chip can store identity information as well as other kinds of information, such as a store credit amount.

In other embodiments, cards known as microprocessor cards could be used to provide individual identification for purposes of customized displays. Microprocessor cards contain a microprocessor chip that can add, delete, change, and update information. A microprocessor card may further comprise an input/output port, operating system and hard disk, and is thus viewed by many as essentially a miniature computer.

Identification cards such as the smart cards, memory cards and microprocessor cards described above need not be read by a contact-less mechanism as described in FIG. 23. Instead, for example, they could be read or scanned by physical application of the card by a person to a reading device located in a convenient place in the commercial establishment. The reading device may be coupled to, or a component of, an identification system. The identification system could, for example, be implemented in a computer 108 and database 109, coupled to the floor display system of the present invention. The identity information obtained by the identification system could then be communicated to the floor display system.

Some types of cards that specifically require physical application by a person to a reading device could also be used with the floor display system of the present invention. Such cards are known as "contact" cards. Contact cards may have a gold chip embedded in the card. This kind of card requires insertion into a smart card reader and a direct connection with the physical contact points on the card to transmit data. Contact cards are used frequently in banking, communications, health care and loyalty (such as storing automotive service histories) applications.

Cards known as hybrid/twin cards could also be used to provide identification of a person to a floor display system. These cards have two chips embedded in them: a contact-less chip and a contact chip. The two chips are typically not connected to each other. Instead, typically one chip serves the consumer needs and the other the card issuer needs. In yet other embodiments, combination cards could be used. These cards are also known as dual-interface cards, and they contain one chip that is designed to support both contact and contact-less readers.

Using technology along the lines described above, further embodiments of the present invention could be configured to track movements of persons in a commercial establishment or other public place. In such embodiments, persons could carry identification cards readable by a contact-less mechanism as described above. A plurality of floor display systems equipped with contact-less detection mechanisms could be arranged in predetermined locations in the establishment, and track the movements of persons by detecting the identification cards. The cards could be personalized (i.e., identify an individual) as described above, or could be generic, and, for example, attached to a shopping cart or basket. Information detailing the movements detected by the floor display systems could be recorded in a database, and used by merchants to, for example, help optimize the layout of a store, help identify where to place impulse-buy items, and the like. Examples of technologies that may be utilized to track persons carrying or otherwise transporting contact-less identification devices include Blue Tooth technology, IRDA, r-f link, or any other local area network technique to link the floor display systems.

As is well known, some commercial establishments (e.g., Wal-Mart and Target) and do-it-yourself stores (e.g., Home Depot and Lowes) are very large and contain a vast amount of merchandise. As a result, some individuals shopping in these stores have difficulty finding the item(s) they are looking for. Accordingly, floor display systems according to embodiments of the present invention may further provide for assisting a person in finding his or her way around a large commercial establishment and finding desired items.

According to such embodiments, upon entering the store, a shopper would either orally (for example, by using a microphone or other sound recording device) or manually (for example, using a keyboard, keypad, or touch monitor type device) enter a desired product or list of products into a machine. The machine would then produce a "trip ticket" detectable by a plurality of floor display systems arranged in predetermined locations throughout the store.

The trip ticket may be a device such as a "smart card" described above, capable of storing information such as the product list entered by the shopper. The information on the trip ticket may be readable via a contact-less technology as discussed in connection with various embodiments described above. Floor display systems distributed throughout the store may be equipped with contact-less technology for reading the trip tickets. As the shopper moves through the store and approaches the various floor display systems, the systems may detect and read the trip ticket. Upon detecting a trip ticket and reading a product list thereon, a floor display system may be configured to display the direction the shopper should walk to locate the desired product(s). Alternatively, the trip ticket might not actually store the product list itself. Instead, the product list or other information corresponding to an identifiable trip ticket could be stored in a database accessible by the floor display system, and retrieved upon detecting and identifying the trip ticket.

In still further embodiments of the present invention, detection of mobile phones may be provided. Social frictions have been occasioned by the increased use and rising popularity of mobile phones. In many situations, it is considered inappropriate and impolite to have a mobile phone ring and disturb nearby persons. Accordingly, embodiments of the present invention may include a mobile-phone-detection device, using a configuration as shown in FIG. 23, where the contact-less input device 401 is a mobile-phone-detection device. Devices that could be used to detect mobile phones include, for example, near-field RF detectors that can pick up a wide range of RF signals. Such devices are known, for example, for detecting illegal listening devices or "bugs". One commercially available example includes the MicroAlert™ system that is capable of detecting the presence of a mobile phone or any device emitting RF radiation. The mobile-phone-detection device 401 could be configured to send a signal to the controller 103 of the floor display system upon the detection of a mobile phone that was powered on. In response to the signal, the controller could cause a display to be generated comprising, for example, a message indicating that the powered-on mobile phone had been detected, and/or sound an alarm indicating that the mobile phone had been detected. Additionally, the floor display system could display a request that the mobile phone be powered off, or sound an audible request that the mobile phone be powered off.

Embodiments of the present invention as described in the foregoing could find particularly beneficial application in such settings as, for example, the entrances of orchestra houses, venues for musicals or plays, movie theatres, or any other place where a ringing phone may be deemed inappropriate.

Displaying a Person's Camera Image

Figure 24:
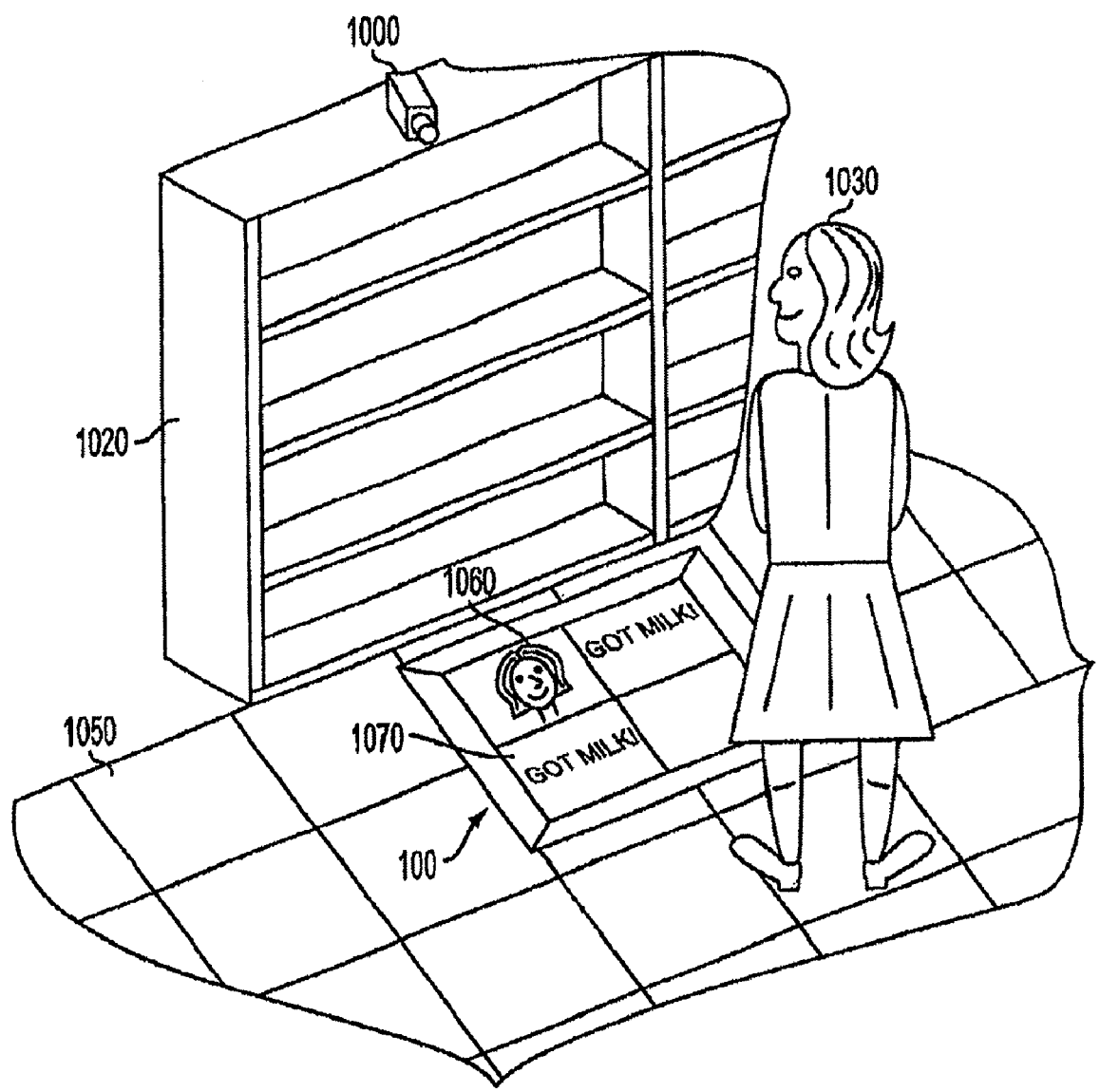
FIG. 24 shows various interactivity devices which may be associated with a floor display system according to embodiments of the present invention.

Embodiments of the present invention may include an interactivity device implemented as a camera to capture a person's image and cause it to be displayed on a floor display system. An illustrative example is shown in FIG. 24. A camera 1000 may be mounted near a floor display system 100 on a floor 1050, for example, on shelving 1020. The camera 1000 may be positioned so as to capture an image of a person 1030 walking or standing near the floor display system. The person's image 1060 could, for example, be incorporated into an advertisement 1070 displayed on the floor display system. The person's image could be displayed, for example, as continuous motion video, or in a still image. A "frame-grabber" feature of the camera could be used to create a still image. The still image might be modified, for example, by image editing software, to convey some entertaining message. For example, in the advertisement 1070 of FIG. 24, a milk mustache could be superimposed onto the face of the person.

Optics

Figure 25:
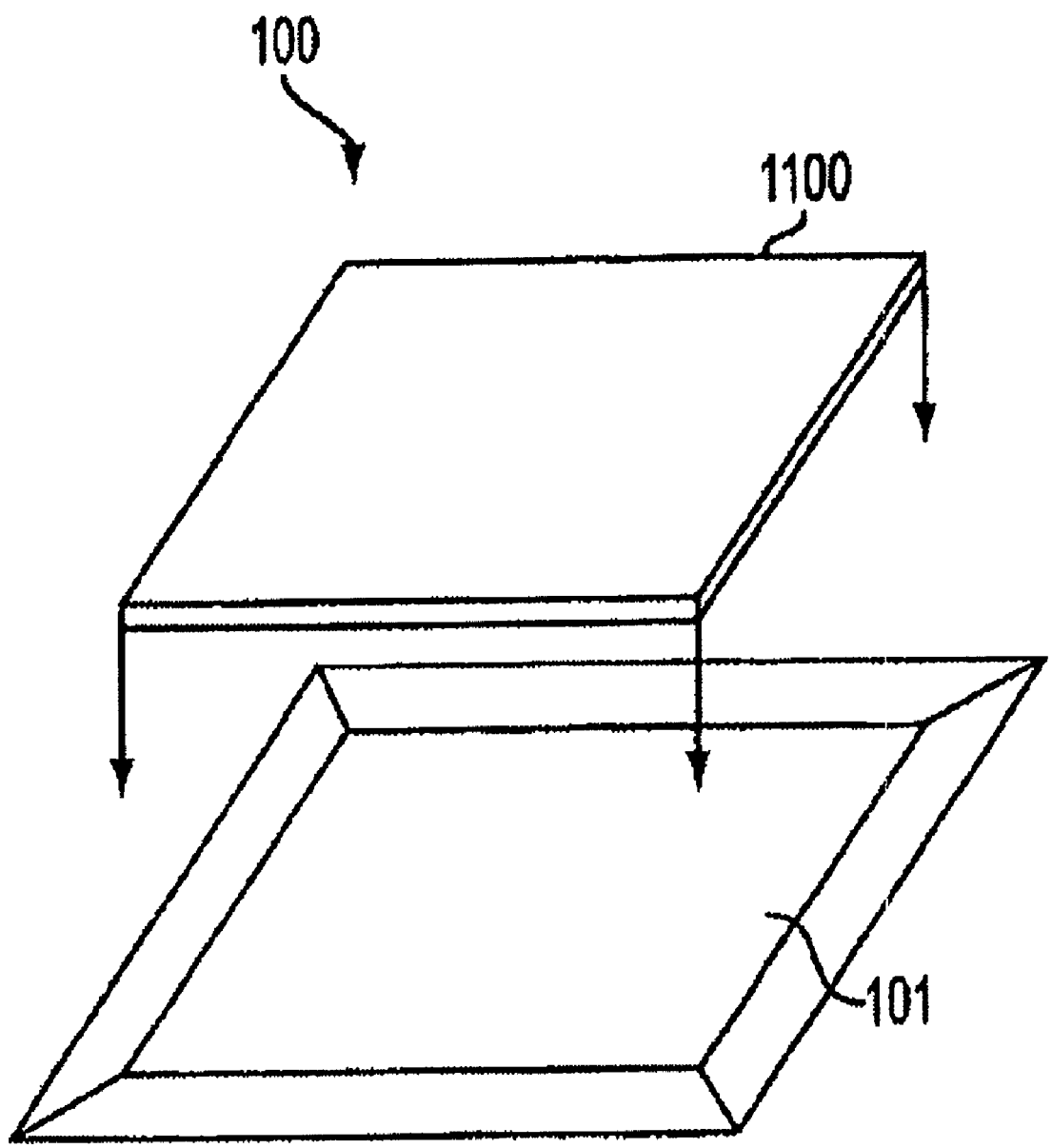
FIG. 25 shows a layer of material comprising a thin diffractive prism according to embodiments of the present invention.

Techniques for enhancing visibility or a visual effect of a display according to embodiments of the invention include the use of prisms. Diffractive or Fresnel prisms are known and are commercially available, for example, under the brand name Reflexite™. Such diffractive prisms may be as thin as a few millimeters or even a fraction of a millimeter. According to embodiments of the present invention, a thin layer of material comprising a diffractive prism may be arranged over an electronic display device of a floor display system. Placing such a diffractive prism over an electronic display device could enable a corresponding display to be more easily visible, particularly along a specific direction. At the same time, because the prism material is thin, the floor display system could remain unobtrusive. FIG. 25 illustrates arranging a layer of material 1100 comprising a thin diffractive prism over an electronic display device 101 of a floor display system 100.

Product Identification/Location Feature

In applications of the floor display system according to embodiments of the present invention, a product being promoted on the floor display system may be located in a store among a number of similar products, making the product being promoted difficult to find. An example is shown in FIG. 24. In FIG. 24, a floor display system 100 is arranged in front of a row of shelves 1002. The shelves hold a variety of different brands of hair care products. The floor display system 100 is displaying an advertising message 1001 promoting one particular brand of the hair care products on the shelves. Because the shelves hold an array of similar hair care products extending many feet, the particular product being promoted may be difficult to find.

Accordingly, in still further embodiments of the present invention, the floor display system 100 may comprise a product identification/location feature. This feature could be very helpful in allowing a consumer to quickly locate a product being promoted on the floor display system. Referring to FIG. 24, the product identification/location feature may comprise a signaling device 1003 (not shown to scale) arranged near a product being promoted on the floor display system. The controller 103 (see FIG. 1) of the floor display system may communicate with the signaling device 1003. Under the control of the controller, the signaling device may be caused to emit a signal when a particular product is being promoted on the floor display system. The signal could be visible, audible or olfactory, or any combination of these. For example, when a particular product is being promoted, the signaling device could be caused to blink or flash a light, emit a sound, emit a fragrance, or perform any combination of these. Such signals would enable a consumer to easily and quickly locate the product being promoted.

A signaling device 1003 for product identification/location according to embodiments of the present invention is further illustrated in FIG. 25. The signaling device 1003 may comprise a light source 1101, a sound source 1102, and a fragrance source 1103. However, the signaling device 1003 need not include all of these and may include only a light source, only a sound source, or only a fragrance source. Or, the signaling device could include any desired combination of a light source, a sound source, and a fragrance source. Any of the light source, the sound source or the fragrance source, or combination thereof, may have associated therewith a housing 1100. The housing 1100 could be designed so that the signaling device 1003 could be free-standing. Additionally or alternatively, the housing could have a fastening device 1104 associated therewith. The fastening device 1104 could be part of the housing or an independent part affixed to the housing. The fastening device 1104 could include, for example, hooks, snaps, adhesive, magnets, a hook-and-loop arrangement such as Velcro™, or any other suitable fastening arrangement. The signaling device 1003 may further include an independent power source 1105, such as a battery, but could receive power from the floor display system or other source.

The signaling device 1003 may be coupled by a wired connection 1107 or a wireless connection 1108 to the floor display system 100 and receive control signals from the controller 103 via the wired connection 1107 or wireless connection 1108. To receive wireless signals, the signaling device could include a transceiver 1106. The signaling device could further include its own logic device 1109, such as a microprocessor, that could be programmed to execute processes independently of the control of the controller 103. For example, the controller 103 might simply send an initiating signal to the signaling device 1003 to cause it to initiate some sequence of light flashes, or of sounds, or of fragrance emissions, or of any combination of these, under the control of logic device 1109.

Again, the signaling device 1003 may be used for product identification/location. For example, the signaling device could be arranged on a shelf near a product being promoted, either free-standing or affixed by the fastening device 1104 to the shelf or other support. When the floor display system is generating a particular display to promote the particular product, it may send a corresponding signal to the signaling device 1003. In response, the signaling device may generate a visible display, such as a continuous light or a sequence of light blinks, flashes, or varying brightness, emit a sound such as a tone or buzz or product jingle, emit a fragrance, or any combination of the foregoing.

The floor display system could be caused to generate the particular display promoting the particular product based on signals generated by an array of sensors 280 arranged in, on or below the transparent member 240 as described above. Additionally or alternatively, the floor display system could be caused to generate the particular display promoting the particular product based on the detection of merely the proximity of a person to, as opposed to a person actually stepping or walking on, the floor display system. Such detection could be performed by sensing device 113 (see FIG. 1). Sensing device 113 may take on a number of varying forms, each of which enables the detection of phenomena or activities indicating the presence of persons in the vicinity of the floor display system, and causes the floor display system to perform some corresponding action in response. The corresponding action may be generating a display promoting a particular product, and as a result, activating the signaling device 1003 as described above. In one such embodiment, the sensing device 113 is a sound-sensing device. Examples of sound-sensing devices include omni-directional and directional microphones. The sound-sensing device 113 may be located within the floor covering 102 (see FIG. 1), or may be located at some distance from the floor covering. The sound-sensing device could be configured to detect an individual as he or she approached the floor display system, and to cause a corresponding response to be generated by the floor display system.

In yet another embodiment, sensing device 113 may be a motion-detection device. Examples of motion-detection devices include devices that detect light, temperature or pressure changes as discussed above, and devices that detect motion by injecting energy (e.g., light, microwaves or sound)

into the environment, and then detecting a change in the energy. The motion-detection device 113 could be located within the floor covering 102, or may be located at some distance from the floor covering, for example, in or on a ceiling or wall near the floor covering. The motion-detection device could be configured to detect an individual as he or she approached the floor display system, and to cause a corresponding response to be generated.

The floor display system according to embodiments of the present invention may also detect the presence or movement of a person based on events within the physical environment. For example, the floor display system could be coupled via a wired or wireless connection to a door in an entry way or other door of a commercial establishment or other building. Through the connection, the floor display system could detect the opening of the door, and activate the display in response.

In embodiments, the floor display system could be arranged, for example, in the "raceway" of a commercial establishment. A raceway is a common area at ends of a plurality of aisles (e.g., in a common layout of grocery stores, the raceway is between the checkout counters and the aisle ends). A signaling device or devices could be arranged down the aisles and visible from the raceway to indicate the location of a product being promoted on the floor display system.

Audio

Embodiments of the present invention may provide for carefully controlling the amount of sound generated by an audio device 111 of a floor display system, in particular, for example, with a view to minimizing disturbance to visitors of a commercial establishment or other public building containing a plurality of floor display systems. To this end, volume and bandwidth of sound output by the audio device may be controlled to limit how far the sound travels. For example, lower frequency sound waves (e.g., less than around 200 to 300 Hz) will travel farther with less attenuation than sound waves at higher frequencies. Thus, embodiments of the invention may comprise control mechanisms, such as controller 103 executing suitable software, for controlling audio output to include frequencies slightly higher than around 200 to 300 Hz, and for controlling amplitude so that the audio output is optimally perceivable by a person within a predetermined range.

Embodiments may further include proximity detectors to provide signals for making determinations relating to what kind of audio output should be generated. For example, the proximity detectors could detect when a person was within a predetermined distance from a floor display system, and send corresponding signals to a controller of the floor display system. Based on the signals received from the proximity detectors, the controller could start or stop audio output, control audio frequency and volume, and the like. Controllers of respective floor display systems could also be linked to a central computer, as described above in connection with the various network configurations possible for floor display systems. The central computer could control the audio output of respective floor display systems to, for example, prevent floor display systems within a predetermined distance of each other from generating audio output simultaneously.

In embodiments, the audio device 111 could further include directional speakers, for example either incorporated into the floor covering or arranged nearby. The directional speakers could be pointed in a direction or directions in which it is expected that persons will approach. Proximity detectors could detect what direction a person is approaching from, and this information could be used by a controller to cause a corresponding directional speaker to generate audio output.

It should be understood in view of the above discussion of audio control, and of the earlier discussion of variable image orientation, that embodiments of the present invention may provide for controlling video and/or audio output based on the proximity of persons. More specifically, based on the proximity of persons, a floor display system according to embodiments of the present invention could start or stop either video or audio output, and adjust image orientation and audio output characteristics, either separately or in combination.

Protective Covering

As described above, embodiments of the invention may comprise a sturdy protective cover for the electronic display device. Further implementation details, according to possible embodiments, for such a protective cover are discussed below with reference to FIGS. 26A-26B.

Figure 26A:
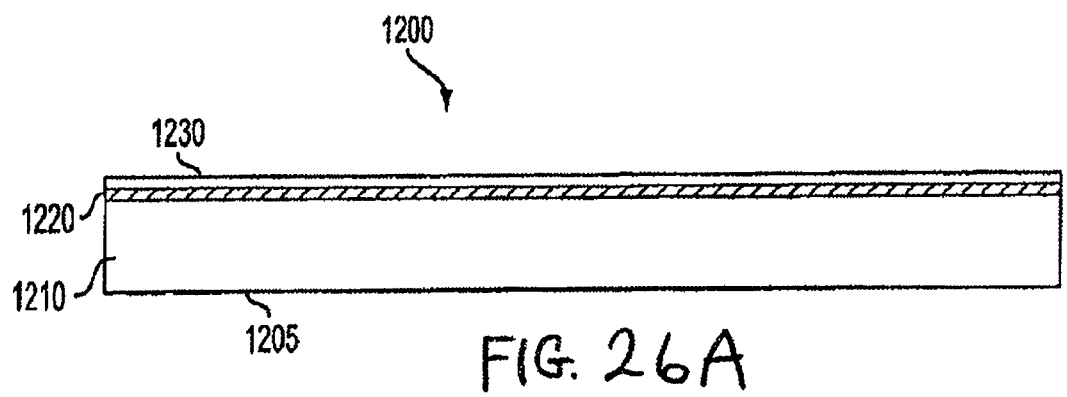
FIGS. 26A and 26B show a protective cover according to embodiments of the present invention.

As shown in FIG. 26A, a protective cover 1200 may comprise a strong transparent member 1210, constructed from, by way of example only, glass or a rigid plastic. The protective cover may include a hard coating 1220 over the transparent member 1210, where the coating 1220 is, for example, a diamond-like coating, such as known hard dense carbon coatings that have mechanical properties similar to diamond, but are not as expensive. The coating 1220 could also be formed from or include plastic or polymeric coatings, such as those used to coat plastic lenses that are well known in the art. The protective cover may further include an anti-reflective coating 1230 over the hard coating 1220. The anti-reflective coating 1230 may include, for example, multiple layer or organic metal oxides or organic or polymeric coatings with various index of refraction that reduce reflection as known in the lens coating art. Though not shown, in embodiments there could be an anti-reflective coating on a bottom surface 1205 of the transparent member 1210. Coatings as described in the preceding may reduce glare and resist scratching.

Figure 26B:
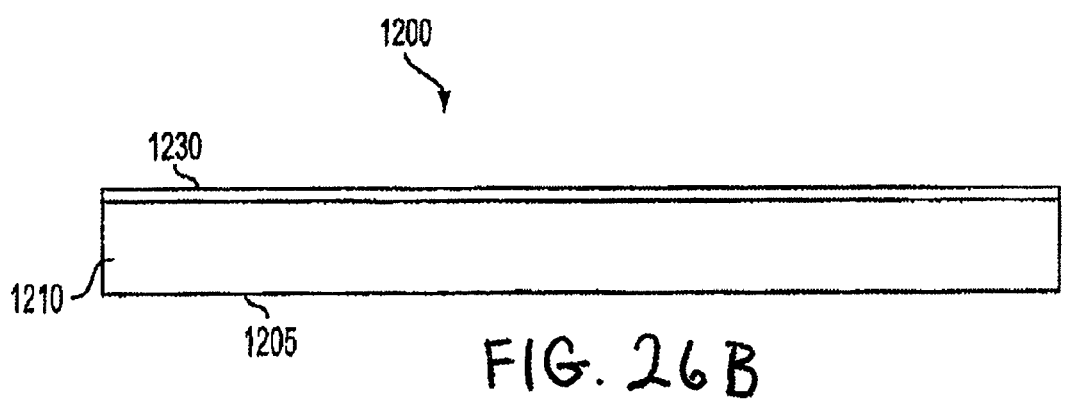

FIG. 26B shows an alternative embodiment where hard coating 1220 is omitted and only an anti-reflective coating 1230 is provided on a top surface of the transparent member 1210. Again, though not shown, in embodiments there could also be an anti-reflective coating on a bottom surface 1205 of the transparent member 1210.

Anti-Slip

Figure 27A:
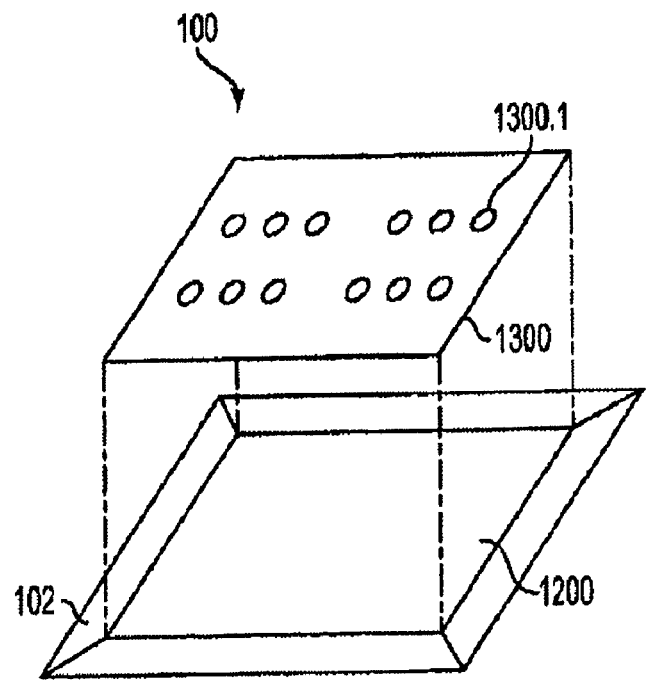
FIGS. 27A and 27B show a protective sheet according to embodiments of the present invention.

Embodiments of the present invention may further comprise a removable transparent protective sheet. The removable transparent protective sheet may include an anti-slip feature to help reduce the likelihood of a person slipping when he/she steps on the floor display system, for example due to moisture or wetness. Referring to FIG. 27A, the removable transparent protective sheet 1300 may be arranged over the protective cover 1200 described above. In addition to preventing damage to the protective cover 1200 (e.g., soiling and scratching), the sheet 1300 may have a slip-resistant surface, where the resistance to slipping may be provided by particles such as grit or sand on or incorporated into the surface, by treads, apertures, or any other kind of discontinuity 1300.1 in the surface, by water-absorbing and/or water-dissipating materials in the sheet, or any other material properties of the sheet contributing to slip-resistance, an anti-slip coating on the surface, or any combination of the foregoing. The sheet could cover the entire floor display system, including the electronic display device and the floor covering, or could cover only portions thereof. Anti-slip material could be, for example, distributed across the floor display system in the form of strips.

Figure 27B:
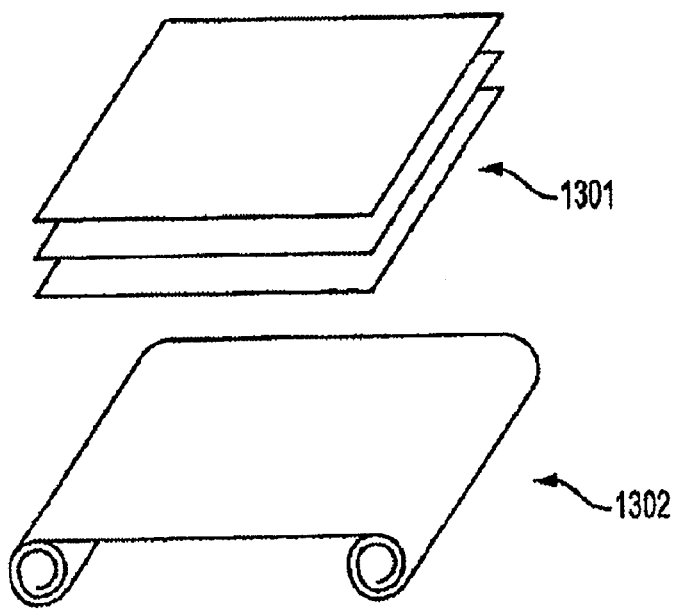

As shown in FIG. 27B, embodiments could include a plurality of protective sheets in the form of a stack 1301, where sheets could be individually removable. When a top sheet of the stack became soiled, it could be removed and discarded to expose a fresh sheet below. According to still further alternatives, an anti-slip protective sheet material could be in the form of a roll of continuous material 1302, where clean material is dispensed by, for example, a timing mechanism or a dirt-detection mechanism.

Fragrance Technology

Embodiments of the present invention may comprise fragrance technology. For example, a stack of layered sheets with a scent or fragrance trapped between each sheet could be provided in a dispenser used in conjunction with a floor display system. For example, the stack of layered sheets could be arranged in a dispenser provided on or near the floor display system, for example on a stand. Alternatively, a layer of transparent scented sheets could be arranged over all or portions of a floor display system, for example on the inclined surfaces of the floor covering. Such a feature may be especially effective in the marketing of soaps, lotions, cosmetics, laundry detergents, fabric softeners, air fresheners and many other products that utilize scent or fragrance as a primary feature.

Figure 28:
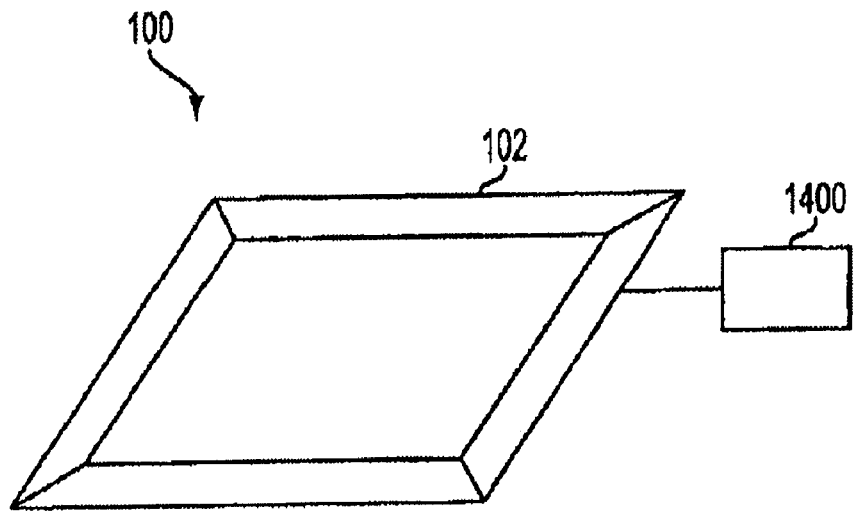
FIGS. 28 and 29 show an alarm system according to embodiments of the present invention.

Referring to FIG. 28, in alternative embodiments, the floor display system 100 could include an electromechanical fragrance dispenser 1400 that releases a puff of fragrance on a periodic basis or in conjunction with a given advertisement. The dispenser 1400 could, for example, be connected to, in or on the floor covering 102 or be otherwise associated with the floor display system. Such dispenser devices have been developed using small piezoelectric actuators to create very small pumps that spray a small amount of a stored fragrance. Also, MEMs (Microelectronic Mechanical Systems) have been developed to do electromechanical pumping of fluids.

Theft Prevention

Embodiments of the present invention may provide for theft prevention, as discussed below.

Alarm System

Figure 29:
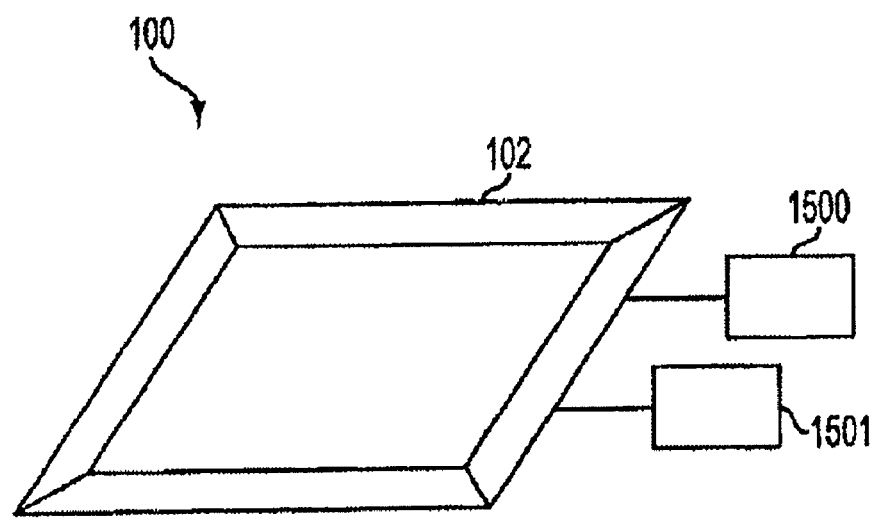

A floor display system according to embodiments may comprise an alarm system configured to be activated if the floor display system is moved without authorization. Referring to FIG. 29, the alarm system may comprise an unauthorized-motion motion detection device 1500 able to detect whether the floor display system is moved. The device 1500 could, for example, be connected to, in or on the floor covering 102 or be otherwise associated with the floor display system 100. The device could include, for example, an accelerometer or mercury switch coupled to the controller 103. Upon detecting a change in position of the floor display system, the device could send a signal to the controller. The controller might then make a determination as to whether an audible and/or visible alarm should be generated. The alarm could include, for example, emitting a siren sound or the like, and/or causing a message such as "WARNING" or "THIEF" to flash on and off on the display device. A switch or software setting could be used to deactivate the alarm system so that the floor display system could be moved without the alarm being generated.

Electrical Pulse

A floor display system according to alternative embodiments may comprise an alarm system including a device able to detect whether the floor display system is moved, as described above. However, alternatively or in addition to generating an alarm, the alarm system may be configured to emit an electrical pulse if the floor display system is moved without authorization. Accordingly, referring to FIG. 29, the floor display system 100 could include an electrical pulse generator 1501. The electrical pulse generator could, for example, be connected to, in or on the floor covering 102 or be otherwise associated with the floor display system. The electrical pulse generator 1501 could generate an electrical pulse that may cause an unauthorized handler of the floor display system to refrain from further handling of the floor display system. A switch or software setting could be used to deactivate the electrical pulse generator so that the floor display system could be moved without the pulse being generated.

Security

A floor display system according to other embodiments of the present invention could be used for security applications. Known security technology that is used in commercial establishments to prevent theft includes "Electronic Article Surveillance" technology to monitor the entrances/exits of an establishment. This technology involves using antennas that are placed on either side of a door opening. The antennas are coupled to other components of article surveillance technology. One antenna may act as a transmitter, and another as a receiver. A recognition device, which may comprise a tuned circuit including an inductor and capacitor, soft magnetic strips or wires, or vibrating resonators, may trigger detection by disturbing the transmission between the transmitting antenna and the receiving antenna when passing between them. Each protected item in the store may be tagged with a recognition device that can be detected by the antennas placed on either side of the store entrance/exit. The article surveillance technology recognizes protected items when they pass through the antennas, sounding an alarm to alert sales personnel of possible attempted theft.

Electronic article surveillance (EAS) technology as described in the foregoing could be incorporated into a floor display system according to embodiments of the present invention. In one configuration, for example, a floor covering 102 according to the present invention could include antennas 501 and 502 arranged along edges of the floor covering, to detect protected items tagged with recognition devices. The antennas could be coupled to other components of article surveillance technology, to enable protected items to be recognized. In order to detect possible theft of the protected items, a floor covering or plurality of floor coverings containing such antennas may be arranged on the floor near the entrance(s)/exit(s) to a store. Thus, as a person walks over a floor covering in an effort to exit the store with a protected item tagged with a recognition device, the recognition device may pass between or near the two antennas and therefore be sensed and recognized by the article surveillance technology. Upon detection of a protected item, the floor display system could be caused to display a visible alert or sound an audible alert. An electronic article surveillance system utilizing a floor display system according to embodiments of the invention could also be used, for example, with a third antenna 503. The third antenna could be the transmit antenna of the EAS device, while one or more antennas in the floor covering could be the receiver antenna(s). Alternatively the third antenna 503 could be an additional receiver antenna, where the floor cover includes both a receiver and transmitter antenna. The third antenna 503 could be arranged over the floor covering, for example, in or suspended from the ceiling. In embodiments, the floor covering may include only a single antenna that may cooperate with an overhead antenna.

Construction and Assembly

Figure 30:
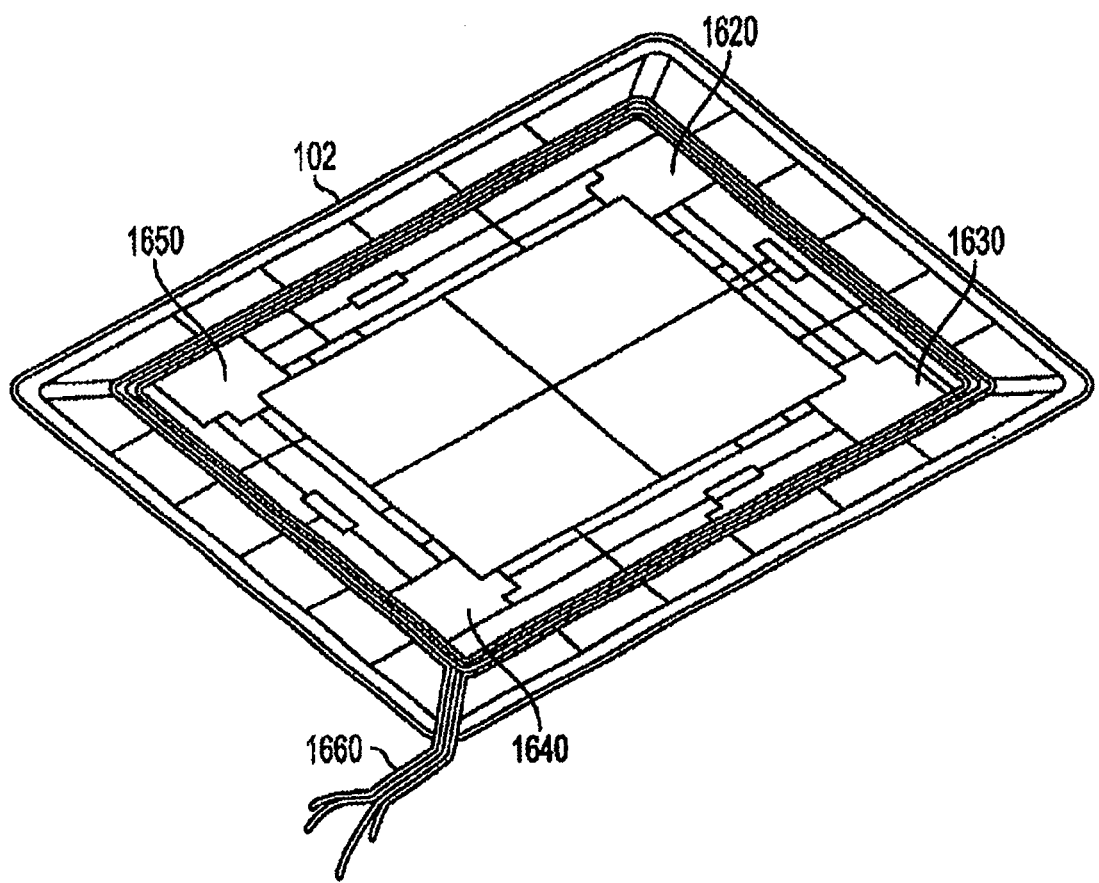
FIGS. 30-32 show components and assembly of a floor display system according to embodiments of the present invention.

FIG. 30 illustrates details of possible implementations of embodiments of the present invention. As shown in FIG. 30, a floor covering 102 of the floor display system 100 may comprise four electronic inverters 1620,1630,1640, 1650 for providing power for driving a back light on each of, for example, four LCD displays in a four-panel electronic display device as discussed above. Power may be supplied via cables 1660. A controller such as controller 103 might be constructed to be small or thin enough to be held within the borders of the floor covering 102 when other components are added to form a more complete assembly, as discussed below. According to possible embodiments, a base component 210 may be configured to receive and support a wiring assembly 220 comprising electronic inverters 221, 222, 223, and a fourth inverter, and associated power supply cables 226.

Figure 31:
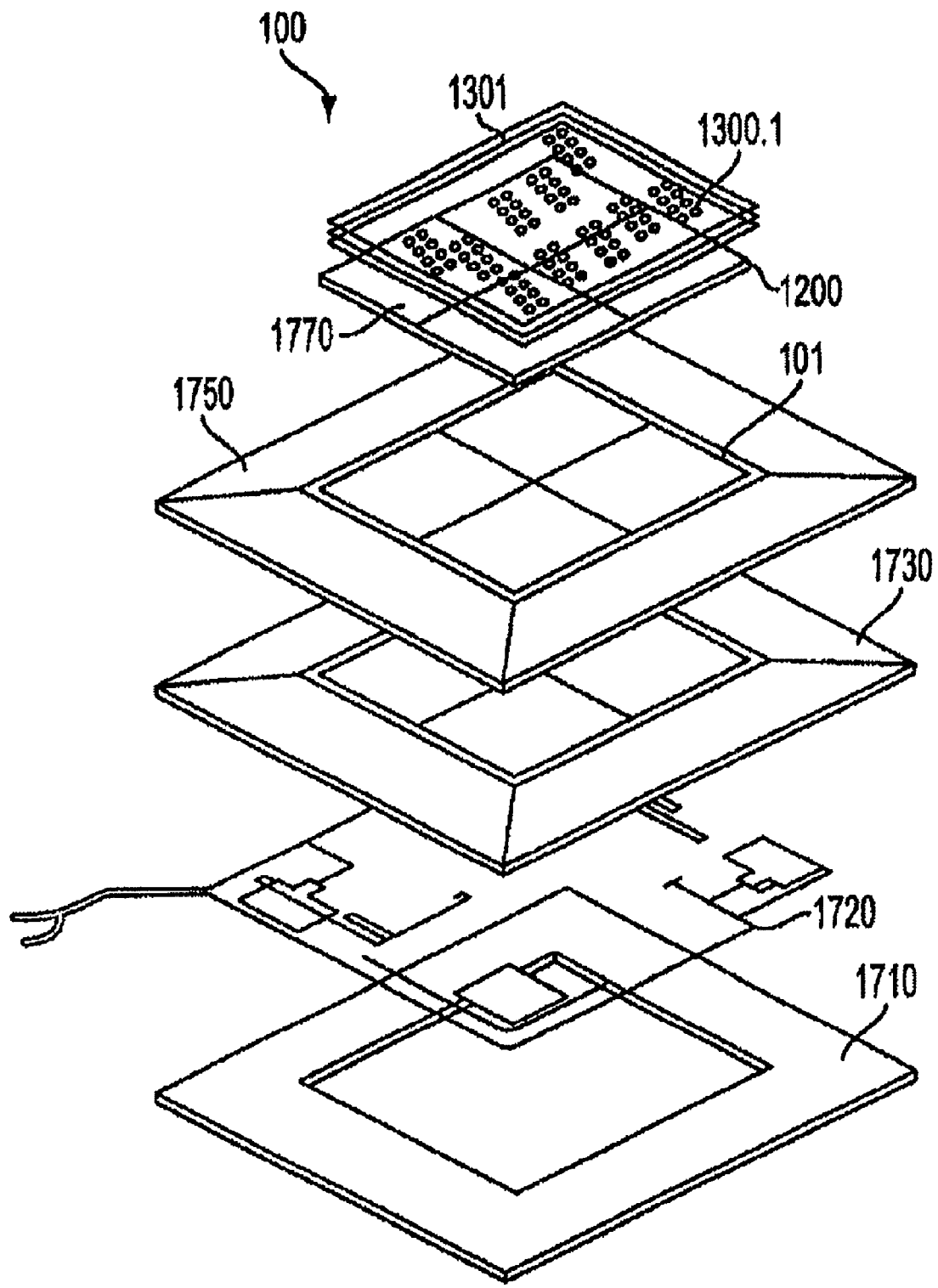

FIG. 31 is an exploded view of the floor display system 100. A base component 1710 may be configured to receive and support a wiring assembly 1720 comprising the four inverters 1620, 1630, 1640, 1650 and cables 1660 as described above. A structure 1730 may be arranged over the wiring assembly 1720; structure 1730 may be formed from plastic or other material and provide support for the inclined surfaces 212, 213, 214, 215 described above. The structure 1730 may further be configured to receive, for example in recesses formed therein, an electronic display device 101 comprising four separate panels.

Sections of surfacing material 1750, such as carpet or rubber, may be placed over structure 1730, to form inclined surfaces 212, 213, 214, 215. A plate of tempered glass including support ribs 1770 may be used as a protective covering 1200 for the electronic display device 101. Components of the floor display system may be held together, for example, with adhesive, epoxy or mechanical fasteners. A plurality of separable protective sheets 1301 may be placed over the tempered glass 1200. The protective sheets 1301 may include anti-slip features 1300.1.

While not shown, an audio device 110 could be included in the above-described assembly. The audio device could be formed, for example, from thin profile speakers or piezoelectric speakers.

Figure 32:
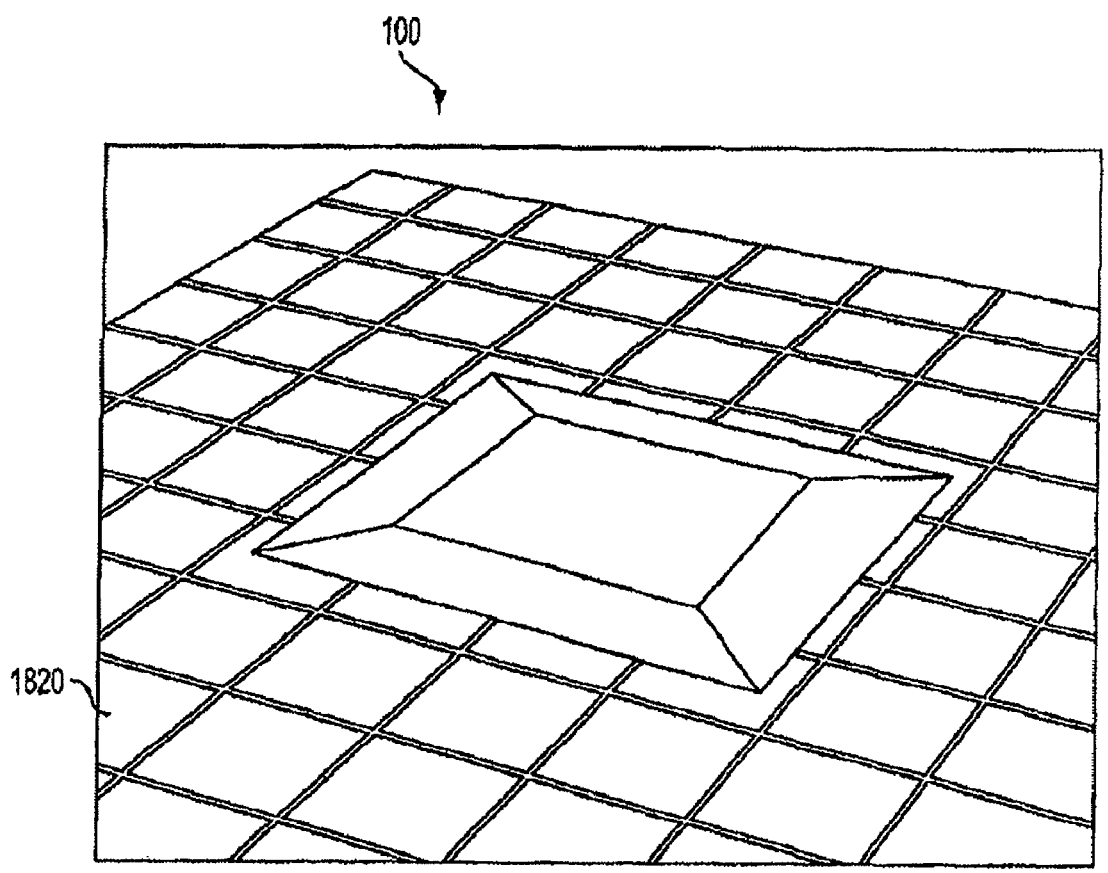

FIG. 32 shows assembled components of a floor display system 100 according to embodiments, resting on a tiled floor 1820.

Heat generated by electronics of the floor display system could be managed by potting compounds known for such purposes. The electronics could, for example, be potted and bonded to a thin metal plate that would act as a heat sink.

Embodiments of the present invention may further comprise waterproofing elements, to prevent moisture from, for example, foot traffic from damaging electronic components. Such waterproofing elements could include, for example, potting compounds used as sealants in interstices which could admit damaging moisture. For example, a potting compound could be used in spaces between the electronic display device and the floor covering to block out moisture. A water-resistant substance such as silicone could also be used for such a purpose. Further, for example, a water-resistant seal could be formed between a protective cover of the electronic display device and other surfaces of the floor display system. A sealant such as silicone could be used to form the water-resistant seal.

Track-and-Trench System

Embodiments of the present invention may include a floor display system implemented as a "track-and-trench" system. The track-and-trench system may be configured to support the deployment of one or more electronic display devices in a floor.

Figure 33:
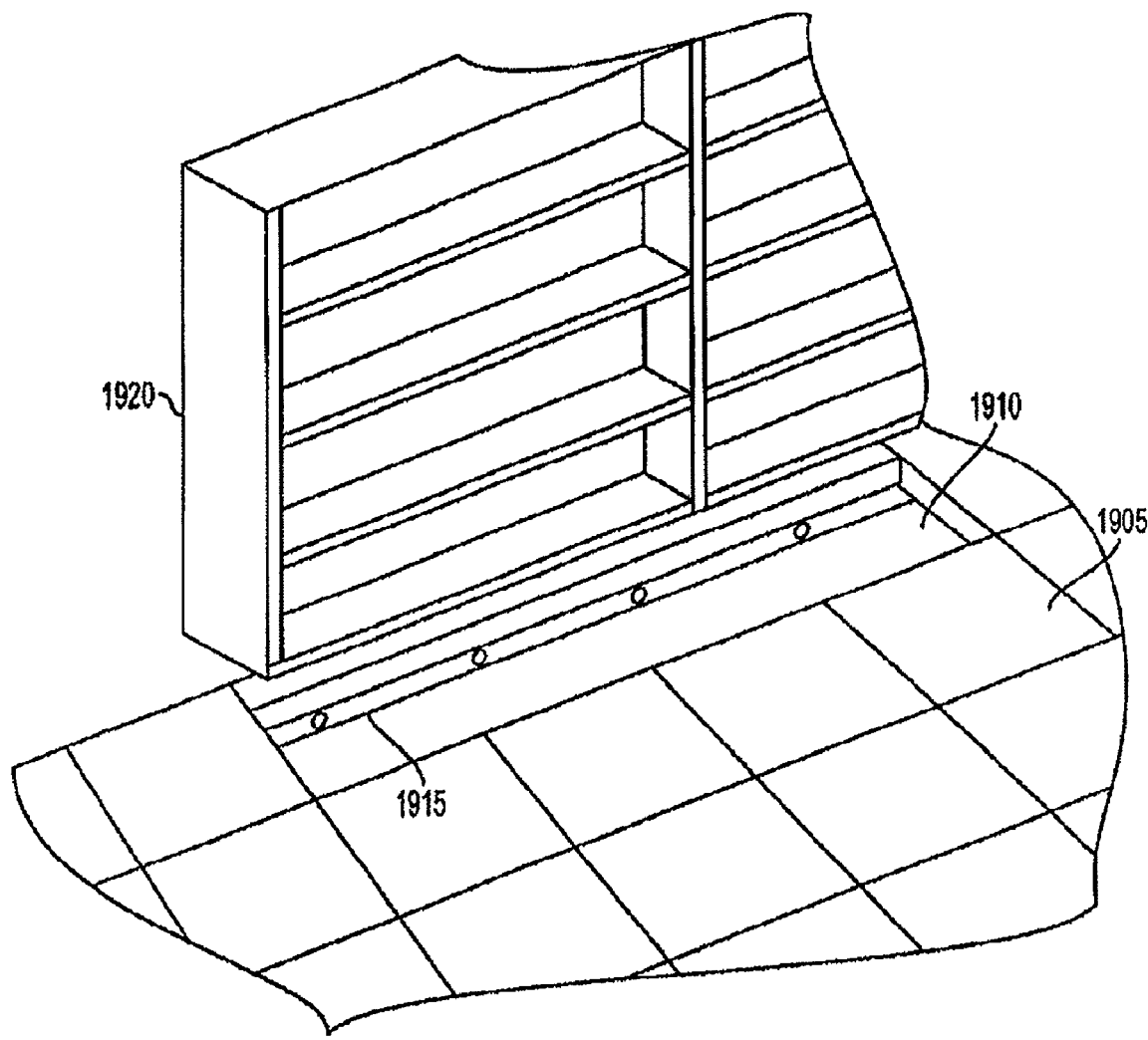
FIGS. 33-34 and 35A-35B show a track-and-trench system according to embodiments of the present invention.

FIG. 33A shows an illustrative example. In FIG. 33A, a trench 1910 is formed in a floor 1905. A track 1915 is arranged within the trench. Shelving 1920 may be arranged adjacent to the track and trench.

The track 1915 may include elements for supplying electric power and for transfer of electronic data. For example, electric power cabling and data transfer cabling could be fastened to, or enclosed within, or otherwise associated with the track 1915. The power cabling and data transfer cabling could include a plurality of connections for connecting electronic devices thereto, in order for the devices to receive power and/or data via the cabling.

Figure 34:
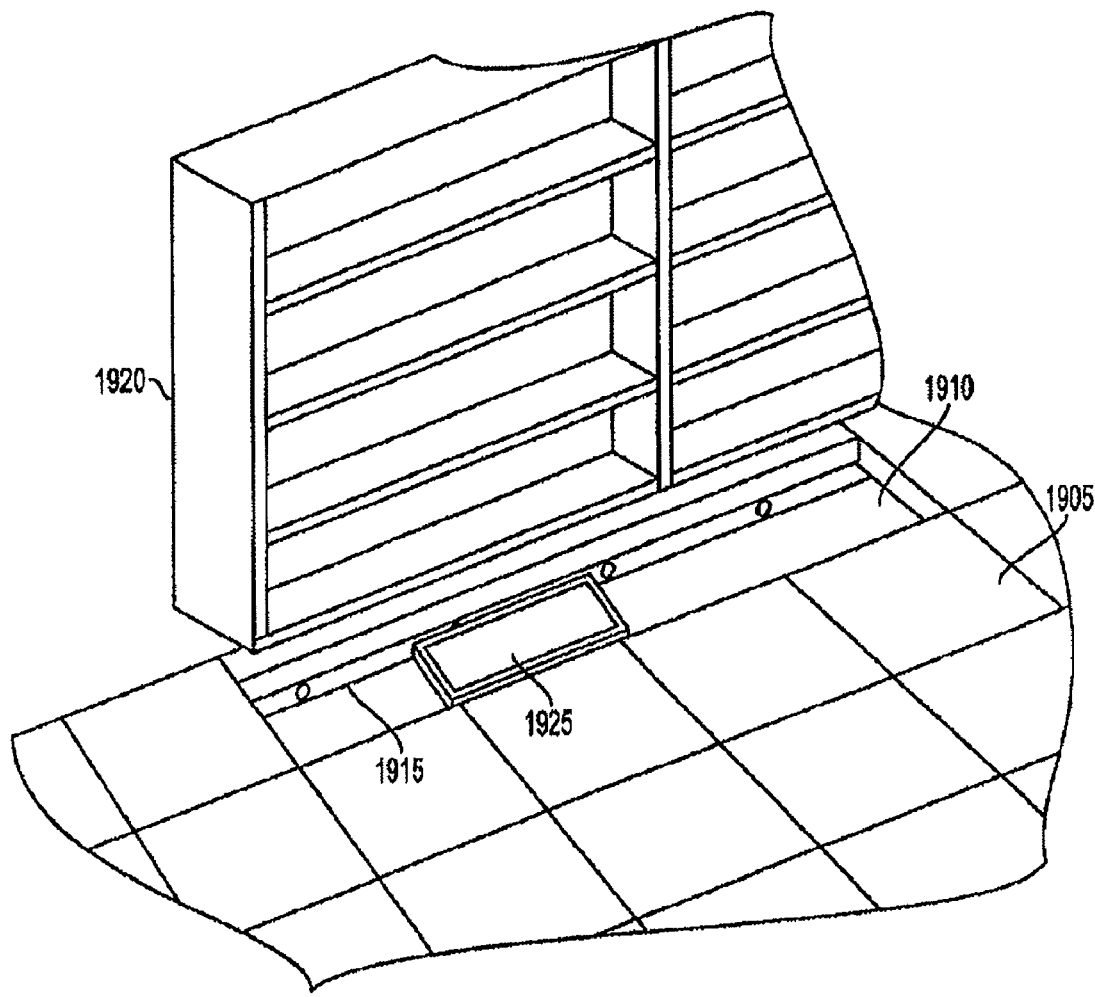

FIG. 34 shows an electronic display device 1925 arranged in the trench 1910. The electronic display device 1925 may be connected in some way to the track 1915: for example, it could be hooked or snapped into the track 1915. The electronic display device 1925 may include any of the display technologies and capabilities discussed above. Further, though not shown in FIG. 34, it should be understood that the electronic display device 1925 may be associated with any of the devices discussed above, including audio devices, sensing devices, interactivity devices, network devices, and so on. More specifically, for example, the electronic display device may 1925 be coupled by wired or wireless means to a controller such as controller 103, and modifiable via the controller to display any content chosen by a user as described above. The electronic display device 1925 and corresponding controller may be connected to a power supply of the track 1915. The controller may further be coupled to a storage medium such as storage medium 104. Data may be stored in the storage medium using, for example, a data port such as data port 106 coupled to a common bus. The data port could be coupled to the data transfer cabling of the track and receive content through the cabling for storage in the storage medium and display on the electronic display device 1925 under the control of the controller. Thus, the electronic display device 1925 may be configurable to display electronically modifiable arbitrary content, support image rotation and/or translation, or otherwise include any of the capabilities discussed above in connection with an electronic display device.

Figure 35A:
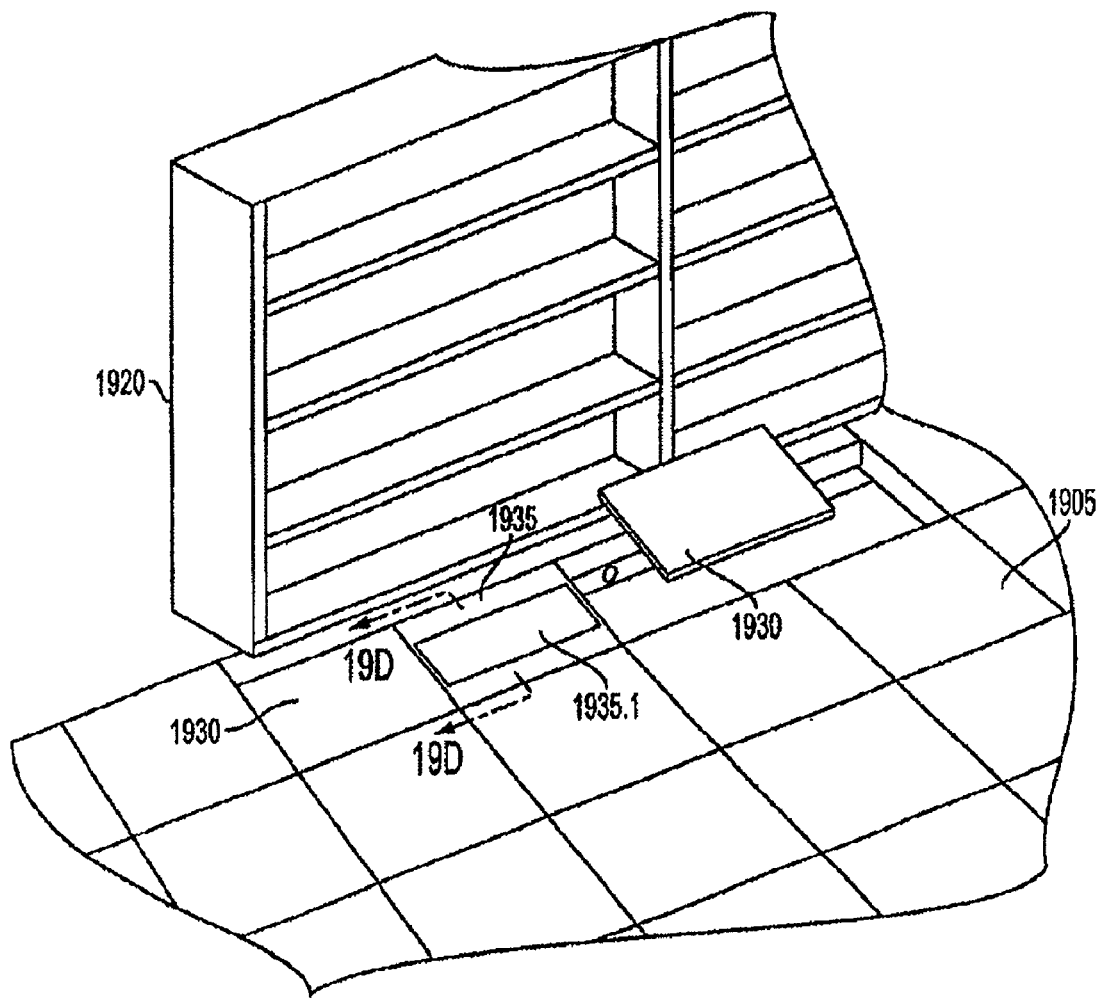

As shown in FIG. 35A, space in the trench 1910 may be closed or covered by fitted sections such as sections 1930. Such fitted sections could be used to close up space in the trench not filled by an electronic display device 1925. Embodiments of the invention could further comprise a protective covering 1935 for the electronic display device. The protective covering 1935 could be transparent in its entirety, or could be partly opaque and include a transparent window 1935.1 for viewing the electronic display device.

Figure 35B:
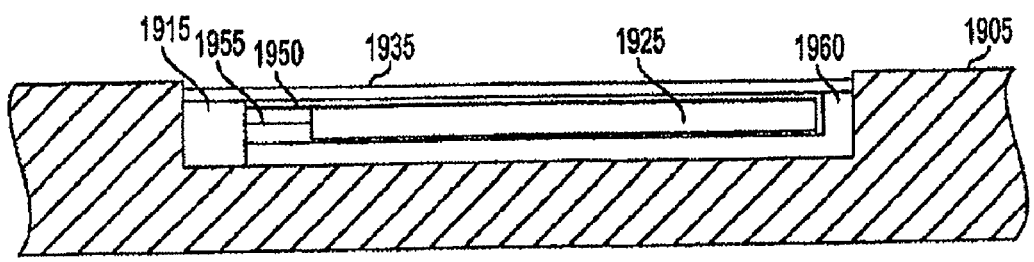

FIG. 35B shows a cross-section along the line 19D-19D. Reference numbers 1950 and 1955 correspond to a data cable and a power cable, respectively. As can be seen in FIG. 35B, embodiments of the invention may further comprise a riser 1960 to raise the electronic display device 1925 to a desired level, and further for providing support, together with the track 1915, for the protective covering 1935.

FIG. 35D shows a cross-section along the line 19D-19D. Reference numbers 1950 and 1955 correspond to a data cable and a power cable, respectively. As can be seen in FIG. 35D, embodiments of the invention may further comprise a riser 1960 to raise the electronic display device 1925 to a desired level, and further for providing support, together with the track 1915, for the protective covering 1935.

Advantages of embodiments including a track-and-trench system as described above include that, because an electronic display device may be placed below or substantially at floor level, there is no impediment to foot or other traffic presented. Also, a shared power and data supply via a track may enable relatively economical implementations.

Positioning Mechanisms

Figures 36A, 36B:
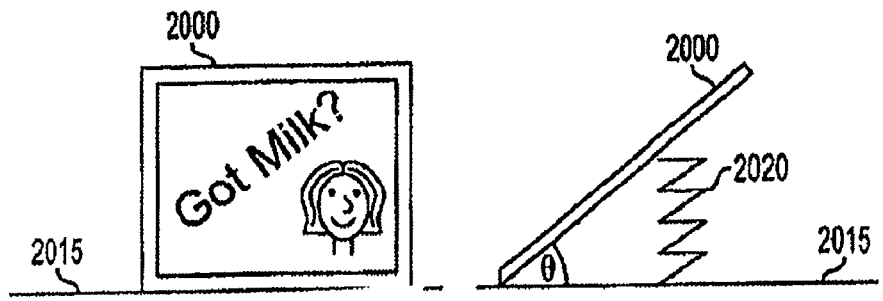
FIGS. 36A-36E illustrate a positioning mechanism system according to embodiments of the present invention.
Figure 36C:
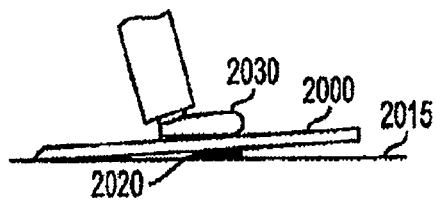

Embodiments of the present invention may relate to a floor display system including mechanisms for positioning an electronic display device associated with a floor at a selected inclination for better viewing. FIGS. 36A-36C show an illustrative example, where FIG. 36B is an orthogonal side view corresponding to FIG. 36A. According to embodiments, an electronic display device 2000 may be resting on, hingedly fastened to, or otherwise associated with a floor 2015. A positioning device 2020 may be coupled to the electronic display device 2000 to position it at a predetermined angle theta relative to the floor 2015. This may make the electronic display device easier to see from a distance. The positioning device 2020 may, for example, comprise a spring or other flexible or expandable mechanism. As shown in FIG. 36C, the positioning device 2020 may be compressible or retractable to allow the electronic display device 2000 to be moved closer to the floor 2015 by the pressure of, for example, a person's foot 2030. An advantage of the foregoing arrangement is that an area occupied by the electronic display device may be used for foot or other traffic. It should be understood that, while not shown in FIGS. 36A-36C, the electronic display device 2000 may include any of the display technologies and capabilities discussed above, and be associated with any of the devices discussed above. Thus, the electronic display device 2000 may be configurable to display electronically modifiable arbitrary content, support image rotation and/or translation, or otherwise include any of the capabilities discussed above in connection with an electronic display device.

Figure 36D:
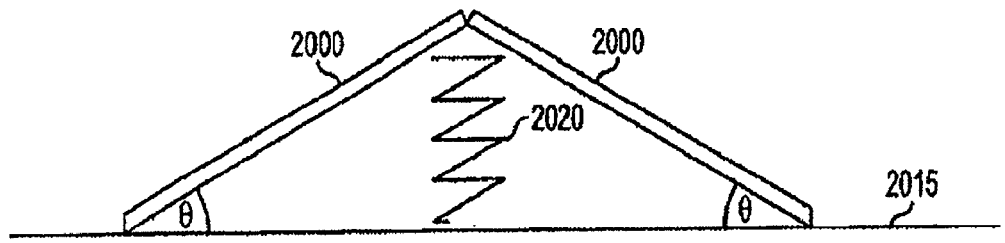
Figure 36E:
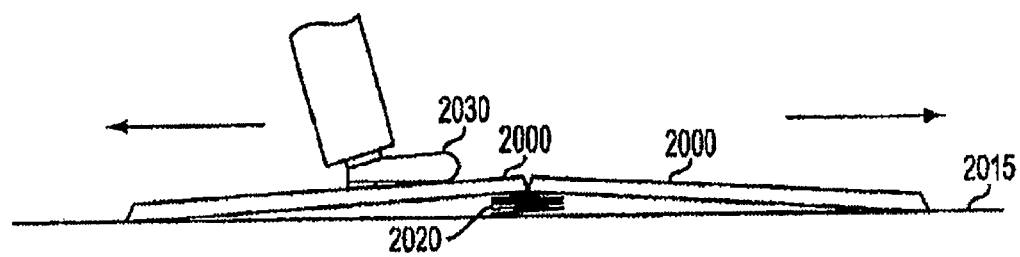

FIGS. 36D-36E illustrate an alternative embodiment, where FIG. 36D is an orthogonal side view corresponding to FIG. 36A. As shown in FIGS. 36D-36E, two electronic display devices 2000, each individually configured as described with reference to FIGS. 36A-36C above, may be arranged back-to-back and share a common positioning device 2020

Flexible Electronic Display Device

Figure 37A:
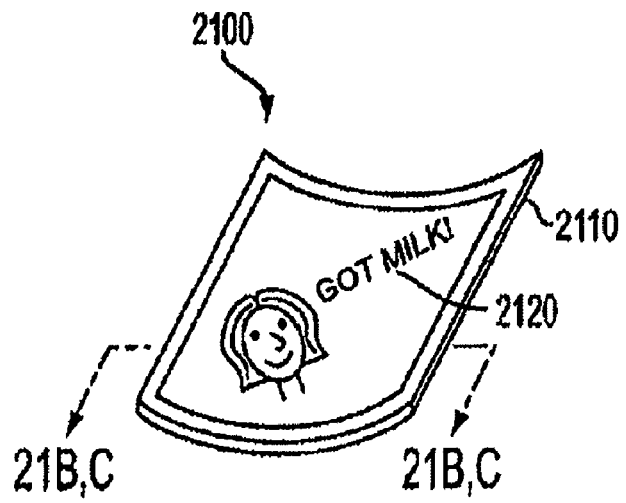
FIGS. 37A-37C show a lightweight, flexible electronic display device according to embodiments of the present invention.
Figure 37B:
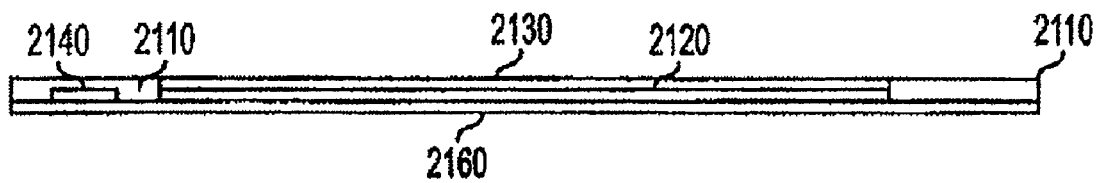
Figure 37C:
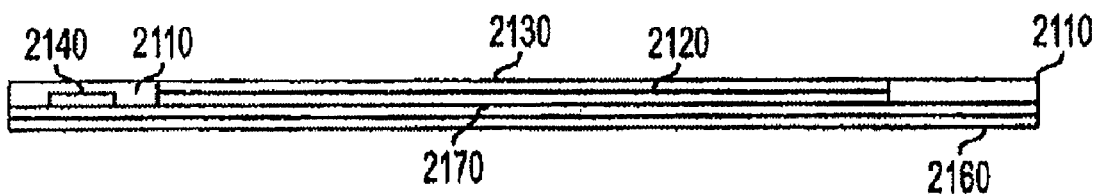

An electronic display device according to embodiments of the present invention could be formed from very thin, flexible, lightweight materials. An illustrative example is shown in FIGS. 37A-37C. According to embodiments, an electronic display device 2100 could comprise lightweight materials able to flex and bend as shown in FIG. 37A. More specifically, the electronic display device 2100 may include a lightweight flexible display element layer 2120 and a lightweight flexible frame 2110. The display element layer 2120 may comprise such display elements as small molecule OLEDs, polymeric OLEDs, PLEDs or LEPs. FIGS. 37B and 37C are cross-sectional views along lines 21B-21B and 21C-21C, respectively. As shown in FIG. 37B, the flexible frame 2110 may include a lightweight flexible transparent protective layer 2130 and a lightweight flexible backing layer 2160. The display element layer 2120 may be arranged between the backing layer 2160 and the transparent protective layer 2130. The transparent protective layer could comprise, for example, polycarbonate, Mylar, or other rugged transparent plastic. As shown in FIG. 37C, the electronic display device 2100 might further comprise a lightweight flexible thin film battery 2170 to power the display. The thin film battery 2170 could be arranged between the display element layer 2120 and the backing layer 2160.

The electronic display device 2100 may further comprise lightweight control electronics 2140 for driving a display of the display element layer. As shown, the control electronics 2140 may be housed with the frame 2110, laterally to the display element layer 2120. Alternatively, the control electronics could be arranged, for example, between the display element layer 2120 and the backing layer 2160 (FIG. 37B), or between the backing layer 2160 and the thin film battery 2170 (FIG. 37C).

It should be understood that, though not shown in FIGS. 37A-37C, the electronic display device 2100 may be associated with any of the devices discussed above, and be configurable to display electronically modifiable arbitrary content, support image rotation and/or translation, or otherwise include any of the capabilities discussed above in connection with an electronic display device.

As noted, an electronic display device 2100 as described above would very lightweight and therefore easily portable. For example, it is contemplated that the electronic display device 2100 could be rolled up and carried under one's arm like a newspaper.

Several embodiments of the present invention are specifically illustrated and/or described herein. However, it will be appreciated that modifications and variations of the present invention are covered by the above teachings and within the purview of the appended claims without departing from the spirit and intended scope of the invention.

Figure 38:
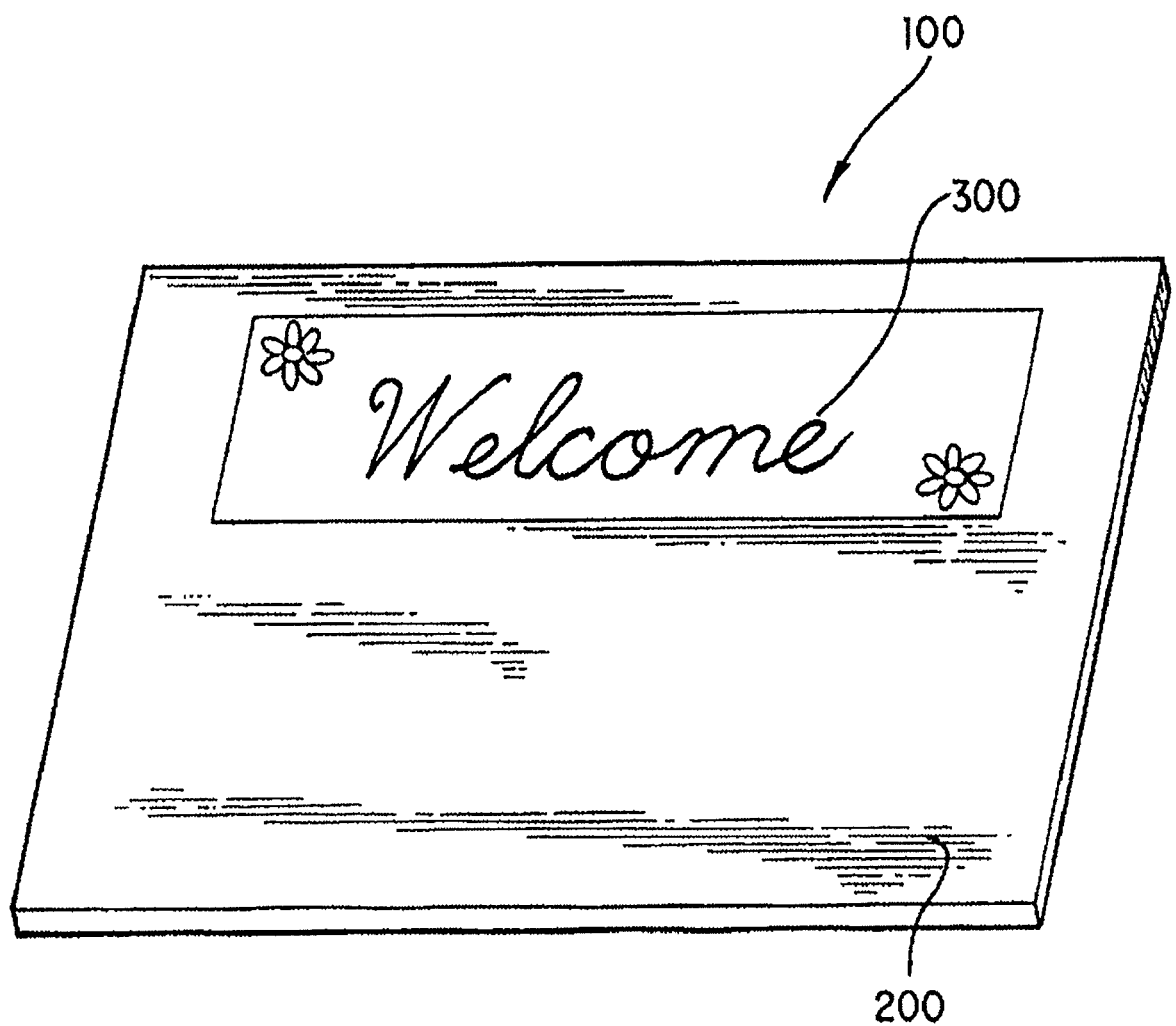
FIG. 38 is a perspective view of a floor mat in accordance with an embodiment of the present invention.

FIG. 38 illustrates a first embodiment for a floor mat 100 in accordance with the principles of the present invention. As can be seen in FIG. 38, floor mat 100 includes a base portion 200 and a cleanable insert portion 300. As will be further described later in this specification, in this embodiment, cleanable portion 300 is received within base portion 200 and is removable from base portion 200.

Figure 39:
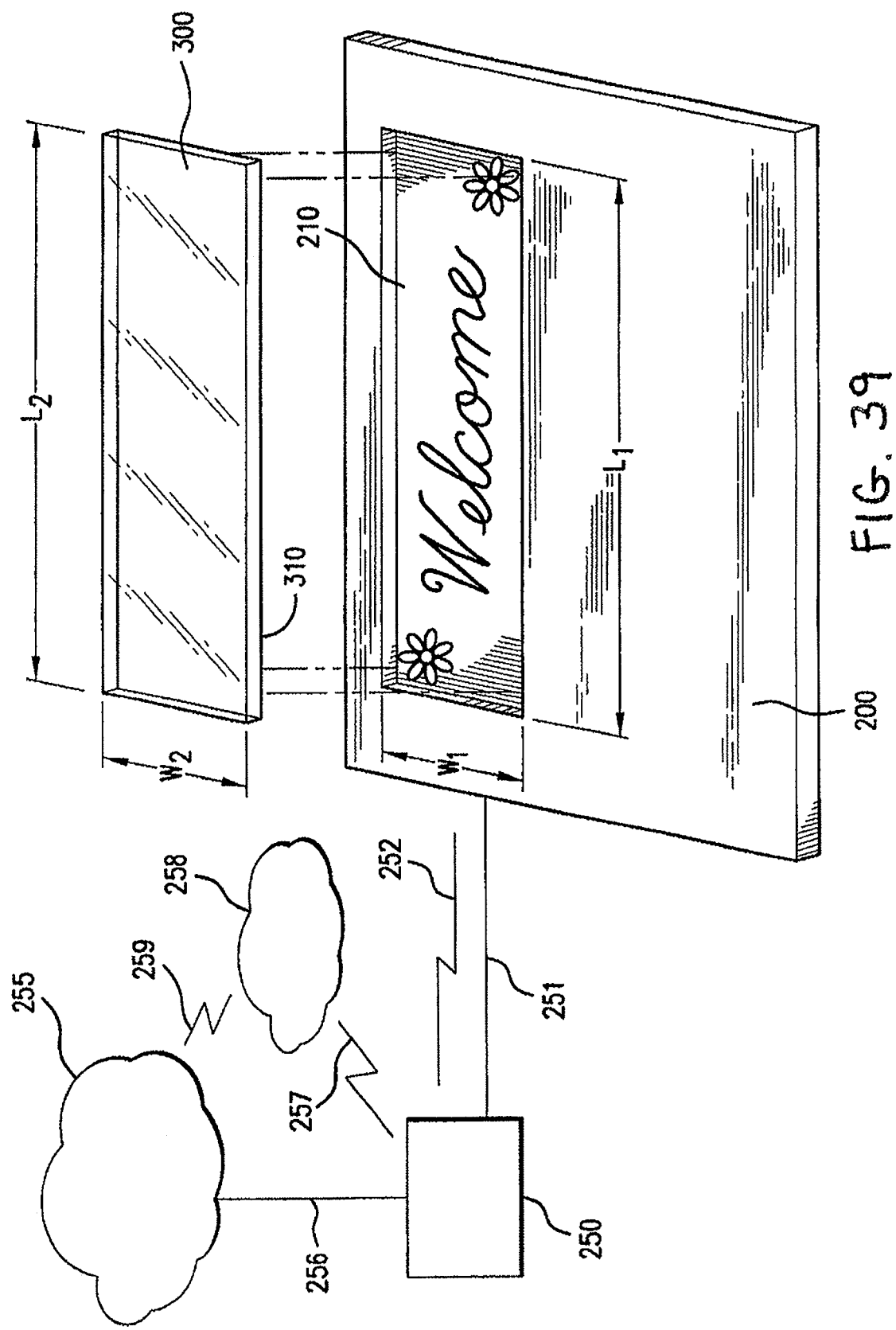
FIG. 39 is an exploded perspective view of the floor mat of FIG. 38.

FIG. 39 illustrates an exploded, perspective view of the floor mat of FIG. 38. As can be seen in FIG. 39, base portion 200 is formed as a generally flat, planar member and defines a recess 210 within the top surface of base portion 200. Base portion 200 provides sufficient weight and mass for supporting cleanable insert portion 300 and maintaining the floor mat's positioning on the surface on which it is placed. Base portion 200 may include, as will be discussed below, a water dissipation capability, a water absorption capability, and a cushioning capability and may be comprised of materials such as polyurethane, polyisoprene and other cross-linked elastomeric materials, such as nylon-6, molded or woven to form a porous structure.

Recess 210 can be configured in any of a variety of geometric configurations, however, in the present embodiment, recess 210 is configured in a rectangular shape. Recess 210 has a length $L_1$ and a width $W_1$. The depth of recess 210 is such that it is able to receive within it cleanable insert portion 300 such that when cleanable insert portion 300 is received within recess 210, the top surface of cleanable insert portion 300 lies generally in the same plane as the top surface of base portion 200.

As can be seen in FIG. 39, the surface of base portion 200 which defines the bottom of recess 210 may include graphics 220 on that surface. In the illustrated embodiment, the graphics include pictorial representations of flowers and a text message which spells out the word "WELCOME". The present invention is not limited to any particular graphic within recess 210 and the present invention may include any of a variety of different forms of graphics.

Graphics 220 may be modified, and thus customized, by an individual after the floor mat has been purchased by the owner. The owner may customize the mat at their home or office and, thus, a graphic that may be appropriate for a particular situation may be modified by the individual for display in another situation. For example, the graphic may display a message stating "Happy Halloween" for Halloween and may be modified to display "Happy Holidays" during the winter holiday season. Thus, as can be understood, the graphics are modifiable by a user and thus, may be customized for the particular desires of a particular user.

As stated above, the present invention is not limited to any particular form for graphics 220. The graphics 220 can be customized by a user to include any of a variety of different colors, pictures, messages, or other representations that the user may want to display. In addition, the visible intensity of a color(s) can be modified. For example, a color that glows at night could be included in graphics 220 for an occasion such as Halloween.

Any of a variety of different types of structures or methods may be practiced in the present invention for modifying graphics 220 of floor mat 100 and the present invention is not limited to any particular methodology or structure for modifying graphics 220. Additionally, all of the various embodiments contemplated for providing a modifiable graphic display in the floor mat of the present invention can be incorporated in either, or both, of the base portion or the insert portion. For example, the graphics may consist of pre-formed messages or art forms which may be adhered to either the surface which defines the bottom of recess 210, such as by using an adhesive or fastener assembly, e.g., a hook and loop assembly, or to the underside of insert portion 300 such that, when insert portion 300 is placed within base portion 200, the graphics would be visible through a transparent insert portion.

Alternatively, a variety of different graphics may be stored within floor mat 100 such that a user is able to selectively uncover a particular graphic for display while the other available graphics remain covered within floor mat 100. This type of selectability is known in other mediums where selectivity between a variety of different graphics within a common display panel is desired. For example, advertising bulletin boards at sporting events are able to selectively display a first particular message during a first particular period of time and display a second message during a second period of time on the same bulletin board.

A third possible alternative is to provide a modifiable display surface on the floor mat. The display surface can be associated with either the base portion or the insert portion, e.g., on either the bottom surface of recess 210 or a panel attached to the bottom of insert portion 300. A display could be included on the front of the floor mat, on the back of the mat such that it is viewable through a transparent portion of the mat, embedded in the mat, attached to the mat, or integrally formed in the mat. For example, the display could be comprised of a small, thin box of graphics that could attach to a tacky portion and/or a base portion or any other component part of the floor mat. However it is associated with the floor mat, a user may design and display their customized graphic and may subsequently modify that graphic such that it is replaced with another graphic. A display surface such as an erasable writing board could be utilized for this purpose.

It is also contemplated that a modifiable electronic display surface could be provided, such as, for example, a liquid crystal display panel. The display panel could be connected to a computer 250 and a computer generated image could be displayed on the display panel. The connection between the display panel and the computer 250 could be a wired connection 251 or a wireless connection as illustrated by electromagnetic wave 252. Thus, the image displayed on the display panel could be modified by generating a different computer image and displaying that computer image on the display panel. The display panel could be associated with base portion 200, such as included within recess 210, or could be included on a bottom surface, facing upward, of insert portion 300. Alternatively, the display panel could be integrally formed with either of the base portion or the insert portion. The modifiable display could utilize a plurality of different graphics that scroll across the display, either individually or in combination.

Other alternatives for modifying the graphics 220 of floor mat 100 include using light emitting polymers to create, and thus change, graphics 220. The light emitting polymers can be either applied to, attached to, or woven into the floor mat. The light emitting polymers may be utilized on any portion of floor mat 100, for example, on either the base portion or the insert portion, or on any other portion of the different embodiments for the floor mat. Light emitting polymers are known and described in U.S. Pat. Nos. 5,945,502, 5,869,350, and 5,571,626, which are incorporated herein by reference in their entirety.

Other options for a display panel are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer 250 and thus, to a network 255 such as the World Wide Web by utilizing, for example, a Motorola paging system 258. The connection between the network 255 and computer 250 could be a wired connection 256 or a wireless connection as illustrated by electromagnetic wave 257 from computer 250 to paging system 258 and electromagnetic wave 259 from paging system 258 to network 255. Text on all displays, if multiple displays are used, can be changed at once by a single editor, through a Web page.

Again, a display panel, which could utilize any of the methods discussed above for modifying the display panel, could be associated with any portion of the floor mat, such as base portion 200 within recess 210 or on a bottom surface, facing upward, of insert portion 300. Alternatively, the display panel could be integrally formed with either of the base portion or the insert portion.

Figure 40A:
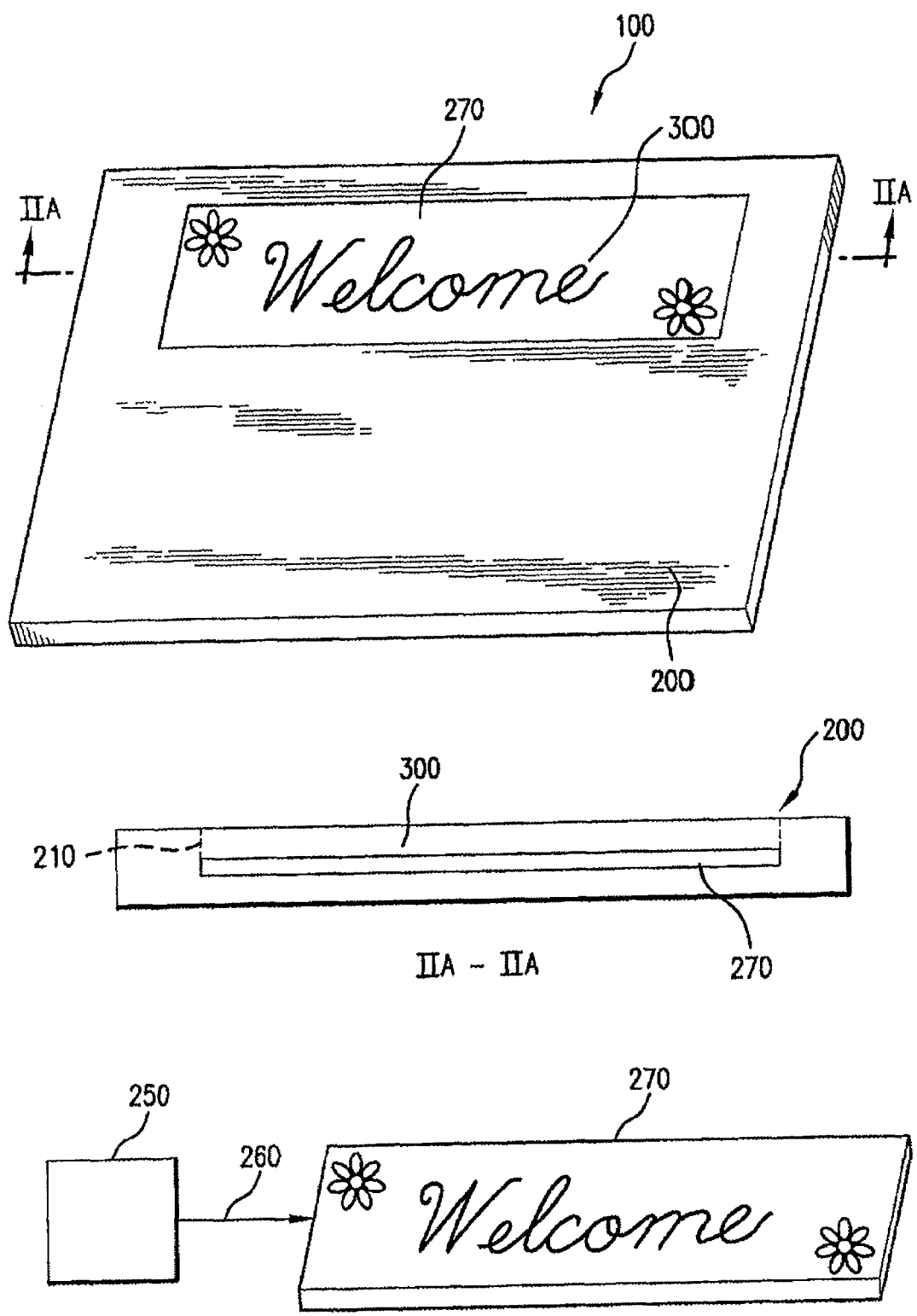
FIG. 40A shows a cross-sectional view of a layer comprising electronic components according to embodiments of the components, and a computer for controlling a modifiable electronic display of the layer.

FIG. 40A illustrates one possible embodiment of a layer comprising electronic components as described above. In particular, cross-sectional view IIA-IIA shows a layer 270 which could comprise electronic components such as a display panel containing a liquid crystal display, light-emitting polymers, electric paper or electronic ink for providing a modifiable electronic display. Alternatively, the layer 270 could comprise light-emitting polymers applied to, attached to, or woven into the floor mat as described. The layer 270 may be disposed within a recess 210 of base portion 200, under an insert portion 300. A computer 250 may generate signals 260, propagated via a wired connection 251 or wireless connection 252 as described above, for controlling the layer 270 to produce a desired display.

Figure 40B:
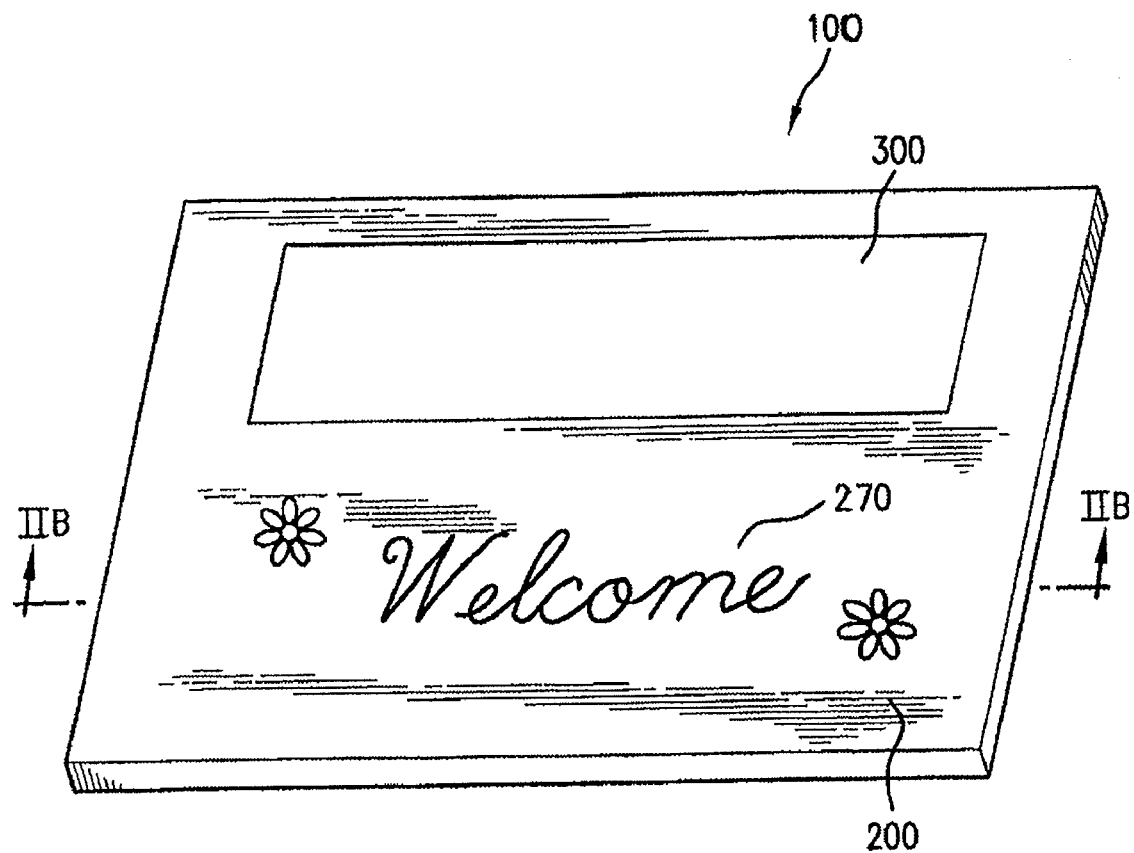
FIG. 40B shows a cross-sectional view of a layer comprising electronic components according to an alternative embodiment of the invention.
Figure 40B:
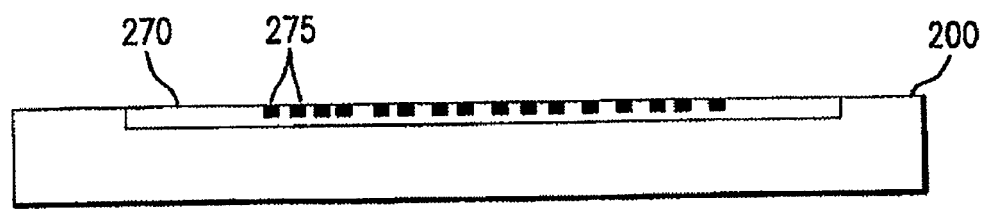

FIG. 40B illustrates another possible embodiment of a layer comprising electronic components as described above. In particular, cross-sectional view IIB-IIB shows a layer 270 comprising electronic components and being formed on a surface of base portion 200, as opposed to being located within a recess or under an insert portion. Areas 275 of layer 270 represent, for example, light-emitting polymers woven into the base portion surface and activated to spell out the word "Welcome."

In further describing base portion 200, as mentioned above, base portion 200 may also include both a water dissipation component and a cushioning component. The water dissipation component provides for transferring moisture from the soles of a person's shoes that is standing on floor mat 100 to reduce the degree of moisture transferred to cleanable insert portion 300 and the cushioning component provides for conforming the floor mat 100 to the shape of the person's soles such that a greater amount of the debris. on the person's soles may be removed by floor mat 100. The present invention is not limited to any particular structure or material for the water dissipation component and the cushioning component. For example, the water dissipation component may be comprised of any of a wide variety of known materials, such as polyamides, vinylics, and polyisoprene. It is desirable, but not required, that the water dissipation component dissipate or move the water and not retain the water. Thus, porous materials, and not hydrophilic materials, are desired. The cushioning component may be comprised of any of a variety of cushioning components to include, for example, foam rubber.

FIG. 2 also further illustrates cleanable insert portion 300. As can be seen, cleanable insert portion 300 has a geometric shape which is complementary in size and form to the recess 210 that is formed within base portion 200. As such, cleanable insert portion 300 is able to be received securely within recess 210. Thus, cleanable insert portion 300 has a length $L_2$ which is just slightly smaller than the length $L_1$ of recess 210. Likewise, cleanable insert portion 300 has a width $W_2$ which is also just slightly smaller than width $W_1$ of recess 210.

On the bottom side 310 of cleanable insert portion 300, i.e., that surface which contacts the surface which defines the bottom of recess 210, an attachment mechanism may be provided such that cleanable insert portion 300 may be removably attached to base portion 200 within recess 210. Any of a variety of different attachment mechanisms may be provided on the bottom surface of cleanable insert portion 300 to include, for example, a hook and loop fastener assembly or an adhesive. Regardless of the particular securement mechanism used to removably attach cleanable insert portion 300 to base portion 200, in this embodiment, cleanable insert portion 300 may be removed from base portion 200 such that it may be cleaned by a user and, after cleaning, be reinserted within recess 210 such that a clean surface is now provided for floor mat 100.

As stated above, cleanable insert portion 300 may be formed from a transparent material such as hydrophilic aliphatic acrylic polymers and copolymers incorporating acrylic acid, hydroxy ethyl methacrylate, and glycerin monomethacrylate. Forming cleanable insert portion 300 of a transparent material would allow an individual to view the customized graphics that may be provided within floor mat 100, as discussed previously. Additionally, the top side of cleanable insert portion 300 may include a tacky surface. The tacky surface would provide for assisting in removing debris from the soles of a person's shoes that is standing on cleanable insert portion 300. When the top tacky surface of cleanable insert portion 300 is dirtied to such an extent that the user desires to clean insert portion 300, in this embodiment, the user removes insert portion 300 from base portion 200 and cleans insert portion 300 to remove the accumulated debris. The insert portion 300 is then reinserted into base portion 200.

Figure 41:
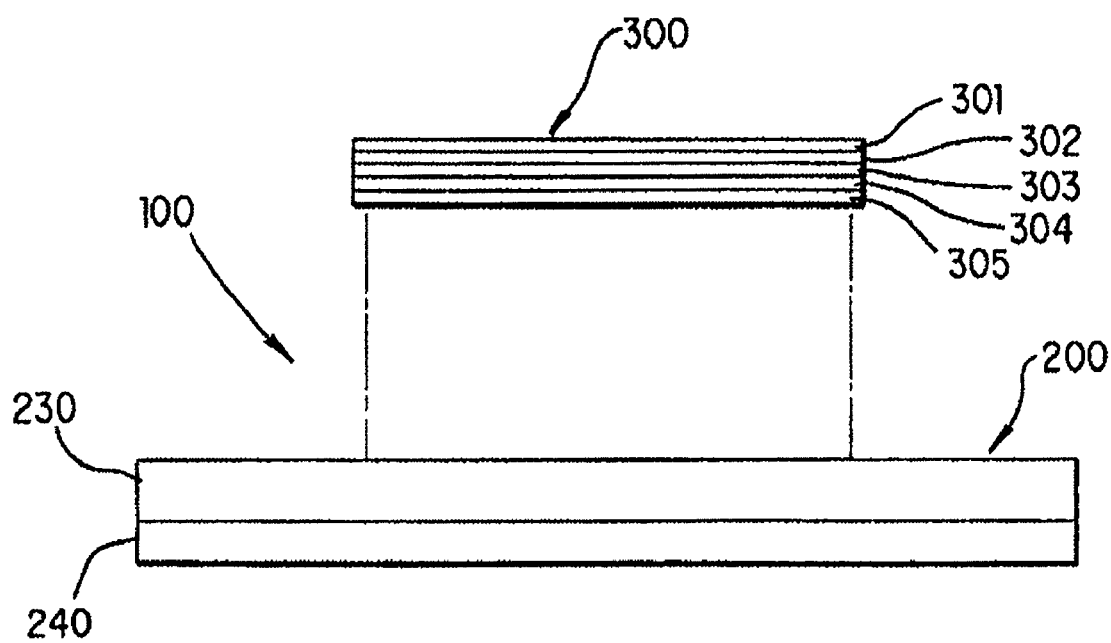
FIG. 41 is an exploded side view of an alternative embodiment of the floor mat of the present invention.

FIG. 41 illustrates an alternative embodiment for floor mat 100. In FIG. 41, it is illustrated that base portion 200 may include separate layers for a water dissipation component 230 and a cushioning component 240. Water dissipation component 230, in this embodiment, is disposed on a top side of the cushioning component 240. However, the present invention is not limited to this particular embodiment for water dissipation component 230 and cushioning component 240. For example, a single hybrid structure could be utilized for base portion 200 that would include the material properties to provide for both water dissipation and conforming structure.

Figure 42:
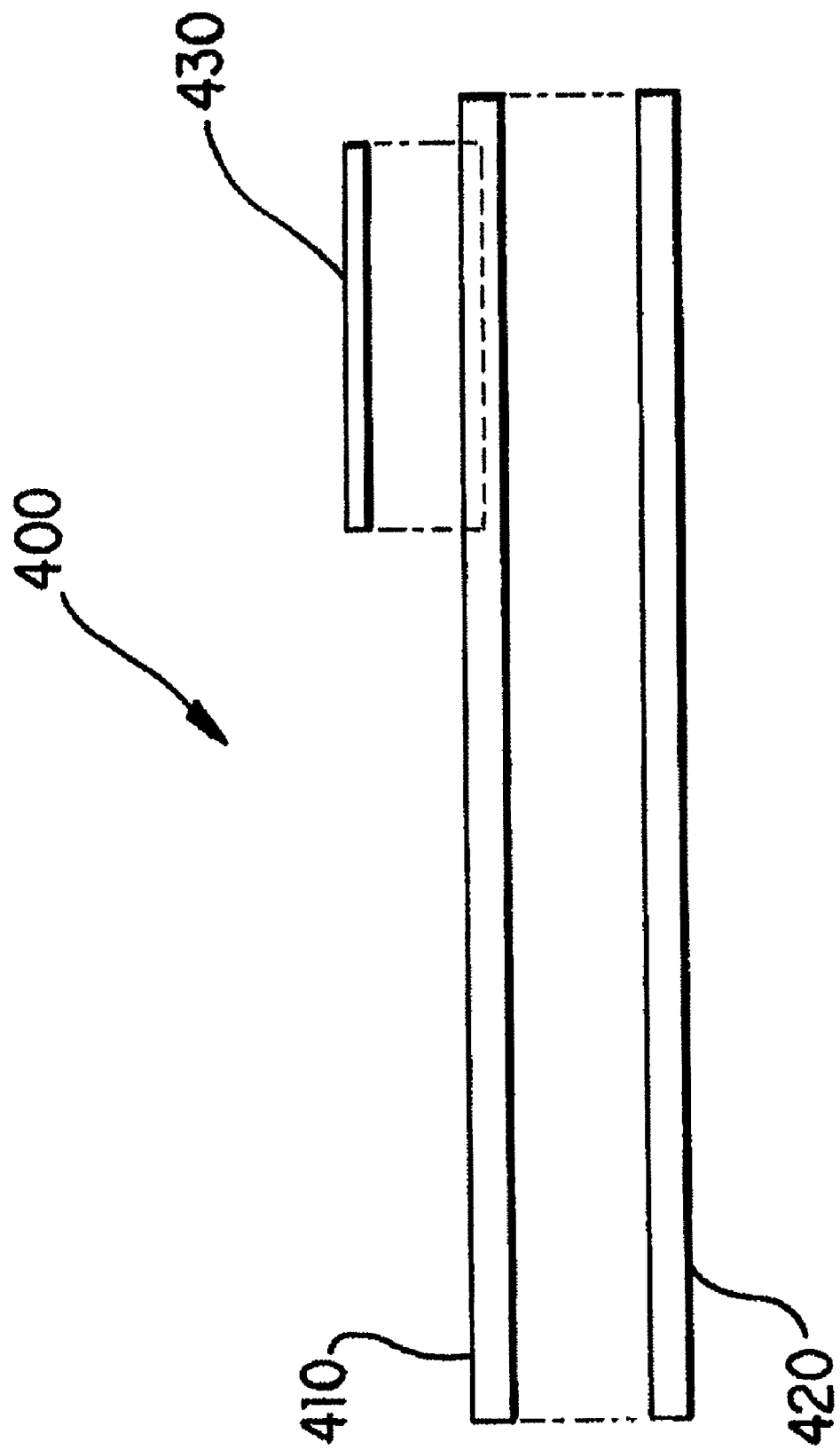
FIG. 42 is an exploded side view of an alternative embodiment of the floor mat of the present invention.

Alternatively, FIG. 42 illustrates that the floor mat may include both a water dissipation component, or wicking layer, and a water absorption layer. In FIG. 42, floor mat 400 includes wicking layer 410 and water absorption layer 420. The wicking layer 410 could be comprised of polypropeline or olefins, or any other suitable material that has the properties of moving the water from the surface of floor mat 400. The water absorption layer 420 is disposed underneath the wicking layer 410 and absorbs any water that passes through the wicking layer 410. The water absorption layer 420 could be periodically removed and dried, such as by example only, in a drying machine.

Of course, a wicking layer 410 may be used either with or without a water absorption layer 420 and a cushioning layer, as described previously in other embodiments, and the water absorption layer 420 could be used with or without a wicking layer 410 and a cushioning layer.

As discussed earlier, it is desirable, but not required, that the floor mat contain a water dissipation and/or absorption capability. This capability is desired to help prevent the insert portion from becoming wet and, thus, slippery. Whereas it has been discussed that, in order to help prevent a user from slipping on the insert portion, a water dissipation and/or absorbing capability could be included in the floor mat to reduce the degree of moisture.

Whereas cleanable portion 300 has been discussed as an insert portion, it is not required that cleanable portion 300 be inserted into floor mat 100. There exists many alternative possibilities for associating cleanable portion 300 with floor mat 100. For example, cleanable portion 300 could be placed on top of base portion 200 or could be positioned adjacent to base portion 200. The present invention is not limited to inserting any of the embodiments for cleanable portion 300 within base portion 200.

Attachment layer 600 can be any of a variety of materials. All that is required is that the attachment layer be able to releasably join one portion of the floor mat to a second portion of the floor mat. For example, a hook and loop fastener assembly, e.g., Velcro®, can be used with one portion of the assembly on the attachment layer and the other portion on the underside of the first portion of the floor mat and the second portion of the floor mat. Alternatively, an adhesive can be utilized to releasably join the two portions of the floor mat to the attachment layer. Additionally, snaps, including any type of male/female connector, may be used to join the two portions to the attachment layer.

Figure 43:
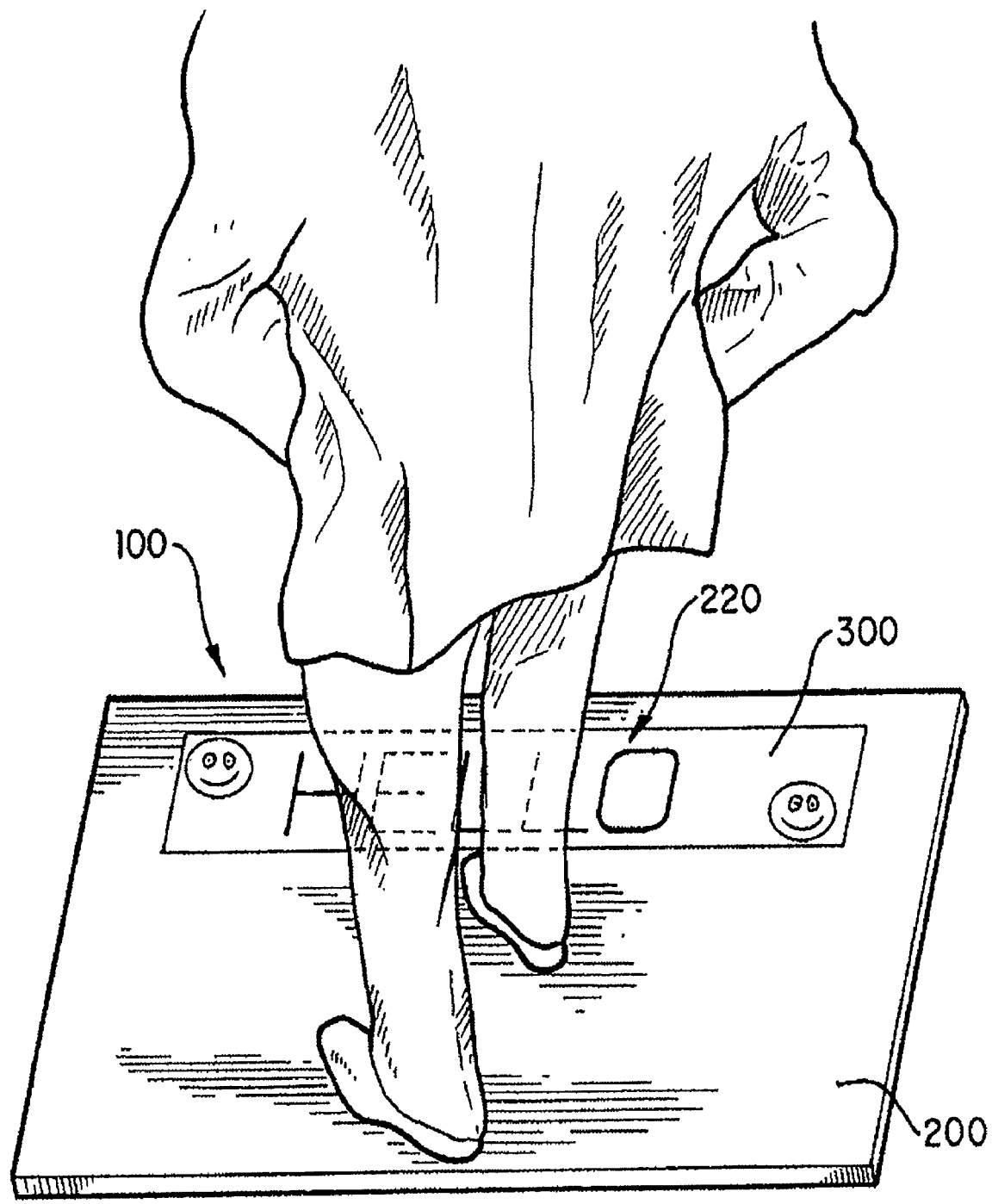
FIG. 43 is a perspective view of an embodiment of the floor mat of the present invention as being used in one step of a process for utilizing the floor mat.

FIG. 43 illustrates a first process step in utilizing an embodiment of the floor mat 100 of the present invention. As was described previously, an embodiment of floor mat 100 includes a base portion 200 and an insert portion 300. As can be seen in FIG. 43, and as was also discussed previously, a different graphic display 220 is present in the embodiment of FIG. 43 than was illustrated in the embodiment of FIGS. 1 and 2. Thus, FIG. 43 displays a "Hello" message with "smiley face" representations in the graphic 220.

As can be seen in FIG. 43, in utilizing an embodiment of the present invention, a user would first step upon base portion 200. As discussed earlier, base portion 200 may include a water dissipating and/or absorbing component and is thus able to assist in removing any moisture from the soles of the person's shoes. As was also discussed earlier, because base portion 200, in one embodiment, also includes a cushioning component, base portion 200 conforms to the person's soles when the person steps upon base portion 200. Whereas not illustrated in FIG. 43, as discussed previously, an antibacterial composition, an antifungal composition, a fragrance, or any other cleaning substance may also be associated with floor mat 100 and applied to the soles of the person's shoes when the person applies pressure to floor mat 100.

What is claimed is:

1. A floor display system, comprising: a floor covering; an electronic display device associated with the floor covering, wherein the electronic display device is configurable to display electronically modifiable arbitrary content; a controller; and a sensing device coupled to the controller; wherein the brightness of an image displayed by the electronic display device is capable of being varied based on information received by the controller from the sensing device.

2. The floor display system of claim 1, wherein the sensing device includes at least one proximity detector.

3. The floor display system of claim 1, wherein the sensing device is associated with the floor covering.

4. The floor display system of claim 1, wherein the sensing device is associated with an object near the floor display system.

5. The floor display system of claim 1, wherein the electronic display device comprises a plurality of separate panels.

6. The floor display system of claim 1, wherein the floor display system is locally configurable with selected content.

7. The floor display system of claim 1, wherein the floor display system is remotely configurable with selected content.

8. The floor display system of claim 7, wherein the floor display system is included in a network via which the floor display system is configured.

9. The floor display system of claim 1, wherein the floor display system is linked to a point-of-sale system.

10. The floor display system of claim 1, wherein the floor display system includes at least one interactivity device.

11. The floor display system of claim 1, further comprising an audio device.

12. A floor display system, comprising: a floor covering; an electronic display device associated with the floor covering, wherein the electronic display device is configurable to display electronically modifiable arbitrary content, and comprises a plurality of separate panels; wherein each of the separate panels is configurable to display an image independently; wherein each panel is further configurable to display an image with a different orientation from an image on another panel; and wherein each panel is further configurable to display an image at varying levels of brightness.

13. The floor display system of claim 12, wherein at least two panels are configurable to form a composite image.

14. The floor display system of claim 12, further comprising: a controller; and a sensing device coupled to the controller; wherein an image displayed by the electronic display device is capable of being rotated based on information received by the controller from the sensing device.

15. A floor display system, comprising: an electronic display device configurable to display electronically modifiable arbitrary content; and a positioning mechanism coupled to the electronic display device for positioning the electronic display device at a predetermined angle relative to a floor; wherein the positioning mechanism is flexible and the electronic display device is further configurable to display content at varying degrees of brightness.

16. The floor display system of claim 15, wherein the positioning mechanism is expandable and retractable.

17. The floor display system of claim 16, wherein the positioning mechanism comprises a spring.

18. The floor display system of claim 17, further comprising another electronic display device, arranged back-to-back with the electronic display device, and sharing the positioning mechanism with the electronic display device.

19. The floor display system of claim 18, further comprising a speaker.

20. The floor display system of claim 19, wherein the speaker comprises a directional speaker.

* * * * *